(12) United States Patent
Conrad

(10) Patent No.: US 11,690,489 B2
(45) Date of Patent: *Jul. 4, 2023

(54) SURFACE CLEANING APPARATUS WITH AN EXTERNAL DIRT CHAMBER

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

(*) Notice: Subject to any disclaimer, the term of this patent is extended or adjusted under 35 U.S.C. 154(b) by 3 days.

This patent is subject to a terminal disclaimer.

(21) Appl. No.: 17/549,138

(22) Filed: Dec. 13, 2021

(65) Prior Publication Data

US 2022/0167811 A1 Jun. 2, 2022

Related U.S. Application Data

(63) Continuation of application No. 16/847,476, filed on Apr. 13, 2020, now Pat. No. 11,229,340, which is a
(Continued)

(30) Foreign Application Priority Data

Mar. 13, 2009 (CA) .................. CA 2658372

(51) Int. Cl.
| | | |
|---|---|---|
| *B01D 45/12* | (2006.01) | |
| *A47L 9/16* | (2006.01) | |
| *A47L 5/24* | (2006.01) | |
| *B01D 45/16* | (2006.01) | |
| *B04C 5/185* | (2006.01) | |

(Continued)

(52) U.S. Cl.
CPC ............... *A47L 9/1683* (2013.01); *A47L 5/24* (2013.01); *A47L 9/1608* (2013.01); *A47L 9/1625* (2013.01); *A47L 9/1641* (2013.01); *A47L 9/1666* (2013.01); *B01D 45/12* (2013.01); *B01D 45/16* (2013.01); *B04C 5/185* (2013.01);
(Continued)

(58) Field of Classification Search
None
See application file for complete search history.

(56) References Cited

U.S. PATENT DOCUMENTS 2,800,330 A 6/1883 Hadley
3,031,730 A 8/1884 Mark
(Continued)

FOREIGN PATENT DOCUMENTS

CA 1218962 A1 3/1987
CA 2241644 C 12/2007
(Continued)

OTHER PUBLICATIONS

English machine translation of JP2000140533, published on May 23, 2000.
(Continued)

*Primary Examiner* — Dung H Bui
(74) *Attorney, Agent, or Firm* — Philip C. Mendes da Costa; Bereskin & Parr LLP/S.E.N.C.R.L., s.r.l.

(57) ABSTRACT

A surface cleaning apparatus has a cyclone chamber having a longitudinal cyclone axis of rotation wherein the dirt outlet is defined by a gap between the sidewall of the cyclone and a plate positioned at the dirt outlet end of the cyclone.

8 Claims, 40 Drawing Sheets

Related U.S. Application Data continuation of application No. 16/100,624, filed on Aug. 10, 2018, now Pat. No. 10,667,663, which is a continuation-in-part of application No. 15/937,220, filed on Mar. 27, 2018, now Pat. No. 10,791,895, said application No. 16/847,476 is a continuation-in-part of application No. 16/450,304, filed on Jun. 24, 2019, which is a continuation of application No. 15/184,954, filed on Jun. 16, 2016, now Pat. No. 10,376,112, which is a continuation of application No. 13/779,405, filed on Feb. 27, 2013, now Pat. No. 9,433,332, and a continuation-in-part of application No. 14/994,495, filed on Jan. 13, 2016, now abandoned, which is a continuation of application No. 13/039,376, filed on Mar. 3, 2011, now Pat. No. 9,265,395, which is a continuation-in-part of application No. 12/722,705, filed on Mar. 12, 2010, now Pat. No. 8,578,555, said application No. 15/184,954 is a continuation of application No. 14/932,816, filed on Nov. 4, 2015, now Pat. No. 9,693,666, which is a continuation of application No. 13/040,676, filed on Mar. 4, 2011, now Pat. No. 9,211,044, said application No. 17/549,138 is a continuation-in-part of application No. 17/367,538, filed on Jul. 5, 2021, which is a continuation of application No. 17/196,380, filed on Mar. 9, 2021, which is a continuation of application No. 15/931,973, filed on May 14, 2020, now Pat. No. 11,529,031, which is a continuation of application No. 16/022,902, filed on Jun. 29, 2018, now Pat. No. 11,330,944, which is a continuation of application No. 15/012,783, filed on Feb. 1, 2016, now Pat. No. 10,548,442, which is a continuation of application No. 14/874,544, filed on Oct. 5, 2015, now Pat. No. 9,826,868, which is a continuation of application No. 13/255,875, filed as application No. PCT/CA2010/000342 on Mar. 9, 2010, now Pat. No. 9,204,769.

(51) Int. Cl.
    *B04C 5/26* (2006.01)
    *B04C 5/28* (2006.01)
    *B01D 50/20* (2022.01)
    *B04C 9/00* (2006.01)

(52) U.S. Cl.
    CPC .............. *B04C 5/26* (2013.01); *B04C 5/28* (2013.01); *B01D 50/20* (2022.01); *B04C 2009/002* (2013.01)

(56) References Cited

U.S. PATENT DOCUMENTS

| | | |
|---|---|---|
| 1,902,472 A | 3/1933 | Tuteur et al. |
| 2,071,975 A | 2/1937 | Holm-Hansen et al. |
| 2,533,057 A | 12/1950 | Senne |
| 2,542,634 A | 2/1951 | Davis et al. |
| 2,559,384 A | 4/1951 | Senne |
| 2,621,756 A | 12/1952 | Senne |
| 2,632,524 A | 3/1953 | Senne |
| 2,913,111 A | 11/1959 | Rogers |
| 2,942,691 A | 6/1960 | Dillon |
| 3,015,122 A | 1/1961 | Cook |
| 3,085,221 A | 4/1963 | Kelly |
| 3,130,157 A | 4/1964 | Kelsall et al. |
| 3,200,568 A | 8/1965 | McNeil |
| 3,310,828 A | 3/1967 | Clark |
| 3,320,727 A | 5/1967 | Farley et al. |
| 3,356,334 A | 12/1967 | Scaramucci |
| 3,457,744 A | 7/1969 | Bisbing |
| 3,530,649 A | 9/1970 | Porsch et al. |
| 3,543,325 A | 12/1970 | Hamrick et al. |
| 3,582,616 A | 6/1971 | Wrob |
| 3,822,533 A | 7/1974 | Oranje |
| 3,898,068 A | 8/1975 | McNeil et al. |
| 3,988,132 A | 10/1976 | Oranje |
| 3,988,133 A | 10/1976 | Schady |
| 4,187,088 A | 2/1980 | Hodgson |
| 4,236,903 A | 12/1980 | Malmsten |
| 4,279,355 A | 7/1981 | Schwartz |
| 4,373,228 A | 2/1983 | Dyson |
| 4,393,536 A | 7/1983 | Tapp |
| 4,443,910 A | 4/1984 | Fitzwater |
| 4,523,936 A | 6/1985 | Disanza |
| D280,033 S | 8/1985 | Miyamoto et al. |
| 4,573,236 A | 3/1986 | Dyson |
| 4,635,315 A | 1/1987 | Kozak |
| D290,894 S | 7/1987 | Miyamoto et al. |
| D298,875 S | 12/1988 | Nakamura |
| 4,809,393 A | 3/1989 | Goodrich et al. |
| 4,809,398 A | 3/1989 | Linduist et al. |
| 4,826,515 A | 5/1989 | Dyson |
| 4,831,685 A | 5/1989 | Bosyj et al. |
| 4,836,515 A | 5/1989 | Dyson |
| D303,173 S | 8/1989 | Miyamoto et al. |
| 4,905,342 A | 3/1990 | Ataka |
| 5,035,024 A | 7/1991 | Steiner et al. |
| 5,054,157 A | 10/1991 | Werner et al. |
| 5,078,761 A | 1/1992 | Dyson |
| 5,129,125 A | 7/1992 | Gamou et al. |
| 5,230,722 A | 7/1993 | Yonkers |
| 5,254,019 A | 10/1993 | Noschese |
| 5,267,371 A | 12/1993 | Soler et al. |
| 5,287,591 A | 2/1994 | Rench et al. |
| 5,307,538 A | 5/1994 | Rench et al. |
| 5,309,600 A | 5/1994 | Weaver et al. |
| 5,309,601 A | 5/1994 | Hampton et al. |
| 5,331,714 A | 7/1994 | Essex et al. |
| 5,363,535 A | 11/1994 | Rench et al. |
| D353,917 S | 12/1994 | Hoekstra et al. |
| 5,379,483 A | 1/1995 | Pino |
| 5,467,835 A | 11/1995 | Obermeier et al. |
| 5,524,321 A | 6/1996 | Weaver et al. |
| 5,715,566 A | 2/1998 | Weaver et al. |
| 5,815,883 A | 10/1998 | Stein et al. |
| 5,836,047 A | 11/1998 | Lee et al. |
| 5,842,254 A | 12/1998 | Lee |
| 5,858,038 A | 1/1999 | Dyson et al. |
| 6,058,559 A | 5/2000 | Yoshimi et al. |
| 6,070,291 A | 6/2000 | Bair et al. |
| 6,080,022 A | 6/2000 | Shaberman et al. |
| 6,081,961 A | 7/2000 | Wang |
| D436,699 S | 2/2001 | Makihara et al. |
| 6,192,550 B1 | 2/2001 | Hamada et al. |
| 6,210,469 B1 | 4/2001 | Tokar |
| 6,221,134 B1 | 4/2001 | Conrad et al. |
| 6,228,260 B1 | 5/2001 | Conrad et al. |
| 6,231,645 B1 | 5/2001 | Conrad et al. |
| 6,251,296 B1 | 6/2001 | Conrad et al. |
| 6,256,832 B1 | 7/2001 | Dyson |
| 6,295,692 B1 | 10/2001 | Shideler |
| 6,375,696 B2 | 4/2002 | Weglin et al. |
| 6,406,505 B1 | 6/2002 | Oh et al. |
| 6,406,605 B1 | 6/2002 | Oh et al. |
| 6,434,785 B1 | 8/2002 | Vandenbelt et al. |
| 6,440,197 B1 | 8/2002 | Conrad et al. |
| 6,463,622 B2 | 10/2002 | Wright et al. |
| 6,482,246 B1 | 11/2002 | Dyson et al. |
| 6,502,278 B2 | 1/2003 | Oh et al. |
| 6,510,583 B2 | 1/2003 | Griffith et al. |
| 6,514,131 B1 | 2/2003 | Reich et al. |
| 6,531,066 B1 | 3/2003 | Saunders et al. |
| 6,546,592 B1 | 4/2003 | Cockburn et al. |
| 6,553,612 B1 | 4/2003 | Dyson et al. |
| 6,560,818 B1 | 5/2003 | Hasko |
| 6,581,239 B1 | 6/2003 | Dyson et al. |
| 6,599,338 B2 | 7/2003 | Oh et al. |
| 6,613,129 B2 | 9/2003 | Gen |
| 6,623,539 B2 | 9/2003 | Lee et al. |

(56) References Cited

U.S. PATENT DOCUMENTS

| | | |
|---|---|---|
| 6,736,873 B2 | 5/2004 | Conrad et al. |
| 6,740,144 B2 | 5/2004 | Conrad et al. |
| 6,746,500 B1 | 6/2004 | Park et al. |
| 6,766,558 B1 | 7/2004 | Matsumoto et al. |
| 6,782,583 B2 | 8/2004 | Oh |
| 6,782,585 B1 | 8/2004 | Conrad et al. |
| D498,027 S | 11/2004 | Alsruh et al. |
| 6,810,558 B2 | 11/2004 | Lee |
| 6,832,408 B2 | 12/2004 | Roney et al. |
| 6,833,015 B2 | 12/2004 | Oh et al. |
| 6,840,972 B1 | 1/2005 | Kim |
| 6,848,146 B2 | 2/2005 | Wright et al. |
| 6,874,197 B1 | 4/2005 | Conrad |
| 6,883,202 B2 | 4/2005 | Steffen et al. |
| 6,901,625 B2 | 6/2005 | Yang et al. |
| 6,902,596 B2 | 6/2005 | Conrad et al. |
| 6,929,516 B2 | 8/2005 | Bruchu et al. |
| 6,961,975 B2 | 11/2005 | Park et al. |
| 6,974,488 B2 | 12/2005 | Dyson |
| 6,976,885 B2 | 12/2005 | Lord |
| 6,991,666 B2 | 1/2006 | Organ |
| 7,028,369 B2 | 4/2006 | Park |
| 7,039,985 B2 | 5/2006 | Hisrich et al. |
| 7,073,226 B1 | 7/2006 | Lenkiewicz et al. |
| 7,127,397 B2 | 10/2006 | Case |
| 7,131,165 B2 | 11/2006 | Wright et al. |
| 7,146,681 B2 | 12/2006 | Wright et al. |
| 7,160,346 B2 | 1/2007 | Park |
| 7,207,083 B2 | 4/2007 | Hayashi et al. |
| 7,222,393 B2 | 5/2007 | Kaffenberger et al. |
| 7,247,181 B2 | 7/2007 | Hansen |
| 7,278,181 B2 | 10/2007 | Harris et al. |
| 7,309,365 B2 | 12/2007 | Yuasa et al. |
| 7,335,242 B2 | 2/2008 | Oh |
| 7,370,387 B2 | 5/2008 | Walker et al. |
| 7,377,008 B2 | 5/2008 | Park et al. |
| 7,380,308 B2 | 6/2008 | Oh et al. |
| 7,381,234 B2 | 6/2008 | Oh |
| 7,386,916 B2 | 6/2008 | Bone |
| D581,609 S | 11/2008 | Conrad |
| 7,445,655 B2 | 11/2008 | Bock et al. |
| 7,448,363 B1 | 11/2008 | Rassmussen et al. |
| 7,485,164 B2 | 2/2009 | Jeong et al. |
| 7,488,362 B2 | 2/2009 | Jeong et al. |
| D591,466 S | 4/2009 | Crawley |
| 7,526,833 B2 | 5/2009 | Cochran et al. |
| 7,540,894 B2 | 6/2009 | Ni |
| 7,544,224 B2 | 6/2009 | Tanner et al. |
| 7,547,338 B2 | 6/2009 | Kim et al. |
| 7,581,286 B2 | 9/2009 | Choi |
| 7,584,522 B1 | 9/2009 | Weeter |
| 7,594,296 B2 | 9/2009 | Park |
| 7,597,730 B2 | 10/2009 | Yoo et al. |
| 7,604,675 B2 | 10/2009 | Makarov et al. |
| 7,624,475 B2 | 12/2009 | Choi |
| 7,645,309 B2 | 1/2010 | Jeong et al. |
| 7,645,311 B2 | 1/2010 | Oh et al. |
| 7,686,858 B2 | 3/2010 | Oh |
| 7,691,161 B2 | 4/2010 | Oh et al. |
| 7,717,973 B2 | 5/2010 | Oh et al. |
| 7,722,709 B2 | 5/2010 | Conrad |
| 7,731,769 B2 | 6/2010 | Min |
| 7,740,676 B2 | 6/2010 | Burnham et al. |
| 7,776,120 B2 | 8/2010 | Conrad |
| 7,779,505 B2 | 8/2010 | Krebs et al. |
| 7,794,515 B2 | 9/2010 | Oh et al. |
| 7,803,207 B2 | 9/2010 | Conrad |
| 7,811,349 B2 | 10/2010 | Nguyen |
| 7,845,046 B2 | 12/2010 | Milligan et al. |
| 7,857,878 B2 | 12/2010 | Park et al. |
| 7,882,592 B2 | 2/2011 | Hwang et al. |
| 7,882,593 B2 | 2/2011 | Beskow et al. |
| 7,887,612 B2 | 2/2011 | Conrad |
| D635,728 S | 4/2011 | Fjellman |
| 7,922,794 B2 | 4/2011 | Morphey |
| 7,931,716 B2 | 4/2011 | Oakham |
| 7,934,286 B2 | 5/2011 | Yoo et al. |
| 7,941,895 B2 | 5/2011 | Conrad |
| 7,958,598 B2 | 6/2011 | Yun et al. |
| 7,979,953 B2 | 7/2011 | Yoo |
| 7,996,956 B2 | 8/2011 | Wood et al. |
| 8,016,902 B2 | 9/2011 | Makarov |
| 8,032,981 B2 | 10/2011 | Yoo |
| 8,032,983 B2 | 10/2011 | Griffith et al. |
| 8,048,180 B2 | 11/2011 | Oh et al. |
| 8,062,398 B2 | 11/2011 | Luo et al. |
| 8,100,999 B2 | 1/2012 | Ashbee et al. |
| 8,101,001 B2 | 1/2012 | Qian |
| 8,117,712 B2 | 2/2012 | Dyson et al. |
| 8,117,713 B2 | 2/2012 | Kasper et al. |
| 8,127,397 B2 | 3/2012 | Hess et al. |
| 8,127,398 B2 | 3/2012 | Conrad |
| 8,146,201 B2 | 4/2012 | Conrad |
| 8,151,407 B2 | 4/2012 | Conrad |
| 8,156,609 B2 | 4/2012 | Milne et al. |
| 8,166,607 B2 | 5/2012 | Conrad |
| 8,176,596 B2 | 5/2012 | Conrad |
| 8,191,203 B2 | 6/2012 | Yoo |
| 8,220,109 B2 | 7/2012 | Medema |
| 8,236,077 B2 | 8/2012 | Gomicaiaga-Pereda et al. |
| 8,282,697 B2 | 10/2012 | Oh |
| 8,302,250 B2 | 11/2012 | Dyson et al. |
| 8,347,455 B2 | 1/2013 | Dyson et al. |
| 8,359,705 B2 | 1/2013 | Conrad |
| 8,387,204 B2 | 3/2013 | Dyson |
| 8,424,154 B2 | 4/2013 | Beskow |
| 8,444,731 B2 | 5/2013 | Gomiciaga-Pereda et al. |
| 8,468,646 B2 | 6/2013 | Yoo |
| 8,484,799 B2 | 7/2013 | Conrad |
| 8,528,160 B2 | 9/2013 | Conrad |
| 8,640,304 B2 | 2/2014 | Conrad |
| 8,707,513 B2 | 4/2014 | Ivarsson et al. |
| 8,769,767 B2 | 7/2014 | Conrad |
| 9,204,769 B2 | 12/2015 | Conrad |
| 9,826,868 B2 | 11/2017 | Conrad |
| 2001/0023517 A1 | 9/2001 | Onishi et al. |
| 2002/0011053 A1 | 1/2002 | Oh |
| 2002/0043055 A1 | 4/2002 | Conrad |
| 2002/0062531 A1 | 5/2002 | Oh |
| 2002/0112315 A1 | 8/2002 | Conrad |
| 2002/0134059 A1 | 9/2002 | Oh |
| 2002/0162188 A1 | 11/2002 | Harmen |
| 2002/0178535 A1 | 12/2002 | Oh et al. |
| 2002/0178698 A1 | 12/2002 | Oh et al. |
| 2002/0178699 A1 | 12/2002 | Oh |
| 2002/0178702 A1 | 12/2002 | Oh |
| 2003/0028994 A1 | 2/2003 | Kitamura et al. |
| 2003/0037403 A1 | 2/2003 | Lang |
| 2003/0046910 A1 | 3/2003 | Lee et al. |
| 2003/0066273 A1 | 4/2003 | Choi et al. |
| 2003/0158238 A1 | 8/2003 | Hale et al. |
| 2003/0159411 A1 | 8/2003 | Hansen et al. |
| 2004/0010885 A1 | 1/2004 | Hitzelberger et al. |
| 2004/0020005 A1 | 2/2004 | Odachi et al. |
| 2004/0025285 A1 | 2/2004 | McCormick et al. |
| 2004/0078921 A1 | 4/2004 | Yuasa et al. |
| 2004/0163201 A1 | 8/2004 | Murphy et al. |
| 2004/0194249 A1 | 10/2004 | Lee et al. |
| 2004/0216263 A1 | 11/2004 | Best |
| 2004/0216264 A1 | 11/2004 | Shaver et al. |
| 2004/0216266 A1 | 11/2004 | Conrad |
| 2005/0081321 A1 | 4/2005 | Milligan et al. |
| 2005/0102982 A1 | 5/2005 | Dimmelow et al. |
| 2005/0138757 A1 | 6/2005 | Lee |
| 2005/0138763 A1 | 6/2005 | Tanner et al. |
| 2005/0144754 A1 | 7/2005 | Ivarsson et al. |
| 2005/0198769 A1 | 9/2005 | Lee et al. |
| 2005/0198770 A1 | 9/2005 | Jung et al. |
| 2005/0198771 A1 | 9/2005 | Min et al. |
| 2005/0252179 A1 | 11/2005 | Oh et al. |
| 2006/0005346 A1 | 1/2006 | Rupp et al. |
| 2006/0037172 A1 | 2/2006 | Choi |
| 2006/0042206 A1 | 3/2006 | Arnold et al. |
| 2006/0075598 A1 | 4/2006 | Follegot et al. |

(56) References Cited

U.S. PATENT DOCUMENTS

| | | |
|---|---|---|
| 2006/0080947 A1 | 4/2006 | Lee et al. |
| 2006/0090290 A1 | 5/2006 | Lau |
| 2006/0090428 A1 | 5/2006 | Park et al. |
| 2006/0117723 A1 | 6/2006 | Yoo |
| 2006/0123590 A1 | 6/2006 | Fester et al. |
| 2006/0130448 A1 | 6/2006 | Han et al. |
| 2006/0137304 A1 | 6/2006 | Jeong et al. |
| 2006/0137305 A1 | 6/2006 | Jung |
| 2006/0137306 A1 | 6/2006 | Jeong et al. |
| 2006/0137307 A1 | 6/2006 | Jeong et al. |
| 2006/0137309 A1 | 6/2006 | Jeong et al. |
| 2006/0137314 A1 | 6/2006 | Conrad et al. |
| 2006/0156508 A1 | 7/2006 | Khalil |
| 2006/0156509 A1 | 7/2006 | Luebbering et al. |
| 2006/0156699 A1 | 7/2006 | Kim |
| 2006/0162298 A1 | 7/2006 | Oh et al. |
| 2006/0162299 A1 | 7/2006 | North |
| 2006/0168922 A1 | 8/2006 | Oh |
| 2006/0168923 A1 | 8/2006 | Lee et al. |
| 2006/0207055 A1 | 9/2006 | Ivarsson et al. |
| 2006/0207231 A1 | 9/2006 | Arnold |
| 2006/0230715 A1 | 10/2006 | Oh et al. |
| 2006/0230724 A1 | 10/2006 | Han et al. |
| 2006/0230726 A1 | 10/2006 | Oh et al. |
| 2006/0236663 A1 | 10/2006 | Oh |
| 2006/0248678 A1 | 11/2006 | Park |
| 2006/0278081 A1 | 12/2006 | Han et al. |
| 2007/0012002 A1 | 1/2007 | Oh et al. |
| 2007/0012003 A1 | 1/2007 | Oh et al. |
| 2007/0033765 A1 | 2/2007 | Walker et al. |
| 2007/0039120 A1 | 2/2007 | Choi |
| 2007/0067943 A1 | 3/2007 | Makarov |
| 2007/0067944 A1 | 3/2007 | Kitamura |
| 2007/0067945 A1 | 3/2007 | Kasper et al. |
| 2007/0077810 A1 | 4/2007 | Gogel et al. |
| 2007/0079473 A1 | 4/2007 | Min |
| 2007/0079584 A1 | 4/2007 | Kim |
| 2007/0079585 A1 | 4/2007 | Oh et al. |
| 2007/0079587 A1 | 4/2007 | Kim |
| 2007/0079590 A1 | 4/2007 | Yoo |
| 2007/0084160 A1 | 4/2007 | Kim |
| 2007/0084161 A1 | 4/2007 | Yoo |
| 2007/0095028 A1 | 5/2007 | Kim |
| 2007/0095029 A1 | 5/2007 | Min |
| 2007/0095030 A1 | 5/2007 | Oh |
| 2007/0095034 A1 | 5/2007 | Han et al. |
| 2007/0143953 A1 | 6/2007 | Hwang et al. |
| 2007/0199284 A1 | 8/2007 | Yoo et al. |
| 2007/0209519 A1 | 9/2007 | Conrad |
| 2007/0226947 A1 | 10/2007 | Kang |
| 2007/0240275 A1 | 10/2007 | Willenburg |
| 2007/0246579 A1 | 10/2007 | Blateri |
| 2007/0251048 A1 | 11/2007 | Choi |
| 2007/0271724 A1 | 11/2007 | Hakan et al. |
| 2007/0289085 A1 | 12/2007 | Yoo |
| 2007/0289264 A1 | 12/2007 | Oh |
| 2007/0289266 A1 | 12/2007 | Oh |
| 2008/0172821 A1 | 1/2008 | Kang et al. |
| 2008/0040883 A1 | 2/2008 | Beskow et al. |
| 2008/0047091 A1 | 2/2008 | Nguyen |
| 2008/0052872 A1 | 3/2008 | Cho |
| 2008/0083085 A1 | 4/2008 | Genn |
| 2008/0104793 A1 | 5/2008 | Kang et al. |
| 2008/0109972 A1 | 5/2008 | Mah et al. |
| 2008/0115312 A1 | 5/2008 | DiPasquale et al. |
| 2008/0134460 A1 | 6/2008 | Conrad |
| 2008/0134462 A1 | 6/2008 | Jansen et al. |
| 2008/0172992 A1 | 7/2008 | Conrad |
| 2008/0172995 A1 | 7/2008 | Conrad |
| 2008/0178416 A1 | 7/2008 | Conrad |
| 2008/0178420 A1 | 7/2008 | Conrad |
| 2008/0184893 A1 | 8/2008 | Oh |
| 2008/0190080 A1 | 8/2008 | Oh et al. |
| 2008/0196194 A1 | 8/2008 | Conrad |
| 2008/0196195 A1 | 8/2008 | Conrad |
| 2008/0209666 A1 | 9/2008 | Conrad |
| 2008/0216282 A1 | 9/2008 | Conrad |
| 2008/0244858 A1 | 10/2008 | Shaver et al. |
| 2008/0250601 A1 | 10/2008 | Coburn |
| 2008/0256744 A1 | 10/2008 | Rowntreer et al. |
| 2008/0264016 A1 | 10/2008 | Oh et al. |
| 2009/0000054 A1 | 1/2009 | Hampton et al. |
| 2009/0031522 A1 | 2/2009 | Yoo |
| 2009/0044371 A1 | 2/2009 | Yoo et al. |
| 2009/0056290 A1 | 3/2009 | Oh et al. |
| 2009/0106932 A1 | 4/2009 | Courtney |
| 2009/0113659 A1 | 5/2009 | Jeon et al. |
| 2009/0144929 A1 | 6/2009 | Yoo |
| 2009/0144932 A1 | 6/2009 | Yoo |
| 2009/0165239 A1 | 7/2009 | Frantzen et al. |
| 2009/0165242 A1 | 7/2009 | Lee et al. |
| 2009/0173365 A1 | 7/2009 | Conrad |
| 2009/0205160 A1 | 8/2009 | Conrad |
| 2009/0205161 A1 | 8/2009 | Conrad |
| 2009/0241284 A1 | 10/2009 | Mayes |
| 2009/0265877 A1 | 10/2009 | Dyson et al. |
| 2009/0265883 A1 | 10/2009 | Reed et al. |
| 2009/0282639 A1 | 11/2009 | Dyson et al. |
| 2009/0289089 A1 | 11/2009 | Fullerton et al. |
| 2009/0300873 A1 | 12/2009 | Grey |
| 2009/0307864 A1 | 12/2009 | Dyson |
| 2009/0313958 A1 | 12/2009 | Gomicaiaga-Pereda et al. |
| 2010/0005611 A1 | 1/2010 | Hong et al. |
| 2010/0043170 A1 | 2/2010 | Zugen |
| 2010/0045215 A1 | 2/2010 | Hawker et al. |
| 2010/0071153 A1 | 3/2010 | Genn |
| 2010/0083459 A1 | 4/2010 | Beskow |
| 2010/0095476 A1 | 4/2010 | Kim et al. |
| 2010/0154150 A1 | 6/2010 | Mcleod |
| 2010/0162515 A1 | 7/2010 | Stephens |
| 2010/0175217 A1 | 7/2010 | Conrad |
| 2010/0175219 A1 | 7/2010 | Soen et al. |
| 2010/0186189 A1 | 7/2010 | Ruben |
| 2010/0224073 A1 | 9/2010 | Oh et al. |
| 2010/0229322 A1 | 9/2010 | Conrad |
| 2010/0229336 A1 | 9/2010 | Conrad |
| 2010/0229338 A1 | 9/2010 | Conrad |
| 2010/0242222 A1 | 9/2010 | Conrad |
| 2010/0242421 A1 | 9/2010 | Conrad et al. |
| 2010/0293745 A1 | 11/2010 | Coburn |
| 2011/0023262 A1 | 2/2011 | Conrad |
| 2011/0219566 A1 | 9/2011 | Dyson et al. |
| 2011/0219571 A1 | 9/2011 | Dyson et al. |
| 2011/0219573 A1 | 9/2011 | Conrad |
| 2011/0219574 A1 | 9/2011 | Conrad |
| 2011/0219577 A1 | 9/2011 | Conrad |
| 2011/0314629 A1 | 12/2011 | Conrad |
| 2011/0314630 A1 | 12/2011 | Conrad |
| 2012/0000030 A1 | 1/2012 | Conrad |
| 2012/0030895 A1 | 2/2012 | Chong et al. |
| 2012/0030896 A1 | 2/2012 | Crouch et al. |
| 2012/0036675 A1* | 2/2012 | Conrad ............... B01D 45/12 |
| | | 15/347 |
| 2012/0079671 A1 | 4/2012 | Stickney et al. |
| 2012/0159734 A1 | 6/2012 | Jujiwara |
| 2012/0222235 A1 | 9/2012 | Lenkiewicz et al. |
| 2012/0222245 A1 | 9/2012 | Conrad |
| 2012/0222252 A1 | 9/2012 | Conrad |
| 2012/0272472 A1 | 11/2012 | Conrad |
| 2013/0091660 A1 | 4/2013 | Smith |
| 2013/0091661 A1 | 4/2013 | Smith |
| 2013/0091812 A1 | 4/2013 | Smith |
| 2013/0091813 A1 | 4/2013 | Smith |
| 2013/0104335 A1 | 5/2013 | Conrad |
| 2013/0269146 A1 | 10/2013 | Conrad |
| 2013/0269147 A1 | 10/2013 | Conrad |
| 2014/0090341 A1 | 4/2014 | Chen |
| 2014/0237757 A1 | 8/2014 | Conrad |
| 2014/0237758 A1 | 8/2014 | Conrad |
| 2014/0237759 A1 | 8/2014 | Conrad |
| 2014/0237768 A1 | 8/2014 | Conrad |
| 2014/0366314 A1 | 12/2014 | Conrad |
| 2015/0000077 A1 | 1/2015 | Conrad |
| 2015/0257616 A1 | 9/2015 | Bassett et al. |

(56) References Cited

U.S. PATENT DOCUMENTS

| | | |
|---|---|---|
| 2016/0015230 A1 | 1/2016 | Conrad et al. |
| 2016/0198914 A1 | 7/2016 | Conrad |
| 2016/0367094 A1 | 12/2016 | Conrad |
| 2017/0156559 A1 | 6/2017 | Krebs et al. |
| 2018/0177366 A1 | 6/2018 | Conrad |
| 2018/0242804 A1 | 8/2018 | Pan et al. |
| 2019/0200829 A1 | 7/2019 | Conrad |

FOREIGN PATENT DOCUMENTS

| | | |
|---|---|---|
| CA | 2675723 A1 | 6/2008 |
| CA | 2658005 A1 | 9/2010 |
| CA | 2658014 A1 | 9/2010 |
| CA | 2658381 A1 | 9/2010 |
| CA | 2658651 A1 | 9/2010 |
| CA | 2659212 A1 | 9/2010 |
| CA | 2674056 A1 | 9/2010 |
| CA | 2674761 A1 | 9/2010 |
| CA | 2678119 A1 | 9/2010 |
| CA | 2755305 A1 | 9/2010 |
| CA | 2755307 A1 | 9/2010 |
| CA | 2730689 A1 | 9/2011 |
| CA | 2574291 C | 8/2013 |
| CA | 2677530 C | 1/2014 |
| CN | 2524655 Y | 12/2002 |
| CN | 2534954 Y | 2/2003 |
| CN | 1626025 A | 6/2005 |
| CN | 1765283 A | 5/2006 |
| CN | 1806741 A | 7/2006 |
| CN | 1911151 A | 2/2007 |
| CN | 101061932 A | 10/2007 |
| CN | 101095604 A | 1/2008 |
| CN | 201101488 Y | 8/2008 |
| CN | 101288572 A | 10/2008 |
| CN | 101357051 A | 2/2009 |
| CN | 101448447 A | 6/2009 |
| CN | 101489455 A | 7/2009 |
| CN | 101489457 A | 7/2009 |
| CN | 101489461 A | 7/2009 |
| CN | 201523596 | 7/2010 |
| CN | 101822506 A | 9/2010 |
| CN | 201683850 U | 12/2010 |
| CN | 102256523 A | 11/2011 |
| CN | 202173358 U | 3/2012 |
| CN | 101631494 B | 4/2012 |
| CN | 202699035 U | 1/2013 |
| CN | 103040412 A | 4/2013 |
| CN | 103040413 A | 4/2013 |
| CN | 103169420 A | 6/2013 |
| CN | 203724037 U | 7/2014 |
| DE | 3734355 C2 | 6/1989 |
| DE | 3743083 C2 | 8/1997 |
| DE | 202005020767 | 8/2006 |
| DE | 112007003039 T5 | 10/2009 |
| DE | 112007003052 T5 | 1/2010 |
| DE | 112010001135 T5 | 8/2012 |
| EP | 0489468 A1 | 6/1992 |
| EP | 887040 A1 | 12/1998 |
| EP | 1356755 A2 | 10/2003 |
| EP | 1674009 A2 | 6/2006 |
| EP | 1938736 A2 | 7/2008 |
| EP | 1771104 B1 | 9/2008 |
| EP | 966912 B1 | 3/2010 |
| EP | 2049000 B1 | 6/2011 |
| EP | 1356755 B1 | 5/2012 |
| EP | 2201875 B1 | 4/2013 |
| EP | 1629758 B1 | 10/2013 |
| FR | 2812531 B1 | 11/2004 |
| GB | 2035787 | 10/1982 |
| GB | 2251178 A | 7/1992 |
| GB | 2268875 A | 1/1994 |
| GB | 2365324 B1 | 7/2002 |
| GB | 2377880 | 1/2003 |
| GB | 2409404 B | 11/2005 |
| GB | 2441962 A | 3/2008 |
| GB | 2466290 A | 6/2010 |
| GB | 2478614 B | 2/2012 |
| GB | 2458243 B | 4/2012 |
| GB | 2484146 B | 2/2013 |
| GB | 2478599 | 7/2014 |
| JP | 609203 | 9/1983 |
| JP | 745201 | 10/1983 |
| JP | 649078 | 4/1985 |
| JP | 6049084 | 4/1985 |
| JP | 60220027 A | 11/1985 |
| JP | 679295 | 5/1986 |
| JP | 679390 | 5/1986 |
| JP | 679426 | 5/1986 |
| JP | 679806 | 5/1986 |
| JP | 61131720 | 6/1986 |
| JP | 706192 | 5/1987 |
| JP | 706193 | 5/1987 |
| JP | 725983 | 2/1988 |
| JP | 726042 | 3/1988 |
| JP | 726318 | 3/1988 |
| JP | 743059 | 9/1988 |
| JP | 743445 | 9/1988 |
| JP | 743603 | 9/1988 |
| JP | 743618 | 9/1988 |
| JP | 743619 | 9/1988 |
| JP | 745200 | 10/1988 |
| JP | 63246116 A | 10/1988 |
| JP | 943287 | 11/1988 |
| JP | 6415020 | 1/1989 |
| JP | 1310024 | 12/1989 |
| JP | 788427 | 2/1990 |
| JP | 788426 | 5/1990 |
| JP | 8289861 A | 11/1996 |
| JP | 2000083879 | 3/2000 |
| JP | 2000140533 A1 | 5/2000 |
| JP | 1115813 | 7/2001 |
| JP | 2005040246 A1 | 2/2005 |
| JP | 2005087508 Y | 4/2005 |
| JP | 1370915 | 10/2009 |
| JP | 2009261501 A | 11/2009 |
| JP | 2010227287 A | 10/2010 |
| KR | 30-0360565 | 9/2004 |
| WO | 9619294 A1 | 6/1996 |
| WO | 2004069021 A1 | 8/2004 |
| WO | 2005089618 A3 | 2/2006 |
| WO | 2006026414 A3 | 8/2007 |
| WO | 2007104138 A1 | 9/2007 |
| WO | 2008009883 A1 | 1/2008 |
| WO | 2008009887 A1 | 1/2008 |
| WO | 2008009888 A | 1/2008 |
| WO | 2008009890 A1 | 1/2008 |
| WO | 2007084699 A3 | 2/2008 |
| WO | 2008017802 A1 | 2/2008 |
| WO | 2008035032 A2 | 3/2008 |
| WO | 2008135708 A1 | 5/2008 |
| WO | 2008070966 A1 | 6/2008 |
| WO | 2008070980 A1 | 6/2008 |
| WO | 2009026709 A1 | 3/2009 |
| WO | 2010102396 A1 | 9/2010 |
| WO | 2010102410 A1 | 9/2010 |
| WO | 2010102411 A1 | 9/2010 |
| WO | 2011054106 A1 | 5/2011 |
| WO | 2012042240 | 4/2012 |

OTHER PUBLICATIONS

English machine translation of JP2005040246, published on Feb. 17, 2005.
English machine translation of the Abstract of JP2005087508, published on Apr. 7, 2005.
English machine translation of JP2009261501, published on Nov. 12, 2009.
English machine translation of JP2010227287, published on Oct. 14, 2010.
English machine translation of KR30-0360565, published on Sep. 1, 2004.
English machine translation of FR2812531, published on Nov. 5, 2004.

(56) References Cited

OTHER PUBLICATIONS

What's the Best vacuum.com Forum discussion Dyson DC16 Root 6 Hand Held Vacuum Cleaner; http://www.abbysguide.com/vacuum/legacy/cgi-bin/yabb/2618-YaBB.html; dated Oct. 21, 2006.
English machine translation of JP60220027A, published on Nov. 2, 1985.
English machine translation of JP61131720, published on Jun. 19, 1986.
English machine translation of JP63246116, published on Oct. 13, 1988.
English machine translation of CN2524655Y, published on Dec. 11, 2002.
English machine translation of CN1626025, published on Jun. 15, 2005.
English machine translation of CN1911151A, published on Feb. 14, 2007.
English machine translation of CN101061932A, published on Oct. 31, 2007.
English machine translation of CN101095604A, published on Jan. 2, 2008.
English machine translation of CN101448447, published on Jun. 3, 2009.
English machine translation of CN101489461, published on Jul. 22, 2009.
English machine translation of CN101489457, published on Jul. 22, 2009.
English machine translation of CN101489455, published on Jul. 22, 2009.
English machine translation of CN201523596, published on Sep. 8, 2016.
English machine translation of CN101822506, published on Sep. 8, 2010.
English machine translation of CN201683850, published on Dec. 29, 2010.
English machine translation of CN102256523, published on Nov. 5, 2014.
English machine translation of CN202173358, published on Mar. 28, 2012.
English machine translation of CN101631494, publoished on Apr. 25, 2012.
English machine translation of CN202699035, published on Jan. 3-0, 2013.
English machine translation of CN103040413A, published on Apr. 17, 2013.
English machine translation of CN103040412A, published on Apr. 17, 2013.
English machine translation of CN103169420, published on Jun. 26, 2013.
English machine translation of CN203724037, published on Jul. 23, 2014.
English machine translation of DE3734355, published on Jun. 29, 1969.
English machine translation of DE3743083. published on Aug. 7, 1997.
English machine translation of DE202005020767, published on Aug. 10, 2006.
English machine translation of DE112007003039, published on Oct. 29, 2009.
English machine translation of DE112007003052, published on Jan. 14, 2010.
English machine translation of DE112010001135, published by Aug. 2, 2012.

\* cited by examiner

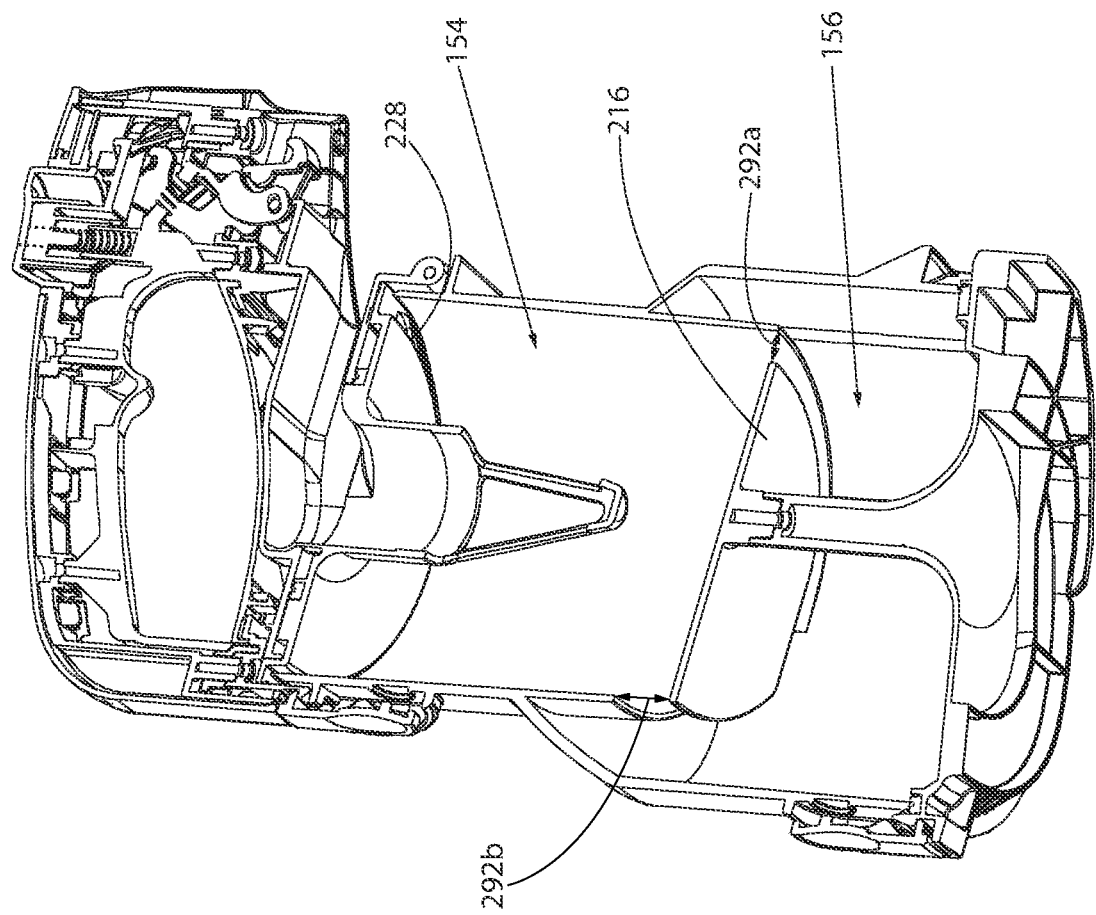

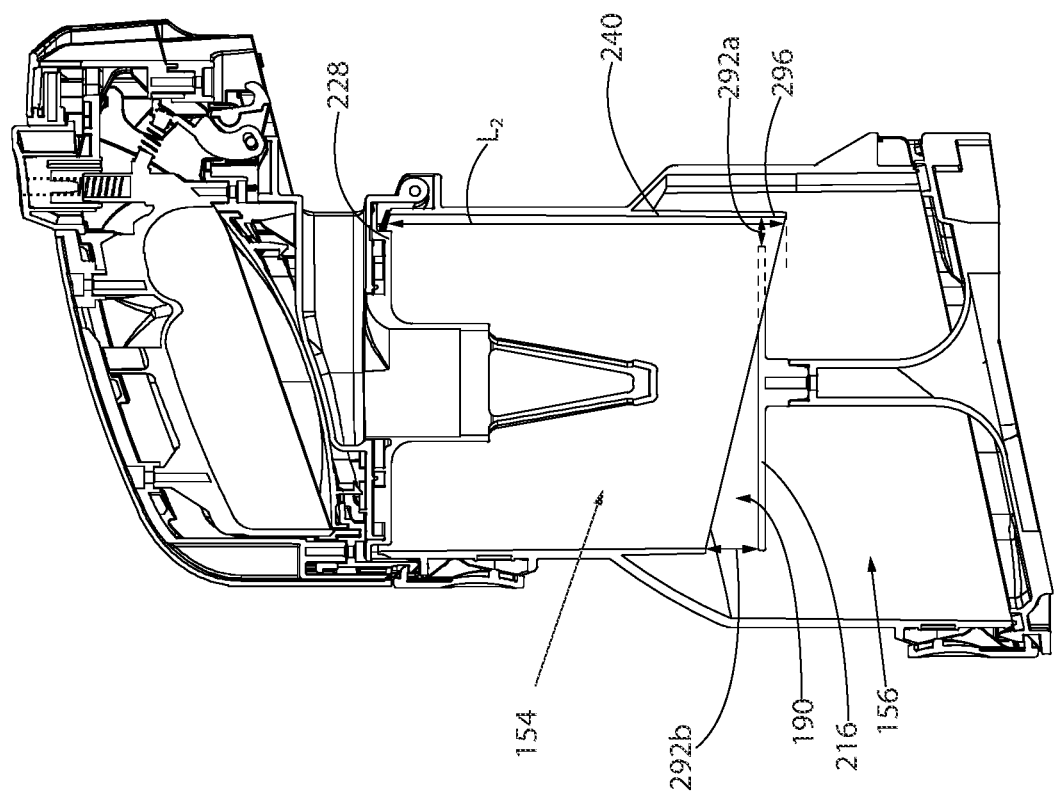

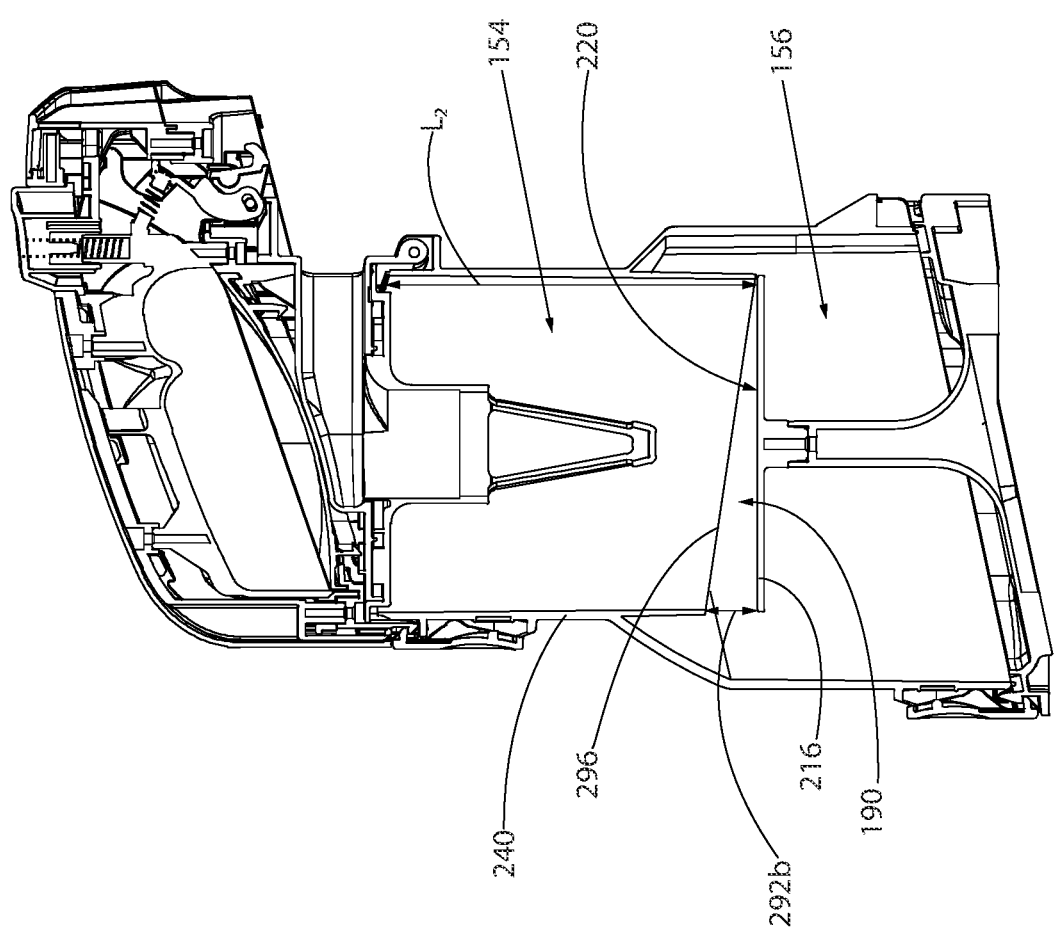

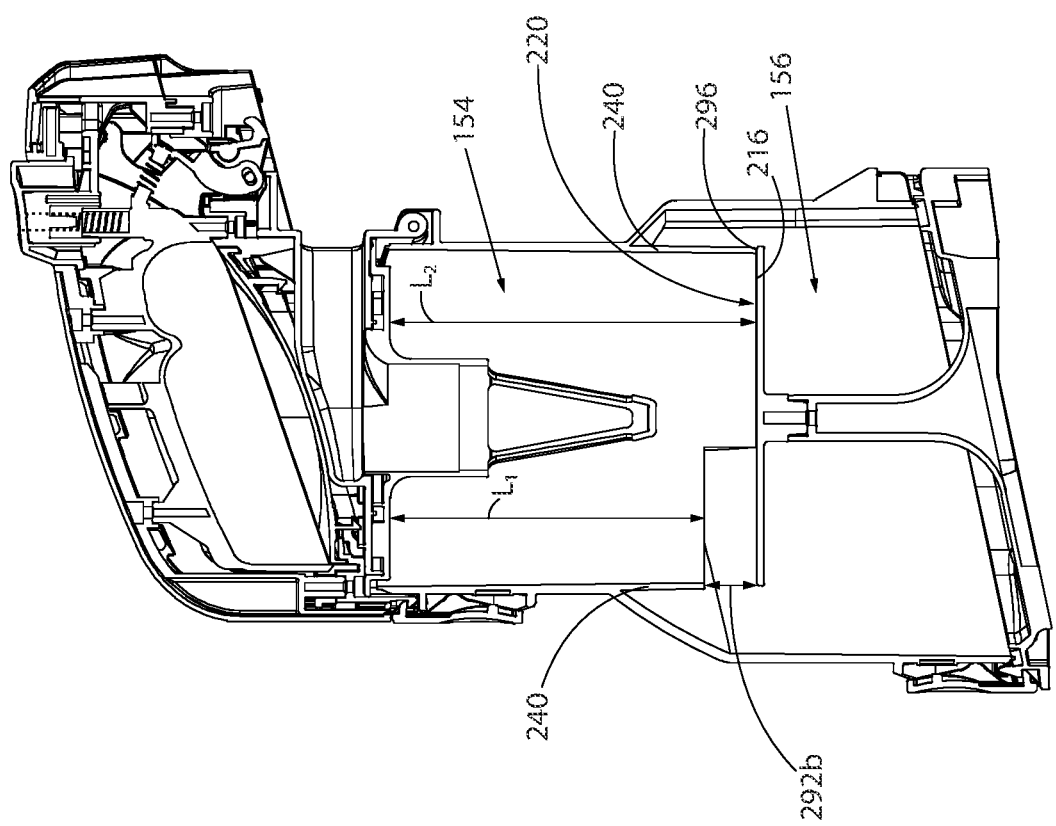

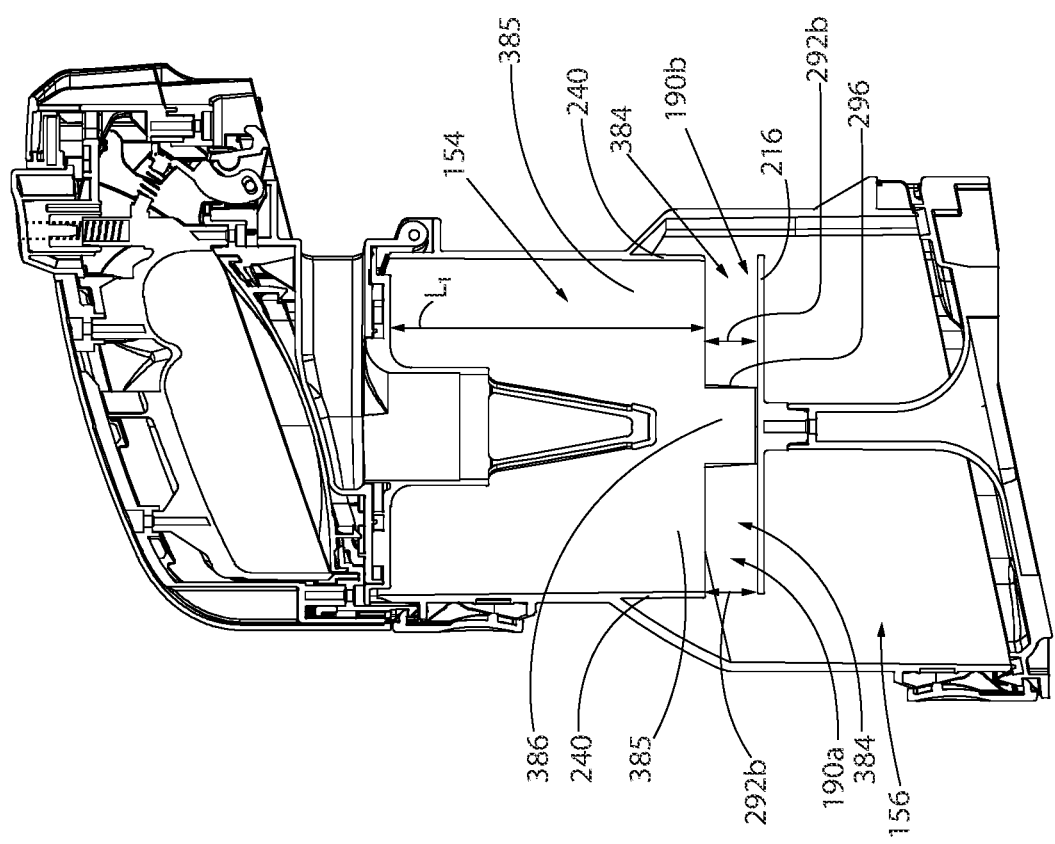

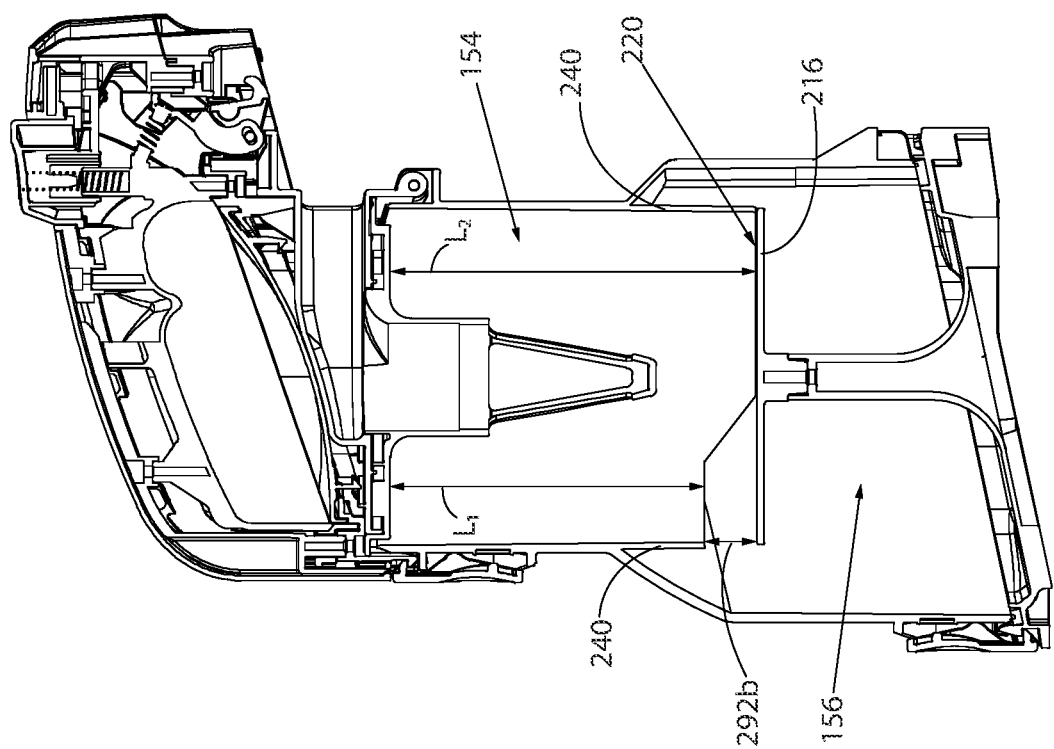

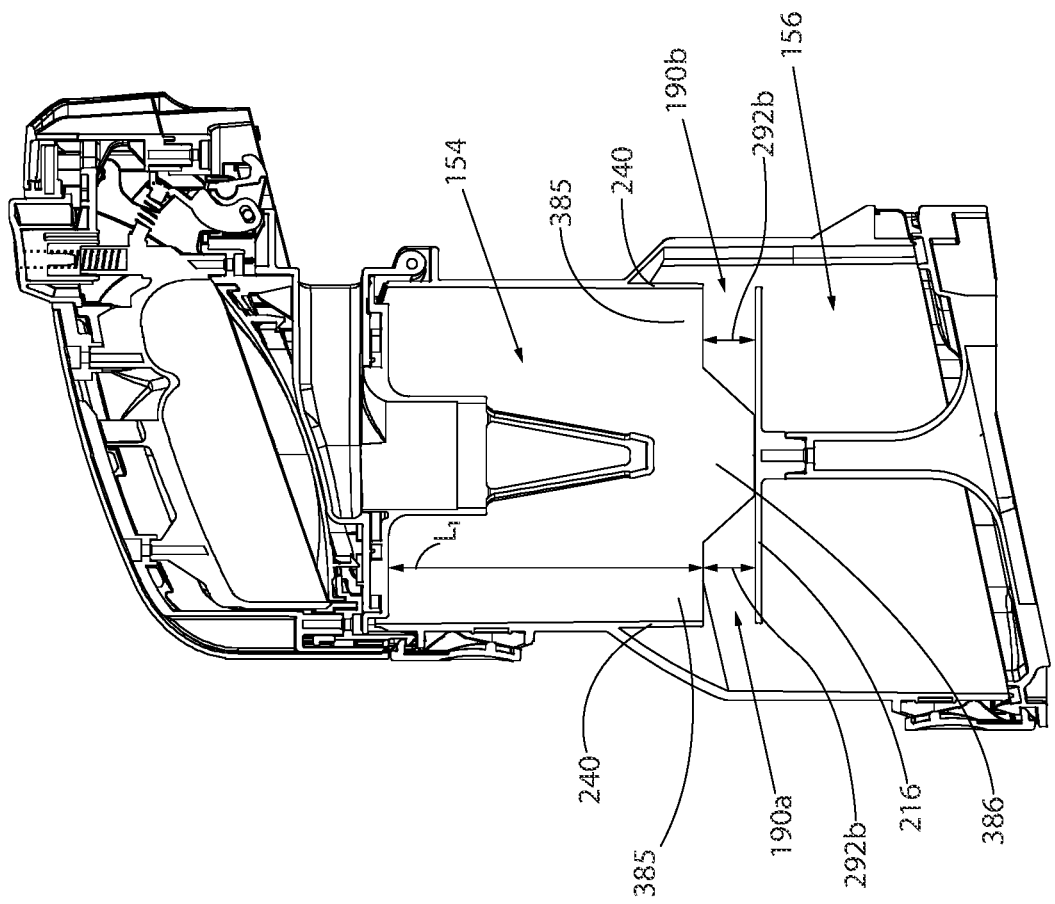

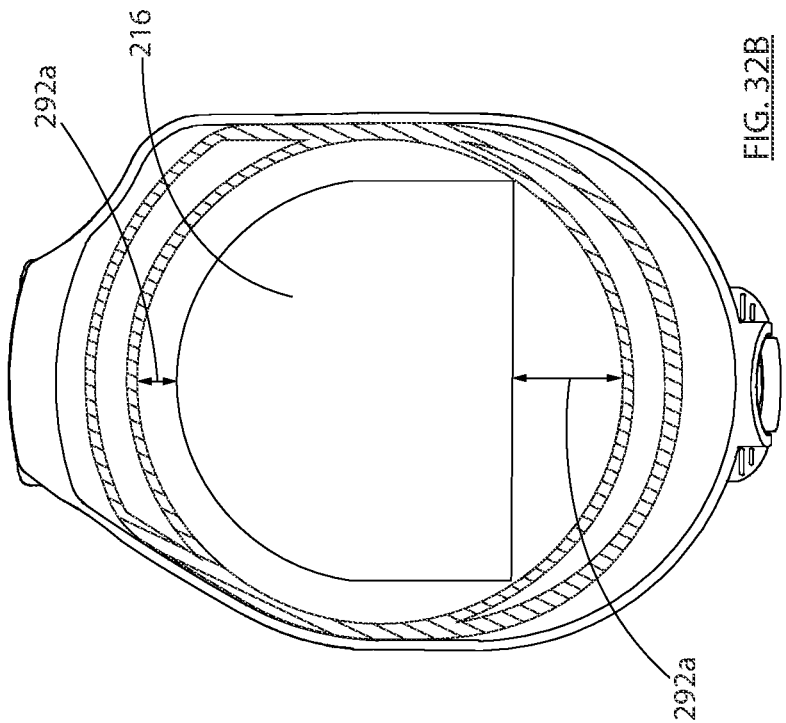
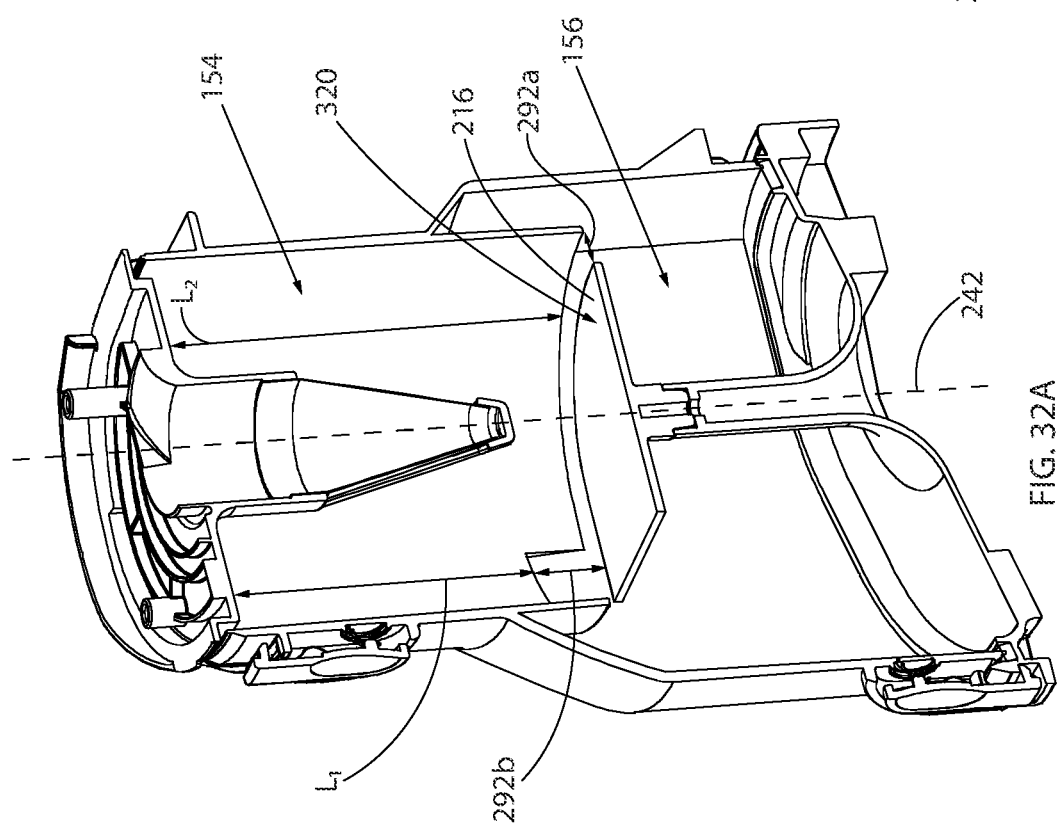

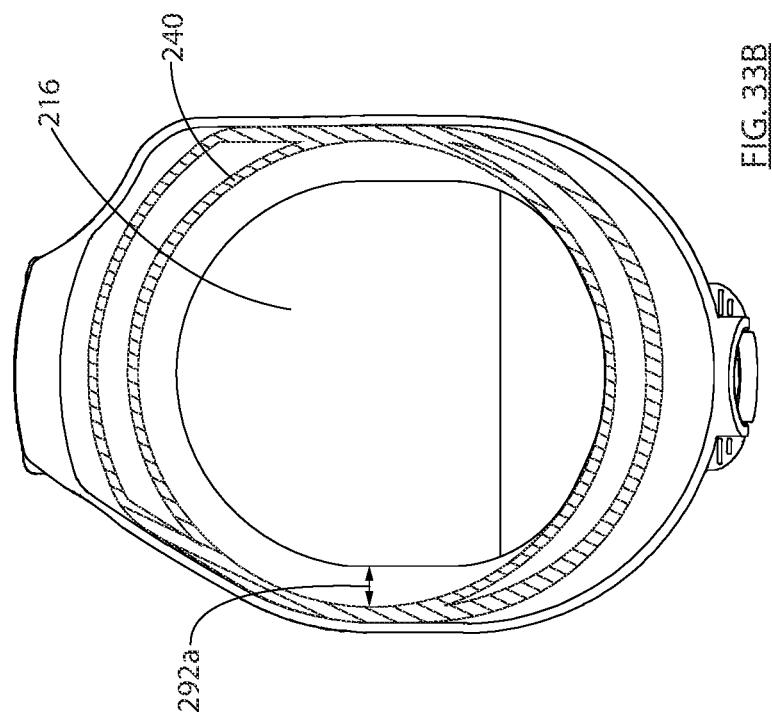
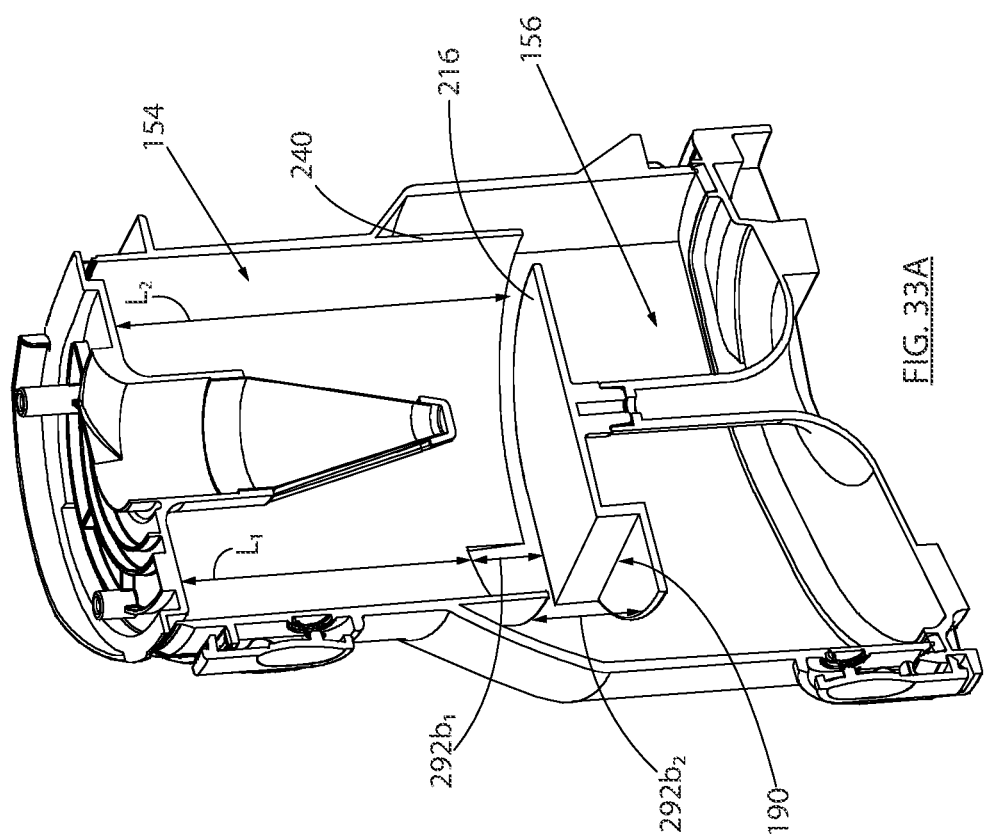
FIG. 33B
FIG. 33A

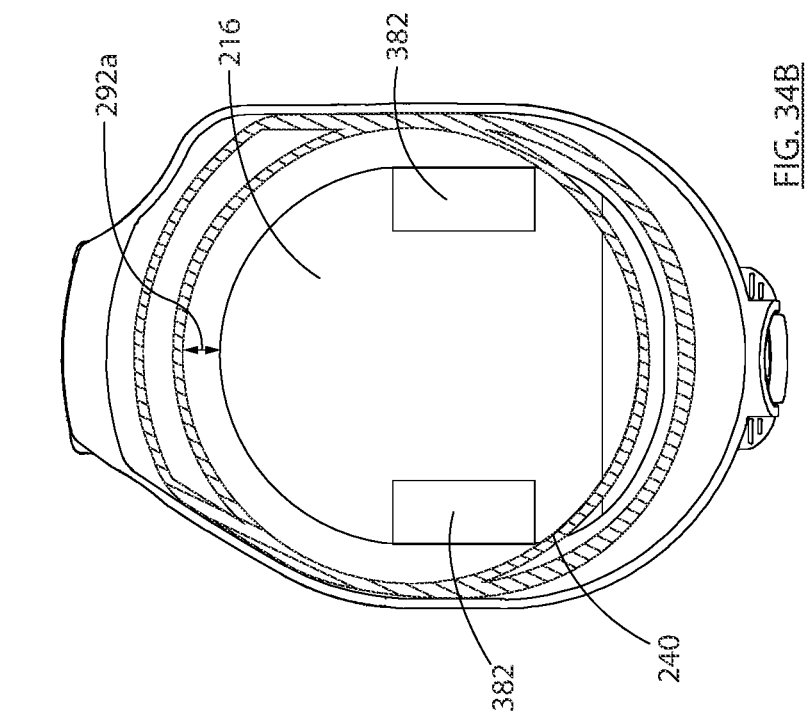
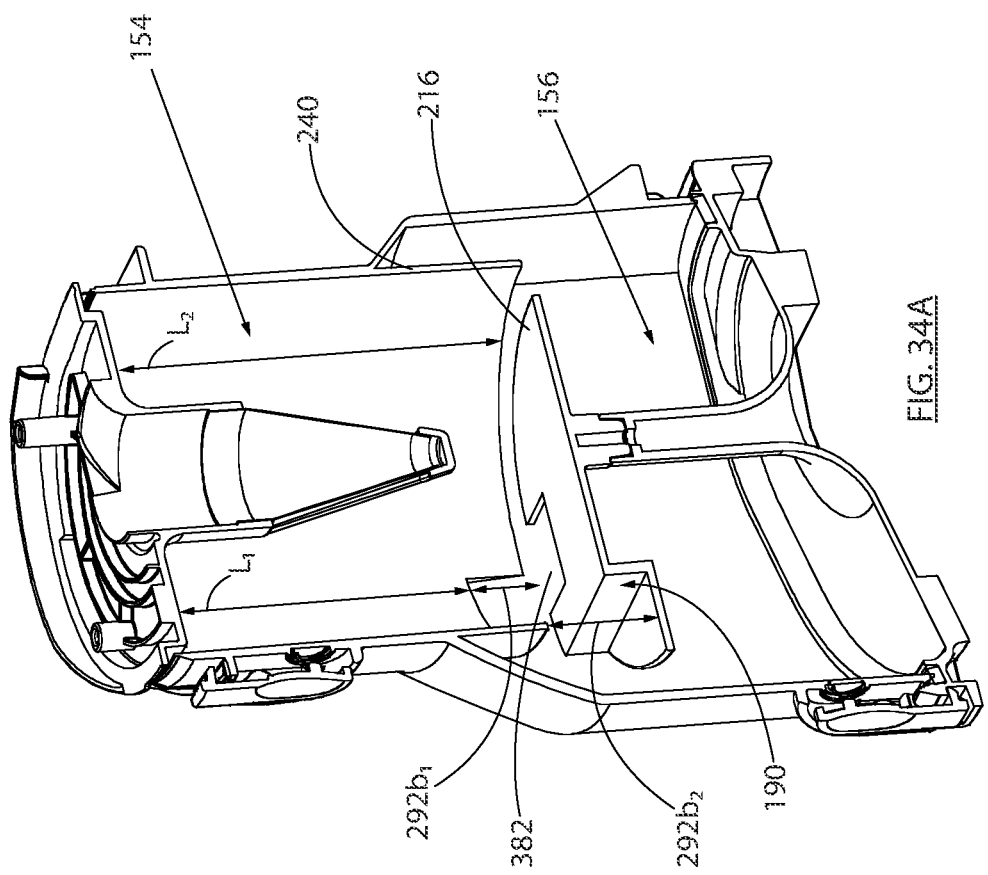
FIG. 34B
FIG. 34A

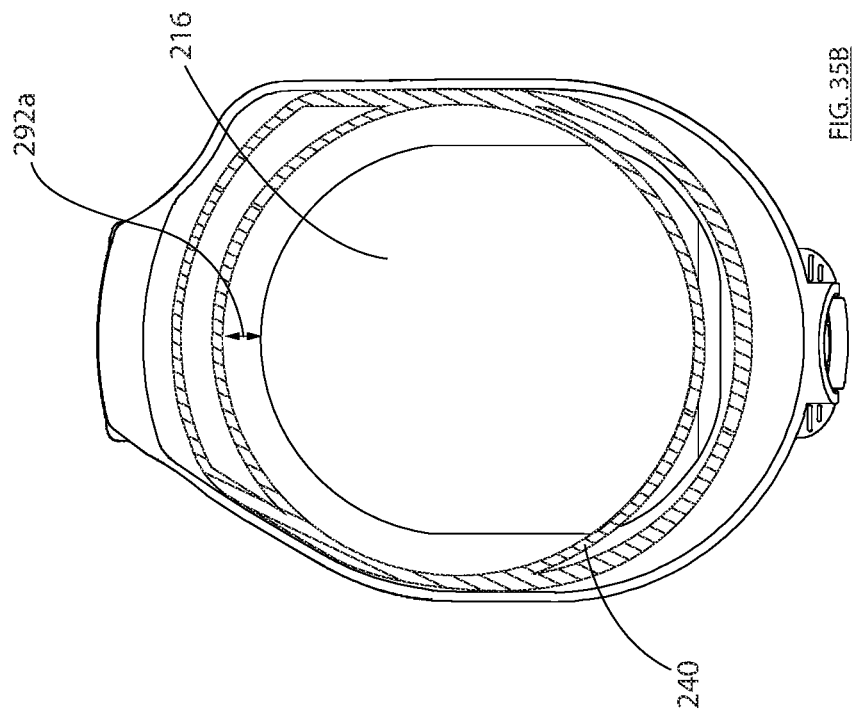
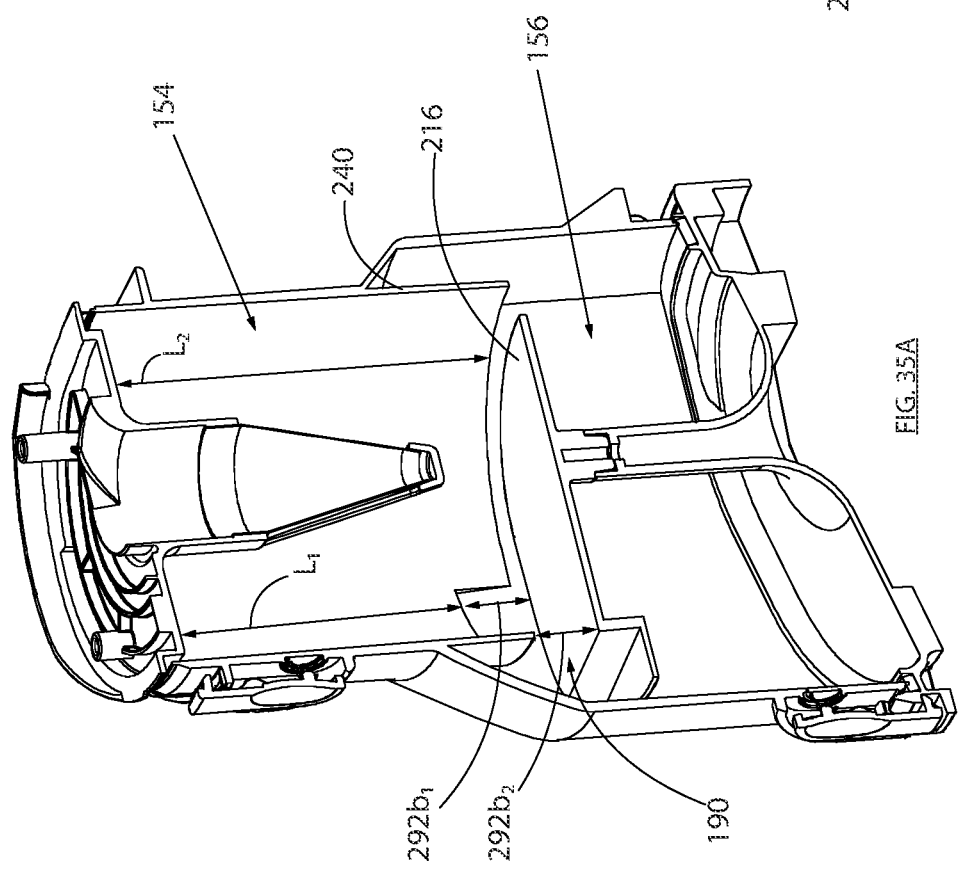
FIG. 35A
FIG. 35B

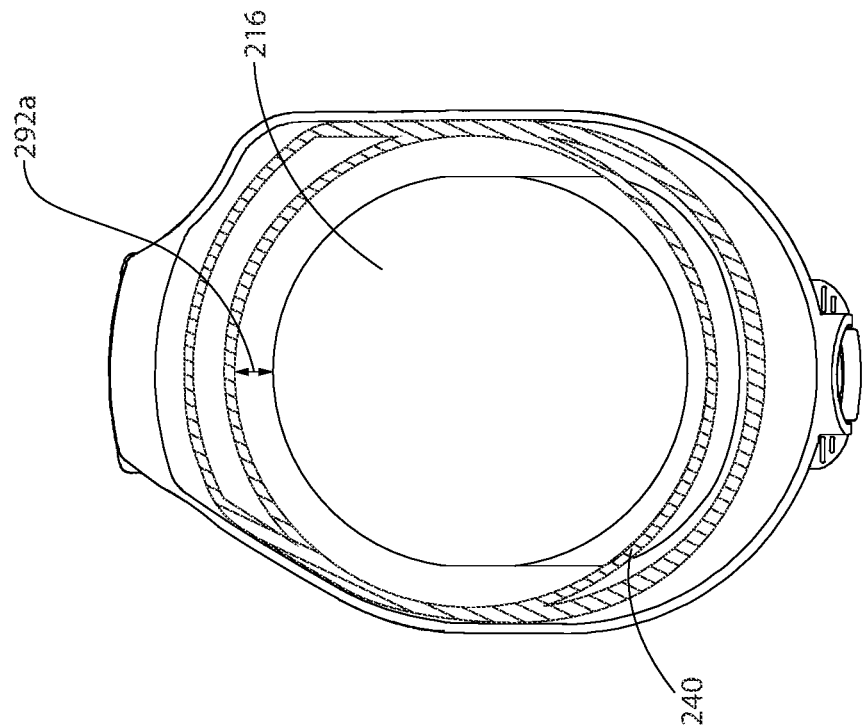
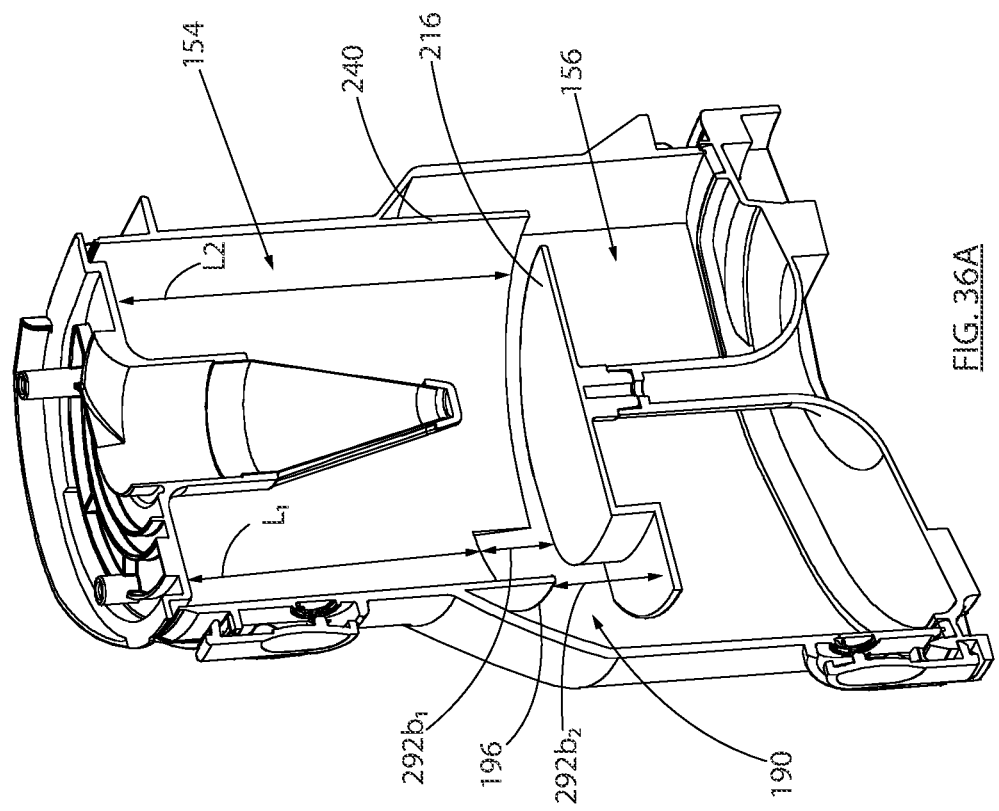
FIG. 36A
FIG. 36B

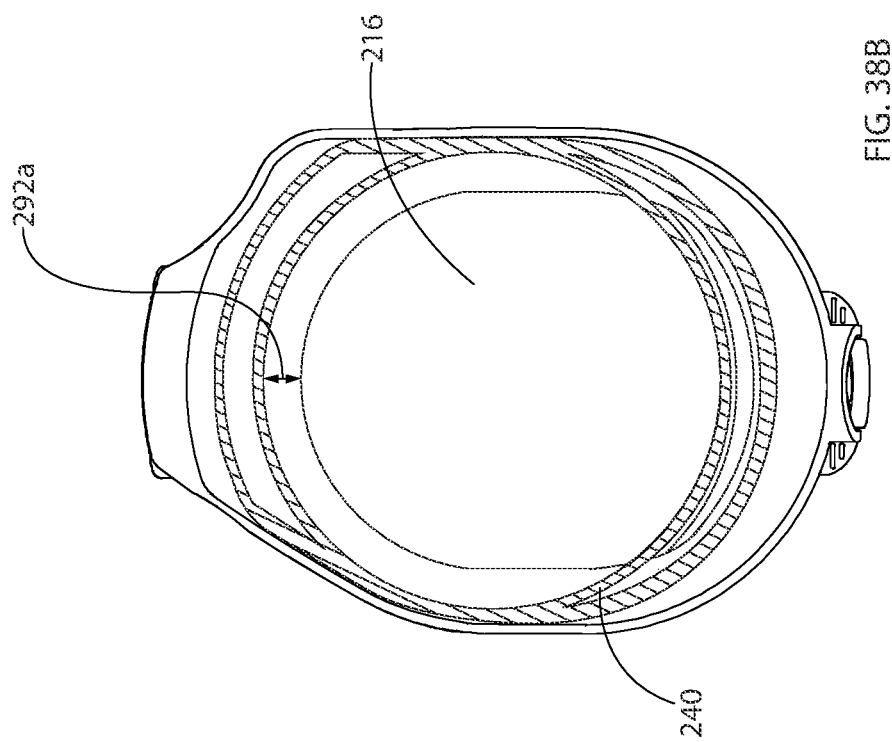
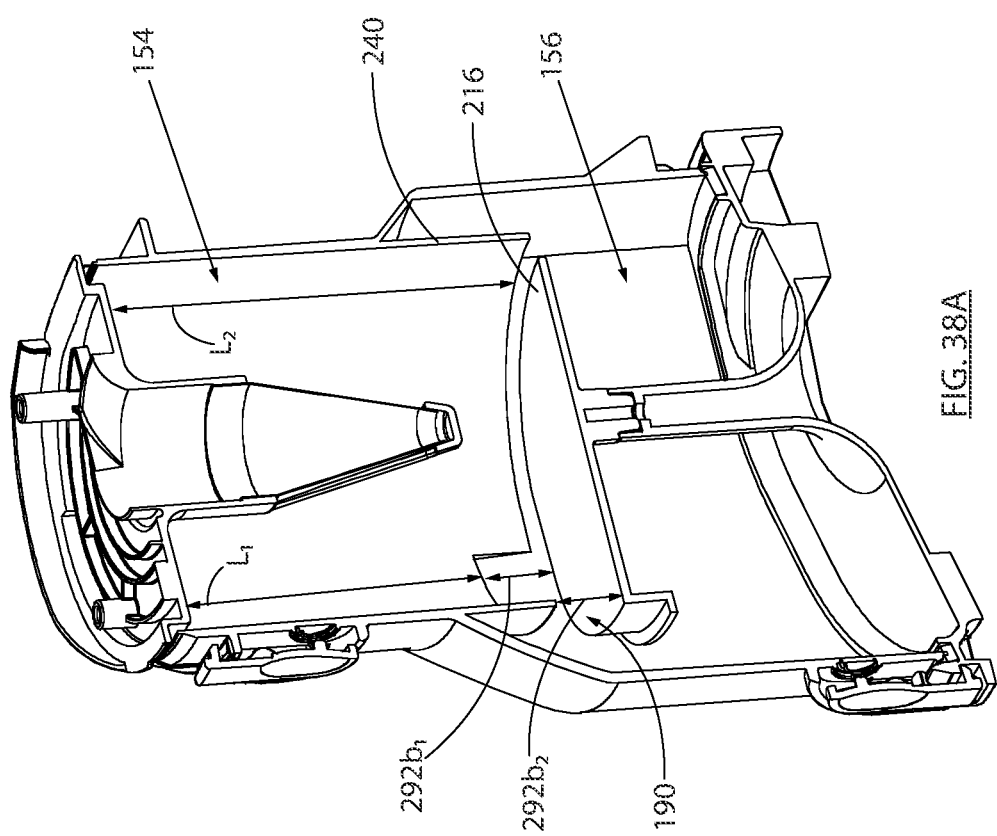
FIG. 38B
FIG. 38A

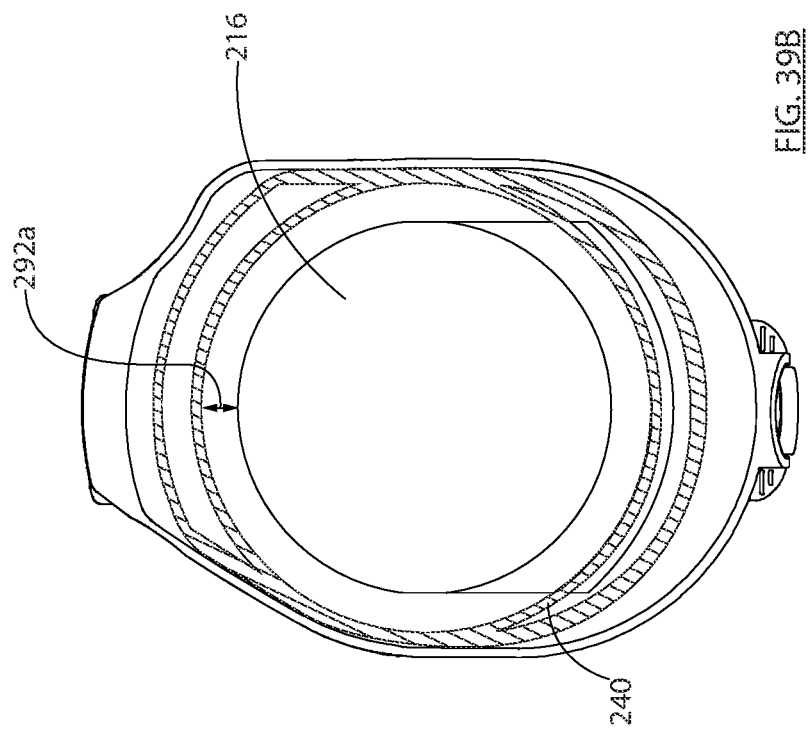
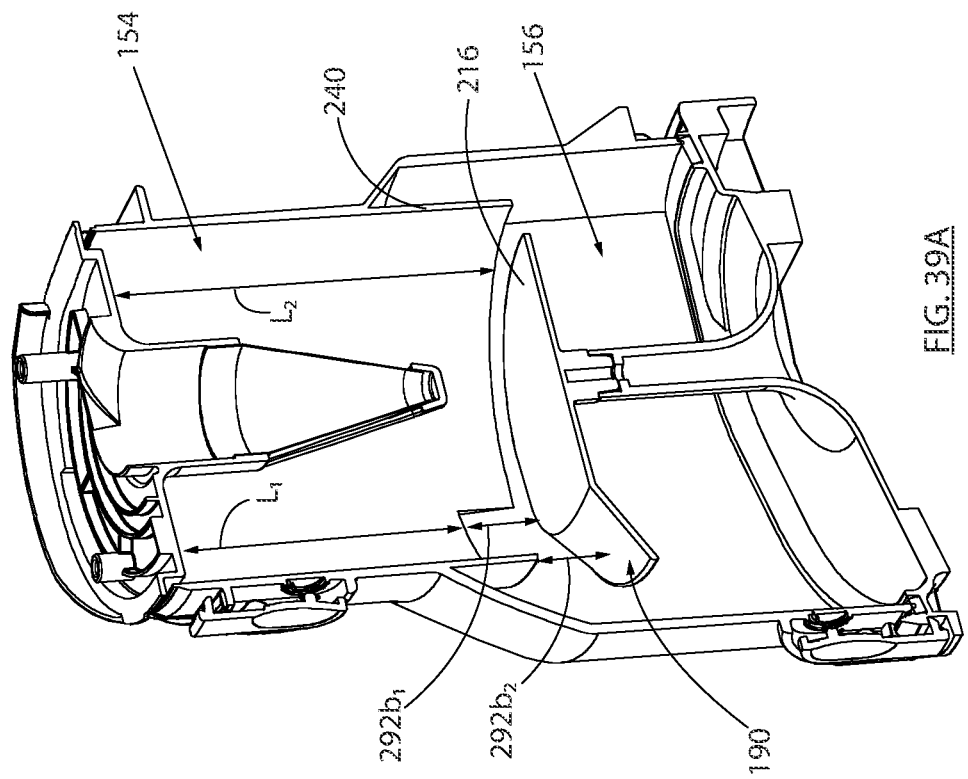

SURFACE CLEANING APPARATUS WITH AN EXTERNAL DIRT CHAMBER

CROSS-REFERENCE TO RELATED APPLICATIONS

This application is:
1. a continuation of U.S. patent application Ser. No. 16/847,476 filed on Apr. 13, 2020, now allowed, which itself is a continuation of U.S. patent application Ser. No. 16/100,624, filed on Aug. 10, 2018, issued as U.S. Pat. No. 10,667,663 on Jun. 2, 2020, which itself is a continuation-in-part of U.S. patent application Ser. No. 15/937,220 filed on Mar. 27, 2018, issued as U.S. Pat. No. 10,791,895 on Oct. 6, 2020, and this application is also:
2. a continuation-in-part of U.S. patent application Ser. No. 16/450,304, filed on Jun. 24, 2019, which itself is a continuation of U.S. patent application Ser. No. 15/184,954, filed on Jun. 16, 2016, issued as U.S. Pat. No. 10,376,112 on Aug. 13, 2019, which itself is:
   (i) a continuation of U.S. patent application Ser. No. 13/779,405, filed on Feb. 27, 2013, issued as U.S. Pat. No. 9,433,332 on Sep. 6, 2016;
   (ii) a continuation-in-part of U.S. patent application Ser. No. 14/994,495, filed on Jan. 13, 2016, now abandoned, which is a continuation of U.S. patent application Ser. No. 13/039,376, filed on Mar. 3, 2011, issued as U.S. Pat. No. 9,265,395 on Feb. 23, 2016, which itself is a continuation-in-part of U.S. patent application Ser. No. 12/722,705, filed Mar. 12, 2010, issued as U.S. Pat. No. 8,578,555 on Nov. 12, 2013; and,
   (iii) a continuation of U.S. patent application Ser. No. 14/932,816 filed on Nov. 4, 2015, issued as U.S. Pat. No. 9,693,666 on Jul. 4, 2017, which itself is a continuation of U.S. patent application Ser. No. 13/040,676, filed on Mar. 4, 2011, issued as U.S. Pat. No. 9,211,044 on Dec. 15, 2015;

and this application is also:
3. a continuation-in-part of U.S. patent application Ser. No. 17/367,538, filed on Jul. 5, 2021, which itself is a continuation of U.S. patent application Ser. No. 17/196,380, filed on Mar. 9, 2021, which itself is a continuation of U.S. patent application Ser. No. 15/931,973, filed on May 14, 2020, which itself is a continuation of U.S. patent application Ser. No. 16/022,902, filed on Jun. 29, 2018, which itself is a continuation of U.S. patent application Ser. No. 15/012,783, filed on Feb. 1, 2016, issued as U.S. Pat. No. 10,548,442 on Feb. 4, 2020, which itself is a continuation of U.S. patent application Ser. No. 14/874,544, filed on Oct. 5, 2015, issued as U.S. Pat. No. 9,826,868 on Nov. 28, 2017, which itself is a continuation of U.S. patent application Ser. No. 13/255,875, filed on Sep. 9, 2011, issued as U.S. Pat. No. 9,204,769 on Dec. 8, 2015, which itself was a national phase entry of application PCT/CA2010/000342 filed on Mar. 9, 2010, and said patent application claimed priority from Canadian patent application no. 2,658,372, filed on Mar. 13, 2009, the disclosure of each of which is incorporated herein by reference in its entirety.

FIELD

This disclosure relates generally to surface cleaning apparatus. In a preferred embodiment, the surface cleaning apparatus comprises a cyclonic separator including a plate (also referred to as an arrester plate) at the dirt outlet end of a cyclone chamber.

INTRODUCTION

The following is not an admission that anything discussed below is part of the prior art or part of the common general knowledge of a person skilled in the art.

Various types of surface cleaning apparatus are known. Such surface cleaning apparatus include vacuum cleaners, including upright vacuum cleaners, hand carriable vacuum cleaners, canister-type vacuum cleaners and Shop-Vac™ type vacuum cleaners. Some vacuum cleaners include a cyclonic separator (also referred to as a cyclone bin assembly) having a cyclone chamber, a dirt collection chamber, and a plate at the dirt outlet end. See for example Conrad (U.S. Pat. No. 8,640,304).

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

During operation of a surface cleaning apparatus that uses a cyclone chamber with a dirt collection chamber exterior to the cyclone chamber, dirt particles that are entrained in an air stream entering a surface cleaning apparatus and which are disentrained during the passage of air through the cyclone chamber may exit the cyclone chamber via a dirt outlet and enter the dirt collection chamber. Dirt particles that are larger than the size of the dirt outlet (e.g., popcorn) may tend to accumulate in the cyclone chamber. If a sufficient amount of larger dirt particles accumulate in the cyclone chamber, this may reduce the dirt separation efficiency of the cyclone chamber. In order to permit the larger dirt particles to exit the cyclone chamber, the size of the dirt outlet may be increased. However, as the size of the dirt outlet is increased, the dirt separation efficiency of the cyclone chamber may be reduced. As set out in this disclosure, the dirt outlet may have portions having a different size. Accordingly, the dirt outlet may comprise a gap or spacing between an end wall of the cyclone chamber and the sidewall of the cyclone chamber. This gap or spacing may extend all the way around the perimeter of the end wall (which may be referred to as a plate and may be a moveably mounted plate). The gap or spacing may have one or more portions which have a larger size (e.g., in the axial or vertical direction of the cyclone axis of rotation and/or a direction at an angle to the cyclone axis of rotation). This gap or spacing may be achieved by having the plate stepped in the axial direction and/or the plate having a non-circular shape (e.g., oval, D-shaped and different diameters in different directions).

According to a first aspect of this disclosure, which may be used by itself or in combination with one or more other aspects of this disclosure, a cyclone is provided at the dirt outlet end of the cyclone chamber with a plate that is stepped in the axial direction. The dirt outlet is defined at least in part by a gap between the plate and the sidewall of the cyclone chamber. Stepping the plate in the axial direction enables a portion of the plate to define a larger dirt outlet so as to enable larger dirt to exit the cyclone chamber.

In accordance with this aspect, there is provided a surface cleaning apparatus comprising:
(a) an air flow path extending from a dirty air inlet to a clean air outlet;
(b) a cyclone and a suction motor provided in the air flow path;
(c) the cyclone comprising a cyclone chamber having a central longitudinal axis, the cyclone having a first end having a first end wall, an axially spaced apart second end, a cyclone chamber sidewall located between the first and second ends, a cyclone air inlet provided at the first end, a cyclone air outlet provided at the first end and a dirt outlet provided at the second end, wherein a reference plane that is perpendicular to the central longitudinal axis extends through the cyclone chamber; and,
(d) a plate located at the second end, the plate having,
(i) a plate perimeter, a first portion, a second portion and a transition portion provided between the first and second portions, each of the first, second and transition portions of the plate having a cyclone chamber face wherein the cyclone chamber faces of the first and second portions of the plate face towards the first end and border different portions of the plate perimeter,
(ii) the second portion is spaced in a direction parallel to the central longitudinal axis further from the reference plane than the first portion,
(iii) the dirt outlet comprises a spacing between the cyclone chamber sidewall and the second portion of the plate,
(iv) the plate also having a dirt chamber face and a step volume, the step volume positioned axially between the cyclone chamber faces of the first and transition portions and the dirt chamber face whereby the dirt chamber face comprises a closure portion which underlies the step volume; and,
(e) a dirt collection region in communication with the cyclone chamber via the dirt outlet.

In any embodiment, the closure portion may extend at an angle to the central longitudinal axis.

In any embodiment, the first portion of the plate may be thicker than the second portion of the plate.

In any embodiment, a thickness of the first portion of the plate may increase towards the transition portion of the plate.

In any embodiment, a first discontinuity may be provided between the cyclone chamber face of the first portion of the plate and the cyclone chamber face of the transition portion and a second discontinuity may be provided between the cyclone chamber face of the transition portion and the cyclone chamber face of the second portion of the plate.

In any embodiment, the transition portion may extend generally axially.

In any embodiment, the first portion of the plate and the second portion of the plate may be generally planar.

In any embodiment, the dirt chamber face of the plate may be generally continuous.

In any embodiment, the dirt collection region may be axially spaced from and opposed to the first end of the cyclone.

In any embodiment, the closure portion may be planar.

In any embodiment, the closure portion may extend from a first end proximate a dirt chamber face of the second portion towards or across the central longitudinal axis to a second end, and the first end of the closure portion may be laterally spaced from the second end of the closure portion.

In accordance with this aspect, there is also provided a surface cleaning apparatus comprising:
(a) an air flow path extending from a dirty air inlet to a clean air outlet and including a cyclone chamber and a suction motor;
(b) a dirt collection region external to the cyclone chamber; and,
(c) a plate positioned between the cyclone chamber and the dirt collection region and defining a dirt outlet from the cyclone chamber to the dirt collection region, the plate having a cyclone chamber face facing the cyclone chamber, an opposed dirt collection face facing the dirt collection region, and first, second, and transition portions, wherein cyclone chamber faces of the first and second portions are connected by a cyclone chamber face of the transition portion and are different axial distances from a transverse plane that extends through the cyclone and that is perpendicular to a central longitudinal axis of the cyclone, and the dirt collection face closes a step volume bordered by the first and transition portions.

In any embodiment, the first portion of the plate may be thicker than the second portion of the plate.

In any embodiment, the dirt chamber face of the plate may be generally continuous.

In any embodiment, the dirt collection region may be axially spaced from and opposed to the first end of the cyclone.

In any embodiment, a first discontinuity may be provided between the cyclone chamber face of the first portion of the plate and the cyclone chamber face of the second portion of the plate.

In any embodiment, the first portion of the plate and the second portion of the plate maybe generally planar.

In any embodiment, the closure portion may extend at an angle to the central longitudinal axis.

In any embodiment, the closure portion may be planar.

In any embodiment, the closure portion may extend from a first end proximate a dirt chamber face of the second portion towards or across the central longitudinal axis to a second end, and the first end of the closure portion may be laterally spaced from the second end of the closure portion.

In accordance with another aspect, there is provided surface cleaning apparatus comprising:
(a) an air flow path extending from a dirty air inlet to a clean air outlet
(b) a cyclone provided in the air flow path, the cyclone comprising a cyclone chamber, a cyclone air inlet, a cyclone air outlet, a dirt outlet, a central longitudinally extending axis, the cyclone chamber having first and second axially opposed ends;
(c) a suction motor positioned in the air flow path;
(d) a dirt collection region external to the cyclone chamber; and,
(e) a plate positioned at the second end of the cyclone chamber, the plate having a cyclone chamber face facing the cyclone chamber, the cyclone chamber face having first and second portions, wherein the first portion of the cyclone chamber face and the second portion of the cyclone chamber face are different axial distances from a transverse reference plane that extends through the cyclone chamber and that is perpendicular to the central longitudinally extending axis of the cyclone,
wherein an annular gap between the plate and the cyclone extends around all of the plate and defines the dirt outlet of the cyclone chamber.

In any embodiment, the annular gap may have a radial distance between the plate and the cyclone and the radial distance may be constant.

In any embodiment, the annular gap may have a radial distance between the plate and the cyclone and the radial distance may vary at different locations around the plate.

In any embodiment, the plate may have a perimeter and the perimeter may extend generally continuously.

In any embodiment, the plate has a perimeter and the perimeter has two discontinuities.

In any embodiment, the plate may have a segment removed. Optionally, the annular gap may have a radial distance between the plate and the cyclone, the radial distance may vary at different locations around the plate and the radial distance may be increased at a location of the plate from which the segment has been removed. Alternately, or in addition, the second portion may be a greater axial distance from the transverse plane than the first portion and the location of the plate from which the segment has been removed may be the second portion.

In any embodiment, the second portion may be a greater axial distance from the transverse plane than the first portion and the second portion has a segment removed. Optionally, the annular gap may have a radial distance between the plate and the cyclone and the radial distance may be increased at a location of removal of the segment.

In any embodiment, the plate may be positioned between the cyclone chamber and the dirt collection region, the plate may have a dirt collection face facing the dirt collection region.

In any embodiment, the cyclone air inlet and the cyclone air outlet may be provided at the first end of the cyclone chamber, the cyclone air outlet may comprise a vortex finder and porous member positioned between the cyclone chamber and an inlet of the vortex finder, and the vortex finder and porous member may be spaced from the cyclone chamber face of the plate.

In any embodiment, the plate may be moveably mounted between a closed position, in which the plate is positioned for operation of the cyclone and an open position wherein the plate is moved to provide access to the cyclone chamber.

In any embodiment, the dirt collection region has an end wall facing the plate and the end wall may be openable. Optionally, the plate may be supported by the end wall and is moveable with the end wall.

In any embodiment, the plate has a dirt collection face facing the dirt collection region and the surface cleaning apparatus may further comprise a support member extending between the end wall and the dirt collection face. Optionally, the cyclone air inlet and the cyclone air outlet may be provided at the first end of the cyclone chamber, the cyclone air outlet may comprise a vortex finder and porous member positioned between the cyclone chamber and an inlet of the vortex finder, and the vortex finder and porous member may be spaced from the cyclone chamber face of the plate.

In any embodiment, the plate has a perimeter, the cyclone has a generally axially extending sidewall and the annular gap may be provided between the perimeter of the plate and the sidewall.

In any embodiment, the cyclone has an axially extending sidewall and the sidewall has an end face and at least a portion of the end wall may face the plate. Optionally, the plate has a perimeter, the dirt collection region has a sidewall and the annular gap may be provided between the perimeter of the plate and the sidewall.

According to another aspect of this disclosure, which may be used by itself or in combination with one or more other aspects of this disclosure, a cyclone is provided at the dirt outlet end of the cyclone chamber wherein the dirt outlet is formed by a variable spacing between the cyclone sidewall and a plate wherein the variable spacing is formed by varying the shape of the plate and/or the distance between the plate and the inlet end of the cyclone chamber.

In accordance with this aspect, there is provided a surface cleaning apparatus comprising:

(a) an air flow path extending from a dirty air inlet to a clean air outlet;

(b) a cyclone and a suction motor provided in the air flow path;

(c) the cyclone comprising a cyclone chamber having a central longitudinal axis, the cyclone having a first end having a first end wall, an axially spaced apart second end, a cyclone chamber sidewall located between the first and second ends, a cyclone air inlet provided at the first end, a cyclone air outlet provided at the first end and a dirt outlet provided at the second end, wherein the first end of the cyclone chamber sidewall is located at the first end of the cyclone and the second end of the sidewall is spaced from the first end;

(d) a plate located at the second end, the plate having a plate perimeter, a cyclone chamber face that faces towards the first end; and, (e) a dirt collection region in communication with the cyclone chamber via the dirt outlet, wherein the dirt outlet comprises a spacing between the cyclone chamber sidewall and the plate, which spacing extends around the entire plate perimeter, and wherein the spacing comprises a first portion that extends around a first portion of the perimeter and a second portion that extends around a second portion of the perimeter, wherein the second portion of the spacing has a larger length in at least one of the following directions:

(i) a vertical direction in a plane of the sidewall; and, (ii) a radial direction in a plane of the plate, and wherein the larger length is produced by at least one of:

(iii) a second part of the plate defining the second portion of the perimeter of the plate having a different diameter than a diameter of a first part of the plate defining the first portion of the perimeter of the plate; and, (iv) the second part the plate having a greater distance between the cyclone chamber face of the plate and the first end of the cyclone chamber than a distance of the first part of the plate and the first end of the cyclone chamber.

In any embodiment, a projection of the sidewall may intersect the plate and the spacing may comprise a gap between the second end of the sidewall and the cyclone chamber face of the plate.

In any embodiment, the larger length may be produced by the second part of the plate having a greater distance between the cyclone chamber face of the plate and the first end of the cyclone chamber than a distance of the first part of the plate and the first end of the cyclone chamber.

In any embodiment, the larger length may also be produced by a portion of the sidewall located at the second portion having a shorter axial length than another portion of the sidewall.

In any embodiment, the plate may have a smaller diameter that a diameter of the cyclone chamber whereby a projection of the sidewall extends radially outwardly of the plate and the spacing comprises a gap between the perimeter of the plate and the sidewall.

In any embodiment, the larger length may be produced by the second part of the plate having a different diameter than a diameter of the first part of the plate.

In any embodiment, the second portion of the perimeter of the plate may be generally linear.

In any embodiment, the second portion of the perimeter of the plate may be stepped inwardly in the plane of the plate from the first portion of the perimeter of the plate.

In any embodiment, the perimeter of the plate may face the sidewall.

In any embodiment, the plate may be positioned axially spaced below the second end of the sidewall.

In any embodiment, a projection of the sidewall may intersect only a part of the plate and the spacing may comprise a vertically extending gap between the second end of the sidewall and the cyclone chamber face of the plate and a radially extending gap between the perimeter of the plate and the sidewall.

In any embodiment, the larger length may be produced by the second part of the perimeter of the plate having a greater distance between the cyclone chamber face of the plate and the first end of the cyclone chamber than a distance of the first part of the plate and the first end of the cyclone chamber and by the second part of the plate having a different diameter than a diameter of the first part of the plate.

In any embodiment, the larger length may also be produced by a portion of the sidewall located at the second portion having a shorter axial length than another portion of the sidewall.

In any embodiment, the second portion of the perimeter of the plate may be generally linear.

In any embodiment, the second portion of the perimeter of the plate may be stepped inwardly in the plane of the plate from the first portion of the perimeter of the plate.

In any embodiment, the perimeter of the plate may face the sidewall.

In any embodiment, the plate may be positioned axially spaced below the second end of the sidewall.

In any embodiment, the dirt collection chamber may be located below the plate.

DRAWINGS

The drawings included herewith are for illustrating various examples of articles, methods, and apparatus of the teaching of the present specification and are not intended to limit the scope of what is taught in any way.

In the drawings:

FIG. 24 is a perspective cross-sectional view from below of the cyclone bin assembly of FIG. 20;

FIG. 25 is a cross-sectional view of a cyclone bin assembly having an arrester plate and cyclone chamber sidewall defining a cyclone dirt outlet in accordance with another embodiment;

FIG. 26 is a cross-sectional view of a cyclone bin assembly having an arrester plate and cyclone chamber sidewall defining a cyclone dirt outlet in accordance with another embodiment;

FIG. 27 is a cross-sectional view of a cyclone bin assembly having an arrester plate and cyclone chamber sidewall defining a cyclone dirt outlet in accordance with another embodiment;

FIG. 28 is a cross-sectional view of a cyclone bin assembly having an arrester plate and cyclone chamber sidewall defining a cyclone dirt outlet in accordance with another embodiment;

FIG. 29 is a cross-sectional view of a cyclone bin assembly having an arrester plate and cyclone chamber sidewall defining a cyclone dirt outlet in accordance with another embodiment;

FIG. 30 is a cross-sectional view of a cyclone bin assembly having an arrester plate and cyclone chamber sidewall defining a cyclone dirt outlet in accordance with another embodiment;

FIG. 32A is a cross-sectional view of a cyclone bin assembly looking towards a side of the cyclone bin assembly, the cyclone bin assembly having a D-shaped arrester plate and cyclone chamber sidewall defining a cyclone dirt outlet in accordance with another embodiment;

FIG. 32B is a cross-sectional view of the cyclone bin assembly of FIG. 32A looking downwards at the arrester plate along a similar line as indicated by line 23A-23A in FIG. 21;

FIG. 33A is a cross-sectional view of a cyclone bin assembly looking towards a side of the cyclone bin assembly, the cyclone bin assembly having an arrester plate and cyclone chamber sidewall defining a cyclone dirt outlet in accordance with another embodiment;

FIG. 33B is a cross-sectional view of the cyclone bin assembly of FIG. 33A looking downwards at the arrester plate along a similar line as indicated by line 23A-23A in FIG. 21;

FIG. 34A is a cross-sectional view of a cyclone bin assembly looking towards a side of the cyclone bin assembly, the cyclone bin assembly having an arrester plate and cyclone chamber sidewall defining a cyclone dirt outlet in accordance with another embodiment;

FIG. 34B is a cross-sectional view of the cyclone bin assembly of FIG. 34A looking downwards at the arrester plate along a similar line as indicated by line 23A-23A in FIG. 21;

FIG. 35A is a cross-sectional view of a cyclone bin assembly looking towards a side of the cyclone bin assembly, the cyclone bin assembly having an arrester plate and cyclone chamber sidewall defining a cyclone dirt outlet in accordance with another embodiment;

FIG. 35B is a cross-sectional view of the cyclone bin assembly of FIG. 35A looking downwards at the arrester plate along a similar line as indicated by line 23A-23A in FIG. 21;

FIG. 36A is a cross-sectional view of a cyclone bin assembly looking towards a side of the cyclone bin assembly, the cyclone bin assembly having an arrester plate and cyclone chamber sidewall defining a cyclone dirt outlet in accordance with another embodiment;

FIG. 36B is a cross-sectional view of the cyclone bin assembly of FIG. 36A looking downwards at the arrester plate along a similar line as indicated by line 23A-23A in FIG. 21;

FIG. 38A is a cross-sectional view of a cyclone bin assembly looking towards a side of the cyclone bin assembly, the cyclone bin assembly having an arrester plate and cyclone chamber sidewall defining a cyclone dirt outlet in accordance with another embodiment;

FIG. 38B is a cross-sectional view of the cyclone bin assembly of FIG. 38A looking downwards at the arrester plate along a similar line as indicated by line 23A-23A in FIG. 21;

Figure 21:
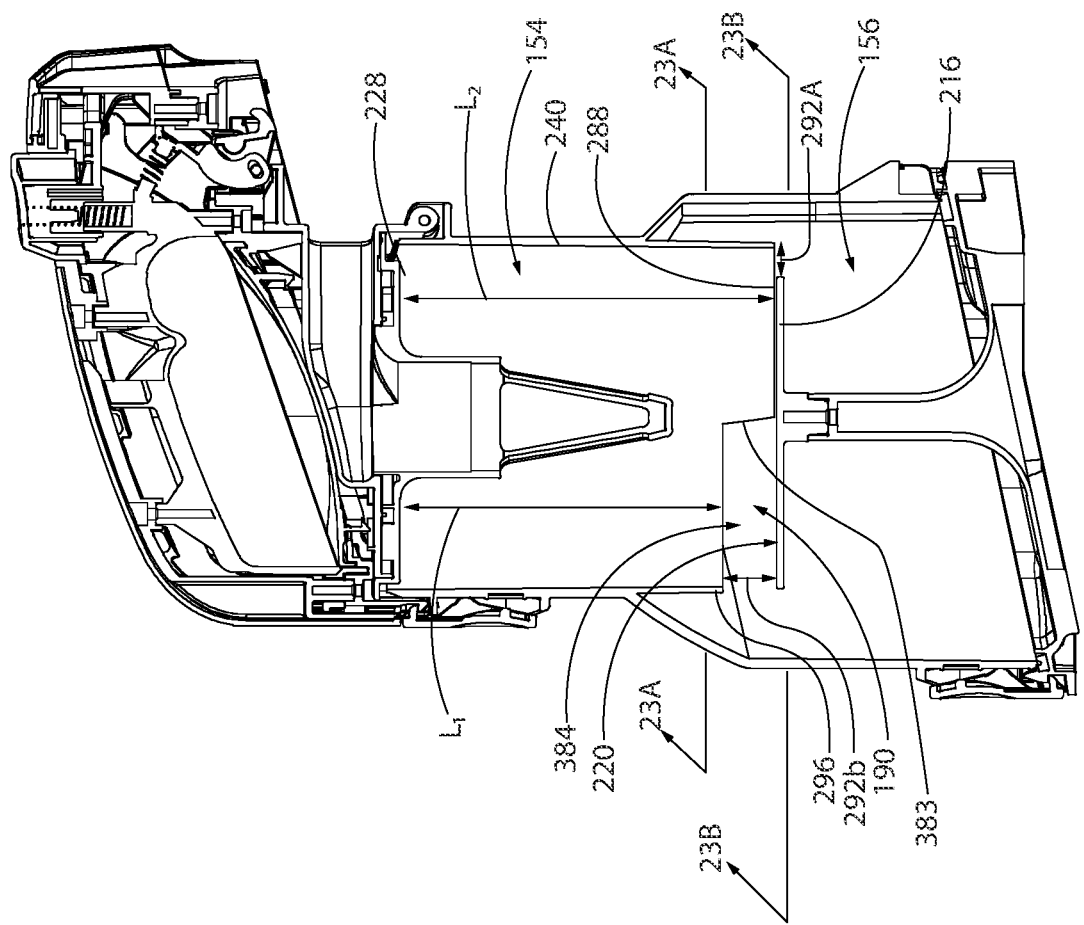
FIG. 21 is a cross-sectional view of the cyclone bin assembly of FIG. 20 looking towards one side of the cyclone bin assembly.

FIG. 39A is a cross-sectional view of a cyclone bin assembly looking towards a side of the cyclone bin assembly, the cyclone bin assembly having an arrester plate and cyclone chamber sidewall defining a cyclone dirt outlet in accordance with another embodiment; and, FIG. 39B is a cross-sectional view of the cyclone bin assembly of FIG. 39A looking downwards at the arrester plate along a similar line as indicated by line 23A-23A in FIG. 21.

DESCRIPTION OF VARIOUS EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," "one embodiment", and the like mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. In addition, the description is not to be considered as limiting the scope of the example embodiments described herein.

General Description of a Vacuum Cleaner

Figure 1:
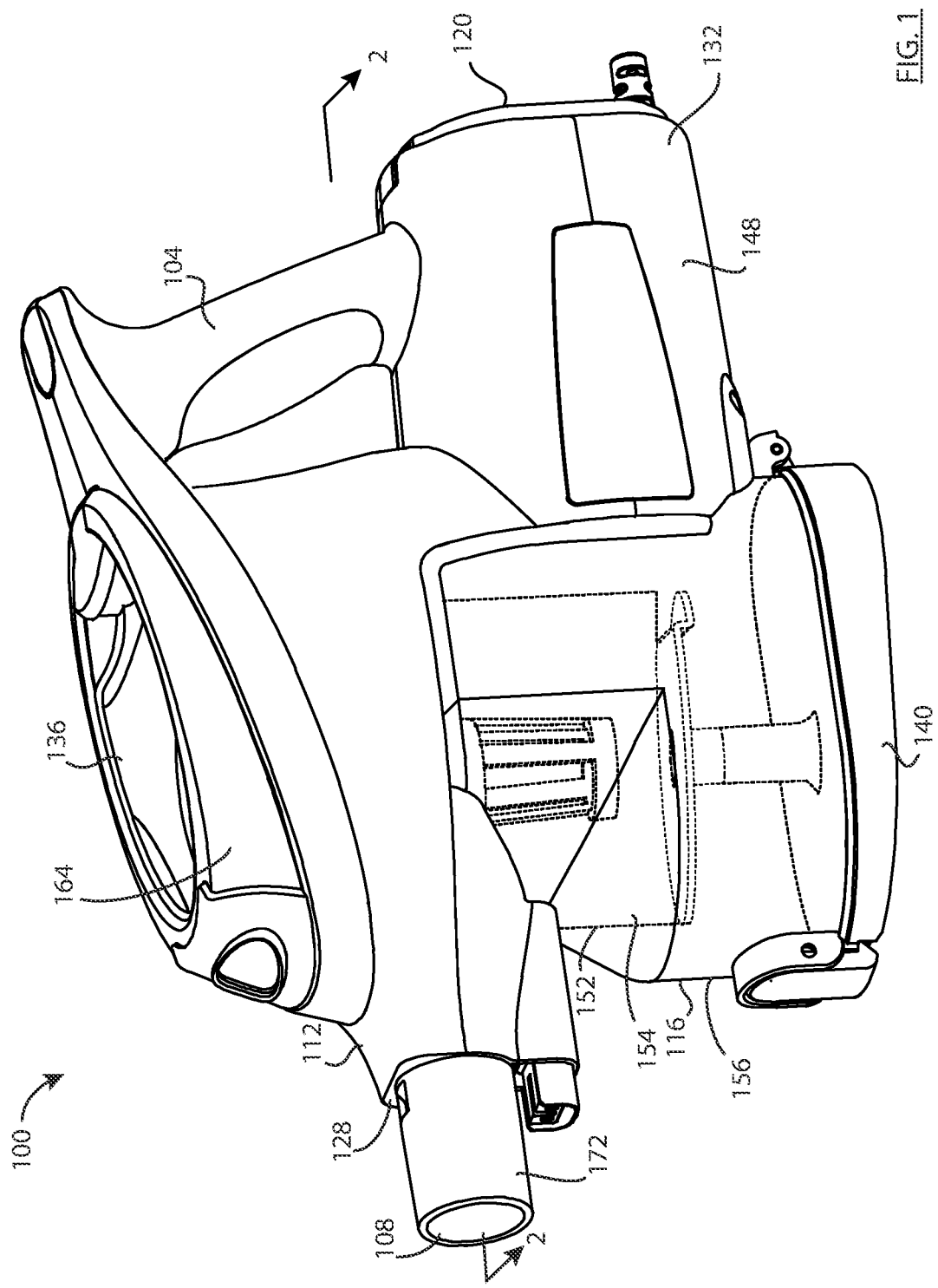
FIG. 1 is a perspective view of a surface cleaning apparatus in accordance with an embodiment.
Figure 2:
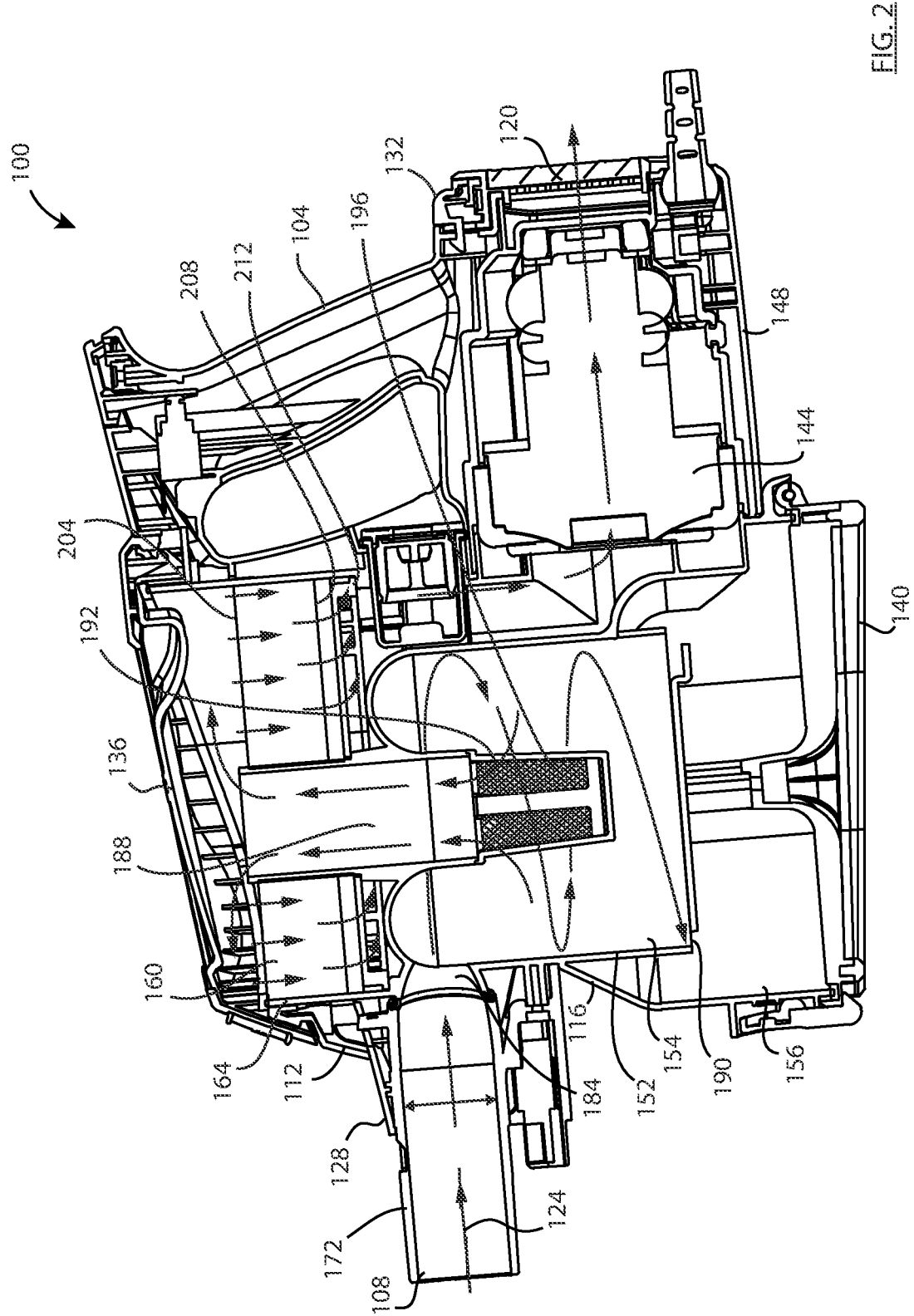
FIG. 2 is a cross-sectional view taken along line 2-2 in FIG. 1.

Referring to FIGS. 1-2, an exemplary embodiment of a surface cleaning apparatus is shown generally as 100. The following is a general discussion of apparatus 100, which provides a basis for understanding several of the features, which are discussed herein. As discussed subsequently, each of the features may be used individually or in any particular combination or sub-combination in this or in other embodiments disclosed herein.

Embodiments described herein include an improved cyclone assembly 116, and a surface cleaning apparatus 100 including the same. Surface cleaning apparatus 100 may be any type of cyclonic surface cleaning apparatus, including for example a hand vacuum cleaner, a stick vacuum cleaner, a canister vacuum cleaner, and an upright vacuum cleaner.

In FIGS. 1-2, surface cleaning apparatus 100 is illustrated as a hand vacuum cleaner, which may also be referred to also as a "handvac" or "hand-held vacuum cleaner". As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, handle 104 and dirty air inlet 108 may be rigidly coupled to each other (directly or indirectly), such as being integrally formed or separately molded and then non-removably secured together such as by an adhesive or welding, so as to move as one while maintaining a constant orientation relative to each other. This is to be contrasted with canister and upright vacuum cleaners, whose weight is typically supported by a surface (e.g. a floor) during use, and when a canister vacuum cleaner is operated or when an upright vacuum cleaner is operated in a 'lift-away' configuration, a second hand is typically required to direct the dirty air inlet at the end of a flexible hose.

Still referring to FIGS. 1-2, surface cleaning apparatus 100 includes a main body 112 having an air treatment member 116 (which may be permanently affixed to the main body or may be removable therefrom for emptying), a dirty air inlet 108, a clean air outlet 120, and an air flow path 124 extending between the dirty air inlet 108 and the clean air outlet 120.

Surface cleaning apparatus 100 has a front end 128, a rear end 132, an upper end (also referred to as the top) 136, and a lower end (also referred to as the bottom) 140. In the embodiment shown, dirty air inlet 108 is at an upper portion of apparatus front end 128 and clean air outlet 120 is at a rearward portion of apparatus 100 at apparatus rear end 132. It will be appreciated that dirty air inlet 108 and clean air outlet 120 may be positioned in different locations of apparatus 100.

A suction motor 144 is provided to generate vacuum suction through airflow path 124, and is positioned within a motor housing 148. Suction motor 144 may be a fan-motor assembly including an electric motor and impeller blade(s). In the illustrated embodiment, suction motor 144 is positioned in the air flow path 124 downstream of air treatment member 116. In this configuration, suction motor 144 may be referred to as a "clean air motor". Alternatively, suction motor 144 may be positioned upstream of air treatment member 116, and referred to as a "dirty air motor".

Air treatment member 116 is configured to remove particles of dirt and other debris from the air flow. In the illustrated example, air treatment member 116 includes a cyclone assembly (also referred to as a "cyclone bin assembly") having a single cyclonic cleaning stage with a single cyclone 152 and a dirt collection chamber 156 (also referred to as a "dirt collection region", "dirt collection bin", "dirt bin", or "dirt chamber"). Cyclone 152 has a cyclone chamber 154, and dirt collection chamber 156 may be external to the cyclone chamber 154 (i.e. dirt collection chamber 156 may have a discrete volume from that of cyclone chamber 154). Cyclone 152 and dirt collection chamber 156 may be of any configuration suitable for separating dirt from an air stream and collecting the separated dirt, respectively and may be in communication by a dirt outlet of the cyclone chamber.

In alternate embodiments, air treatment member 116 may include a cyclone assembly having two or more cyclonic cleaning stages arranged in series with each other. Each cyclonic cleaning stage may include one or more cyclones arranged in parallel with each other and one or more dirt collection chambers, of any suitable configuration. The dirt collection chamber(s) may be external to the cyclone chambers of the cyclones. Alternatively, one or more (or all) of the dirt collection chamber(s) may be internal to one or more (or all) of the cyclone chambers. For example, the internal dirt collection chamber(s) may be configured as a dirt collection area within the cyclone chamber.

Referring to FIG. 2, hand vacuum cleaner 100 may include a pre-motor filter 160 provided in the air flow path 124 downstream of air treatment member 116 and upstream of suction motor 144. Pre-motor filter 160 may be formed from any suitable physical, porous filter media. For example, pre-motor filter 160 may be one or more of a foam filter, felt filter, HEPA filter, or other physical filter media. In some embodiments, pre-motor filter 160 may include an electrostatic filter, or the like. As shown, pre-motor filter 160 may be located in a pre-motor filter housing 164 that is external to the air treatment member 116.

In the illustrated embodiment, dirty air inlet 108 is the inlet end 168 of an air inlet conduit 172. Optionally, inlet end 168 of air inlet conduit 172 can be used as a nozzle to directly clean a surface. Alternatively, or in addition to functioning as a nozzle, air inlet conduit 172 may be connected (e.g. directly connected) to the downstream end of any suitable accessory tool such as a rigid air flow conduit (e.g., an above floor cleaning wand), a crevice tool, a mini brush, and the like. As shown, dirty air inlet 108 may be positioned forward of air treatment member 116, although this need not be the case.

In the embodiment of FIG. 2, the air treatment member 116 comprises a cyclone 152, the air treatment air inlet is a cyclone air inlet 184, and the air treatment member air outlet is a cyclone air outlet 188. Accordingly, in operation, after activating suction motor 144, dirty air enters apparatus 100 through dirty air inlet 108 and is directed along air inlet conduit 172 to the cyclone air inlet 184. As shown, cyclone air inlet 184 may direct the dirty air flow to enter cyclone chamber 154 in a tangential direction so as to promote cyclonic action. Dirt particles and other debris may be disentrained (i.e. separated) from the dirty air flow as the dirty air flow travels from cyclone air inlet 184 to cyclone air outlet 188. The disentrained dirt particles and debris may discharge from cyclone chamber 154 through a dirt outlet 190 into dirt collection chamber 156 external to the cyclone chamber 154, where the dirt particles and debris may collect until dirt collection chamber 156 is emptied.

Air exiting cyclone chamber 154 may pass through an outlet passage 192 located upstream of cyclone air outlet 188. Cyclone chamber outlet passage 192, may also act as a vortex finder to promote cyclonic flow within cyclone chamber 154. In some embodiments, cyclone outlet passage 192 may include a porous member such as a screen or shroud 196 (e.g. a fine mesh screen) in the air flow path 124 (e.g., positioned between the cyclone chamber and an inlet of the vortex finder) to remove large dirt particles and debris, such as hair, remaining in the exiting air flow. The vortex finder and porous member may be spaced from the cyclone chamber face of plate 216. It will be appreciated that, in some embodiments, only a screen may be provided. Alternately, a vortex finder may be provided without a screen or the like.

From cyclone air outlet 188, the air flow may be directed into pre-motor filter housing 164 at an upstream side 204 of pre-motor filter 160. The air flow may pass through pre-motor filter 160 to pre-motor filter downstream side 208, and then exit through pre-motor filter chamber air outlet 212 into motor housing 148. At motor housing 148, the clean air flow may be drawn into suction motor 144 and then discharged from apparatus 100 through clean air outlet 120.

The following is a description of various dirt outlets that are defined by a gap or spacing between a dirt arrester plate (also referred to as a "dirt arrester", "arrester plate", or simply "plate") and a cyclone chamber sidewall that may be used in any cyclone design. The plate separates the cyclone chamber from the dirt collection chamber. In accordance with this feature, the dirt collection chamber is external to the cyclone chamber. The spacing may extend around the entire perimeter of the plate or just a portion of the plate (e.g., a portion of the perimeter of the plate may abut a portion of the cyclone chamber sidewall.

Various configurations of the spacing are described herein. In some embodiments, the shape of the perimeter of the plate may vary and provides for a variable spacing in the radial direction between the perimeter of the plate and the cyclone chamber sidewall to form a gap extending radially between the perimeter of the plate and the cyclone chamber sidewall. In any such embodiment, it will be appreciated that some or all of the plate may be located radially inwardly from the inner surface of the cyclone chamber sidewall and/or some or all of the plate may be located axially spaced from the end wall of the cyclone chamber sidewall. In other embodiments, the distance between the inlet end of the cyclone chamber and the plate may vary at different locations around the perimeter of the plate. In any embodiment, the length of the cyclone chamber sidewall may vary around the perimeter of the plate.

Axially Stepped Arrester

In accordance with this feature, the dirt collection chamber is external to the cyclone chamber and the dirt outlet from the cyclone chamber comprises or consists of an axially extending gap between the arrester plate and the cyclone chamber sidewall. In accordance with this feature, the arrester plate has an 'axial step', in which a portion of the arrester plate is axially recessed to create an axially recessed step. The axial step may create a relatively larger dirt outlet gap or spacing between the cyclone chamber sidewall and the stepped portion of the arrester plate periphery, which can allow larger debris to pass through the dirt outlet.

Without being limited by theory, as compared with an entirely planar arrester plate having a generally uniformly sized dirt outlet gap, the axially stepped arrester design may provide greater separation efficiency (i.e. percentage of dirt particles of a dirty air flow separated from the air flow and retained in the dirt collection chamber) by permitting larger dirt particles to exit the cyclone chamber thereby reducing the likelihood that larger dirt particles in the cyclone chamber may produce eddy currents or otherwise interfere with the flow pattern in a cyclone chamber. Thus, the axially stepped arrester design may allow the dirt collection chamber to admit large dirt particles (e.g. stones, dry foods, etc.) while providing a high separation efficiency.

In accordance with this design, at least one portion of the arrester plate is recessed axially to create a first portion of the spacing and a second portion of the spacing, wherein the second portion of the spacing has a greater distance between the cyclone chamber face of the plate and the first or inlet end of the cyclone chamber than a distance of the first portion of the plate and the first end of the cyclone chamber.

Figure 3:
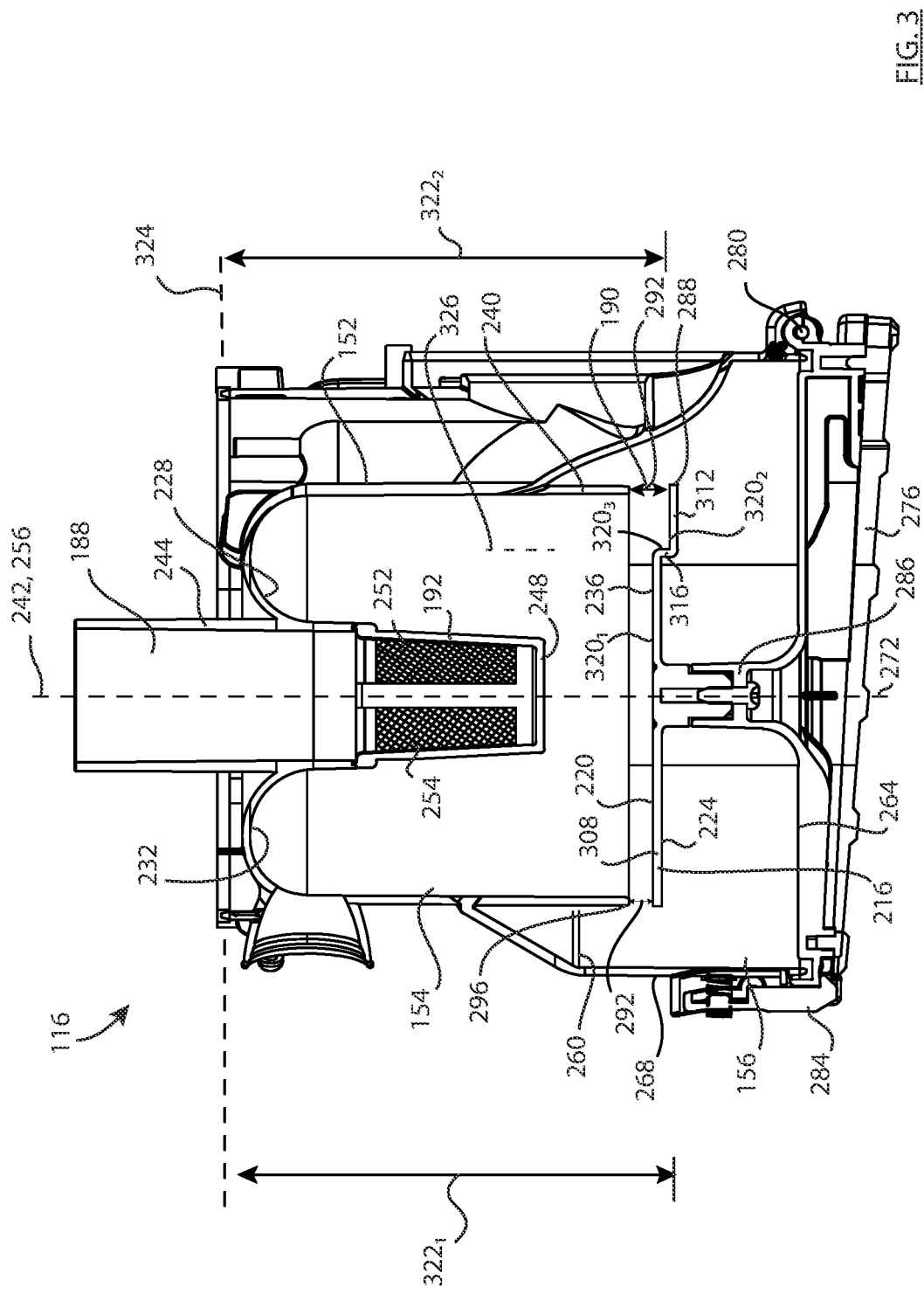
FIG. 3 is a cross-sectional view taken along line 2-2 in FIG. 1 of a cyclone bin assembly of the surface cleaning apparatus of FIG. 1 when removed from the remainder of the surface cleaning apparatus.
Figure 4:
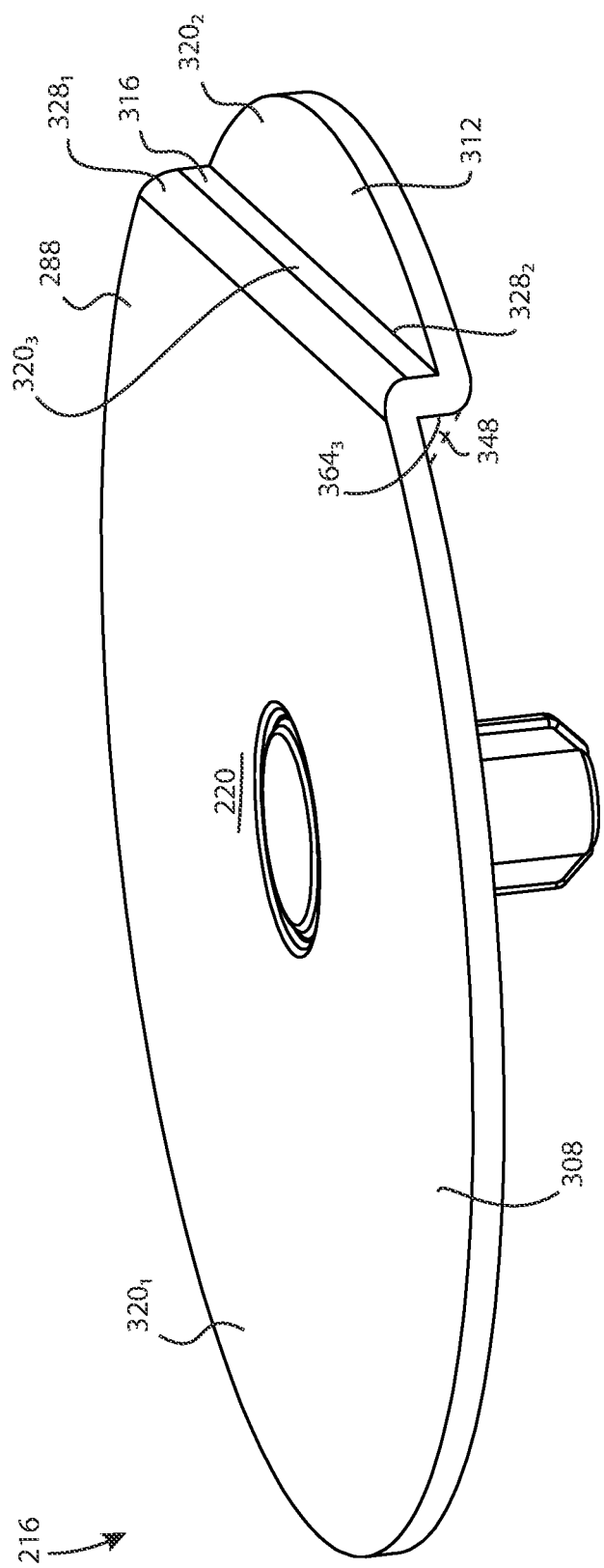
FIG. 4 is a top perspective view of an arrester plate of the cyclone bin assembly of FIG. 3.
Figure 5:
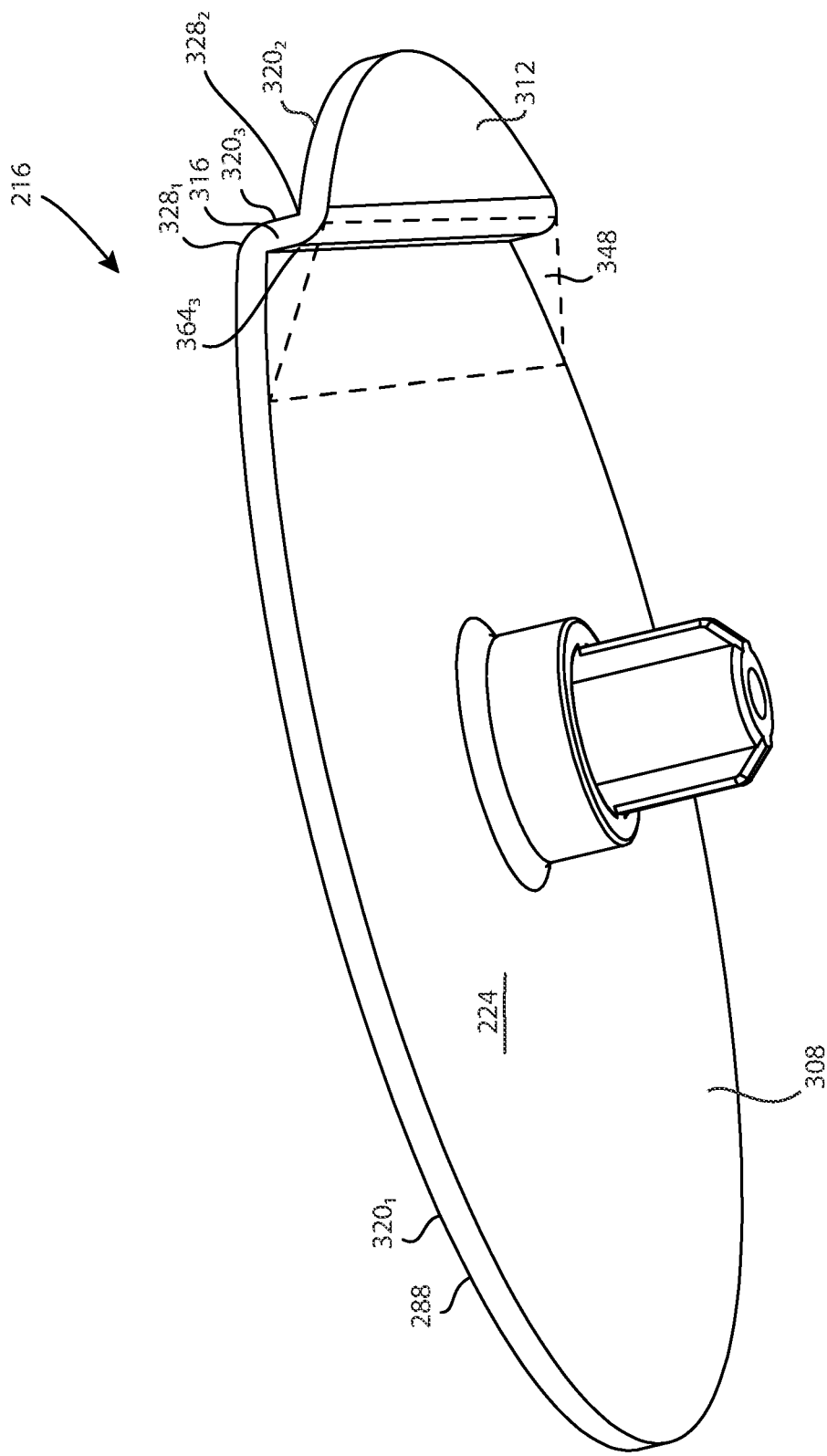
FIG. 5 is a bottom perspective view of the arrester plate of FIG. 4.

Reference is now made to FIGS. 3-5. As shown, cyclone bin assembly 116 includes an arrester plate 216 that separates cyclone chamber 154 from dirt collection chamber 156. Arrester plate 216 also cooperates with cyclone 152 to define dirt outlet 190 from cyclone chamber 154 into dirt collection chamber 156.

Arrester plate 216 may define at least part of an end wall for one or both of cyclone 152 and dirt collection chamber 156. As shown, arrester plate 216 may have a cyclone chamber face 220 that borders cyclone chamber 154, and an opposite dirt chamber face 224 that borders dirt collection chamber 156. Cyclone chamber face 220 may face towards an interior volume of cyclone chamber 154. Similarly, dirt chamber face 224 may face towards an interior volume of dirt collection chamber 156.

Cyclone 152 has a first end 228 having a first end wall 232, a second end 236 axially spaced apart from first end 228, and a cyclone chamber sidewall 240 positioned between the first and second ends 228 and 236. Cyclone 152 also has a central longitudinal axis 242 (also referred to as a "cyclone axis") that extends from the first end 228 to the second end 236. In the example shown, cyclone second end 236 may be defined at least in part by cyclone chamber face 220 of arrester plate 216. In some embodiments, at least a portion of cyclone chamber face 220 faces (i.e. has a surface normal pointed towards) cyclone first end 228. It will be appreciated that, if plate 216 is spaced from sidewall 240, then sidewall 240 will not extend to plate 216. In some embodiments, a portion of plate 216 may abut portions of sidewall 240 while another portion, e.g., the stepped down portion, may be spaced from sidewall 240 to define part or all of the dirt outlet.

Still referring to FIGS. 3-5, cyclone outlet passage 192 may define a vortex finder that promotes cyclonic flow within cyclone chamber 154. As shown, cyclone outlet passage 192 may extend from a first end 244 at cyclone first end 228, to a second end 248 within cyclone chamber 154. Cyclone outlet passage 192 has one or more inlet openings 252 that admit air exiting cyclone chamber 154 to enter cyclone outlet passage 192 towards cyclone air outlet 188. Cyclone outlet passage opening(s) 252 may be overlaid with a porous member 254 (e.g. a fine mesh screen), which may remove large dirt and debris from the air flow entering the cyclone outlet passage 192. As shown, cyclone outlet passage 192 and porous member 254 may be spaced (e.g. axially) from cyclone chamber face 220 of arrester plate 216. Cyclone outlet passage 192 may be intersected by cyclone axis 242. As shown, cyclone outlet passage 192 may have a central longitudinal axis 256 that is parallel to cyclone axis 242 (e.g. collinear to cyclone axis 242, or spaced apart from cyclone axis 242).

It will be appreciated that any cyclone air outlet may be used and that the cyclone air outlet may be at various locations as is known in the art. Similarly, it will be appreciated that any cyclone air inlet 184 may be used and that the cyclone air inlet may be at various locations as is known in the art.

Dirt collection chamber 154 has a first end 260, a second end 264 axially spaced apart from first end 260, and a sidewall 268 that extends between the first and second ends 260 and 264. Dirt collection chamber 154 has a longitudinal axis 272 (also referred to as a "dirt chamber axis"). Dirt chamber axis 272 may be parallel to cyclone axis 242 (e.g. collinear to cyclone axis 242, or transversely spaced apart from cyclone axis 242). Dirt chamber first end 260 may be defined at least in part by dirt chamber face 224 of arrester plate 216. Dirt chamber second end 264 may include a second end wall 276. In some embodiments, at least a portion of dirt chamber face 224 faces (i.e. has a surface normally pointed towards) dirt chamber second end 264.

As used herein, the term "axial" and "axially" mean "in a direction parallel to the respective longitudinal axis", such as for example cyclone axis 242 or dirt chamber axis 272. For example, dirt chamber face 224 may be described as being axially spaced apart from cyclone chamber face 220 in that dirt chamber face 224 is spaced from cyclone chamber face 220 in a direction parallel to or along the cyclone axis 242.

Figure 8:
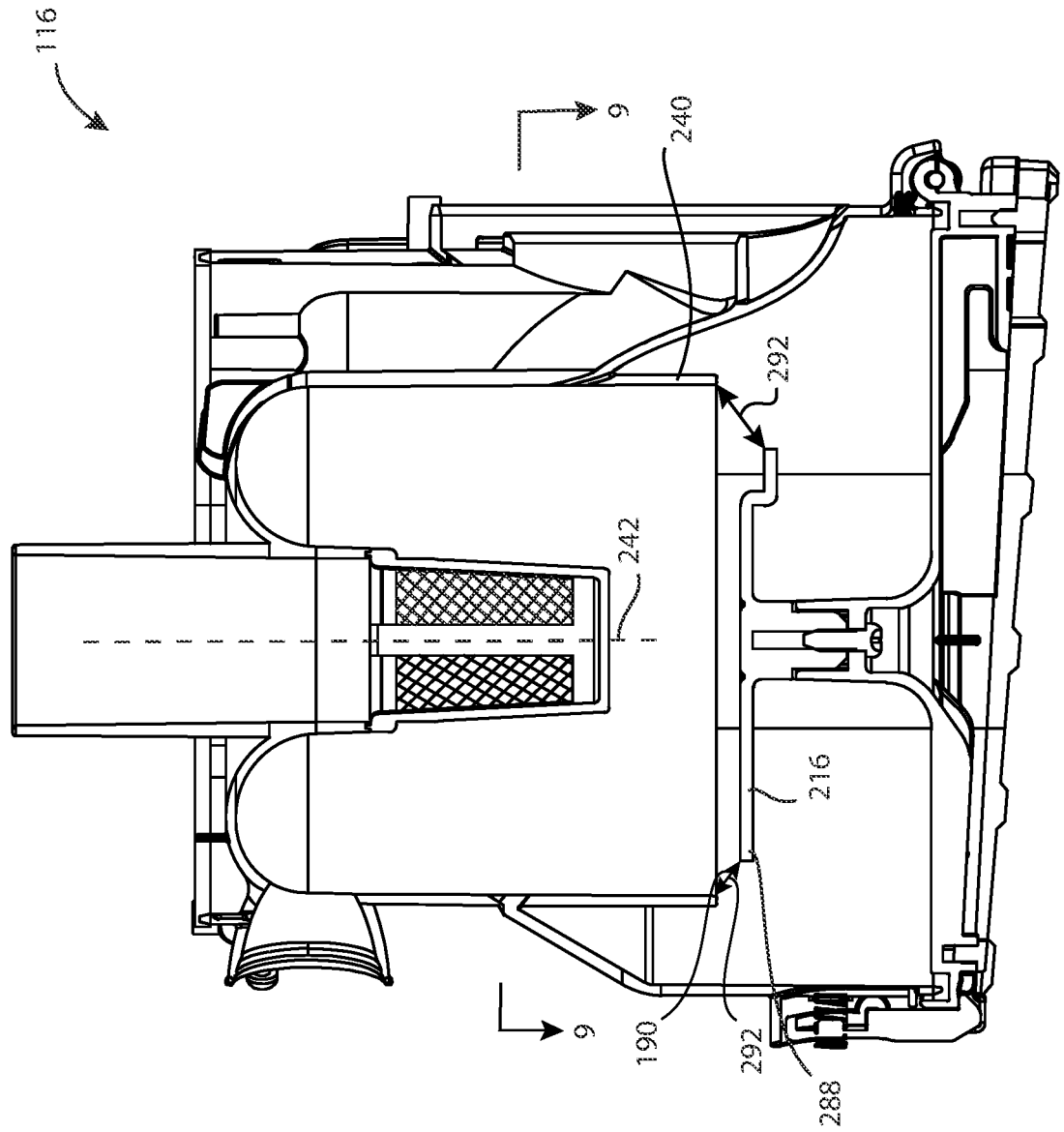
FIG. 8 is a cross-sectional view of a cyclone bin assembly having an arrester plate in accordance with another embodiment.
Figure 9:
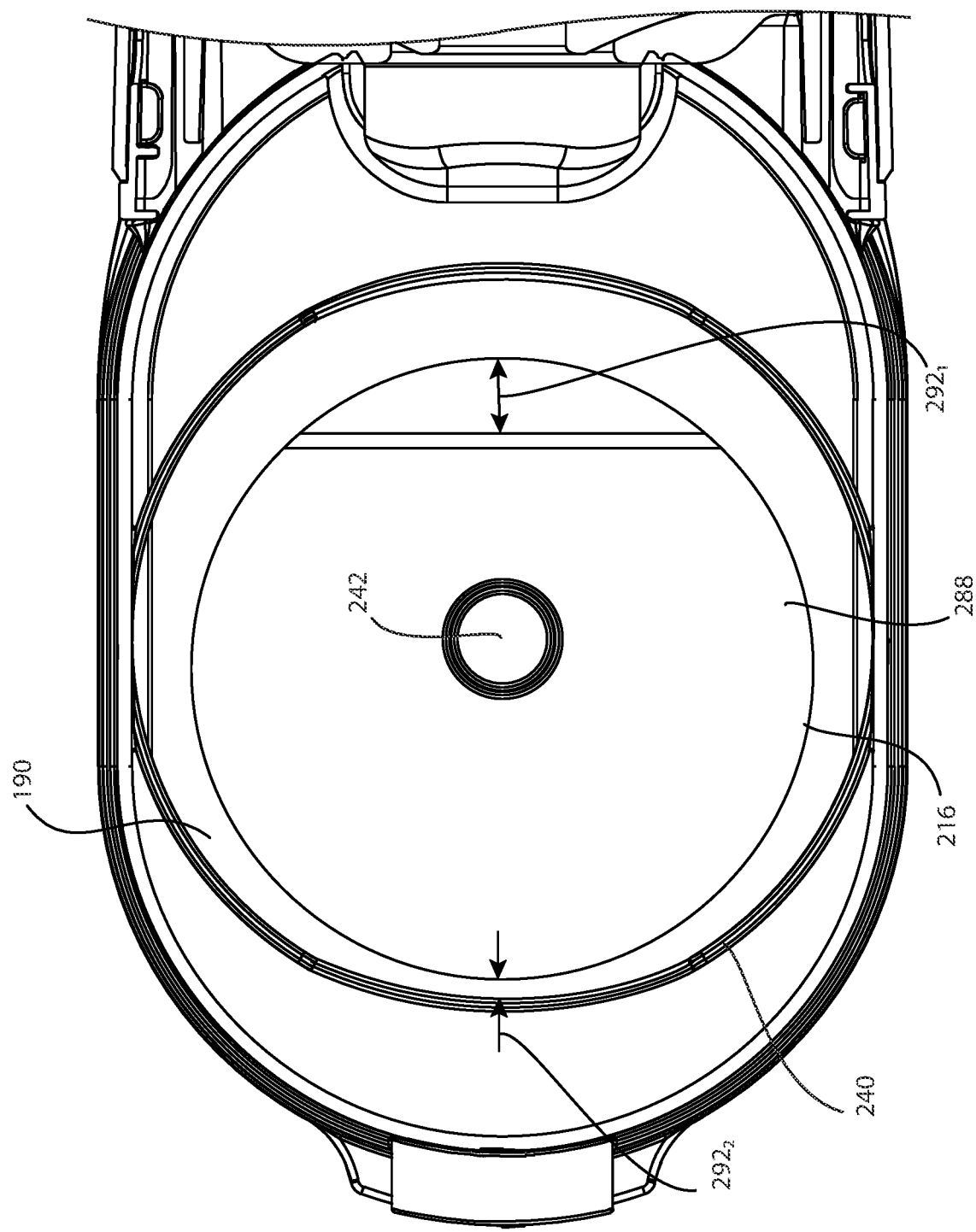
FIG. 9 is a cross-sectional view taken along line 9-9 in FIG. 8.

Referring to FIGS. 8-9, cyclone dirt outlet 190 may extend around all of arrester plate periphery 288. As shown, every point on arrester plate periphery 288 may have a (non-zero) dirt outlet gap length 292 to cyclone chamber sidewall 240. In this way, dirt outlet 190 may form a continuous annular gap. This helps to mitigate the development of blockages caused by an accumulation of debris at locations where there is no dirt outlet 190, e.g. because the dirt outlet 190 is obstructed. In other embodiments, arrester plate 216 may about part of sidewall 240.

Figure 6:
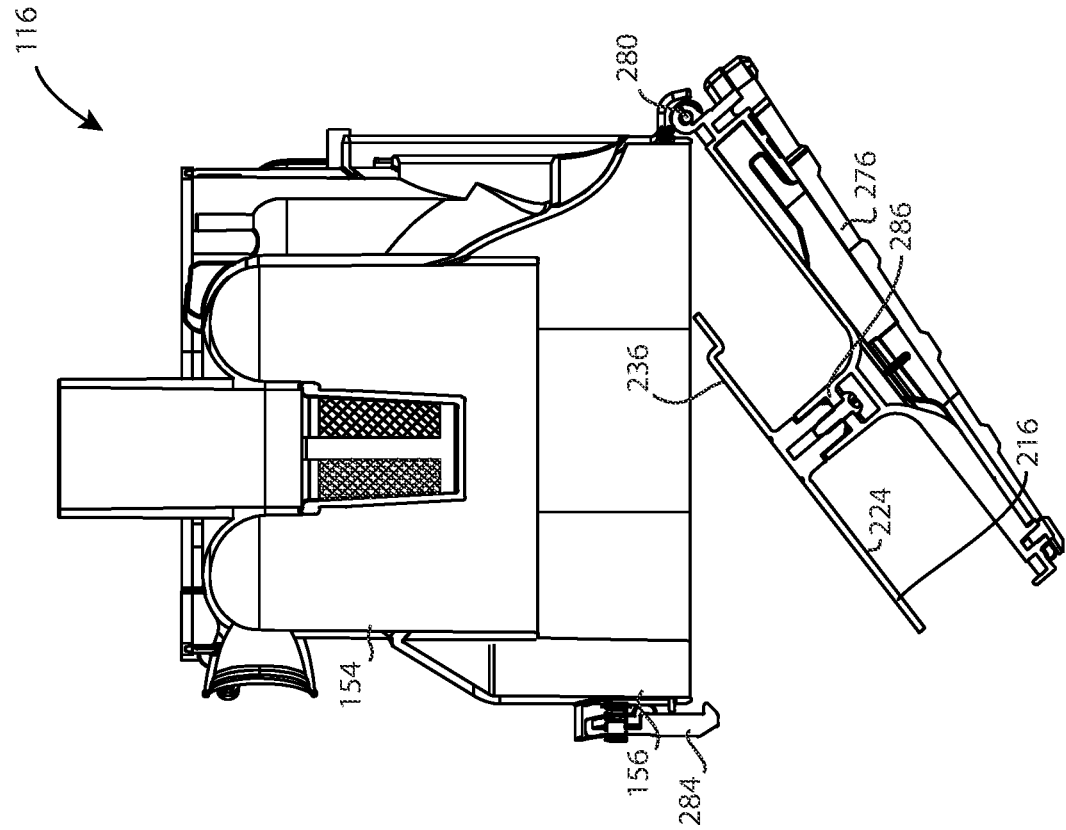
FIG. 6 is the cross-sectional view of FIG. 3 with the cyclone bin assembly in an open position.

Referring to FIGS. 3 and 6, arrester plate 216 may be movable between a closed position (FIG. 3) and an open position (FIG. 6). In the closed position, arrester plate 216 may act to separate cyclone chamber 154 from dirt collection chamber 156. If plate 216 contacts part of sidewall 240, then arrester plate 216 may at least partially close cyclone second end 236 when in the closed position. Alternately, as exemplified in FIGS. 3 and 8-10, plate 216 may be spaced from all of sidewall 240 when in the closed position. In the open position, arrester plate 216 may be positioned to provide user access to cyclone chamber 154 (e.g. for cleaning). For example, arrester plate 216 may close less of or none of cyclone second end 236 when in the open position as compared to the closed position.

As shown, arrester plate 216 may be connected to an openable end wall 276 of dirt collection chamber 156. Arrester plate 216 may move with end wall 276 so that when end wall 276 is opened, arrester plate 216 is displaced from (i.e. moved away from) cyclone second end 236. This allows cyclone chamber 154 and dirt collection chamber 156 to be opened and emptied concurrently by moving end wall 276 from its closed position (FIG. 3) to its open position (FIG. 6). Alternately, plate 216 may be pivotally mounted to sidewall 240, to a sidewall of the dirt chamber.

In some embodiments, plate 216 may not be openable, or it may be openable separately from the dirt chamber. For example, plate 216 may be pivotally mounted to sidewall 240 or to a sidewall of the dirt chamber and may have its own releasable lock. Accordingly, plate 216 may remain in position when end wall 276 is opened and may be separately openable.

Dirt chamber end wall 276 may be openable in any manner that allows access to empty dirt collection chamber 156. For example, dirt chamber end wall 276 may be pivotally openable as shown, or removable from dirt collection chamber 156. In the illustrated example, dirt chamber end wall 276 is rotatably connected to dirt collection chamber sidewall 268 by a hinge 280, and releasably held in the closed position (FIG. 3) by a latch 284.

Arrester plate 216 may be connected to dirt chamber end wall 276 in any manner that allows arrester plate 216 to open concurrently as dirt chamber end wall 276 is opened. In the illustrated example, arrester plate 216 is connected to dirt chamber end wall 276 by a rigidly mounted support member 286. Accordingly, support member 286 may be a post that rigidly connects arrester plate 216 to dirt chamber end wall 276, whereby arrester plate 216 and dirt chamber end wall 276 move as one. In some embodiments, support member 286 may be moveable (pivotally) mounted with respect to end wall 276 and/or plate 216 may be moveable (pivotally) mounted with respect to support 268. As shown, support member 286 may extend from dirt chamber face 224 of arrester plate 216 to dirt chamber end wall 276. In this example, at least a portion of dirt chamber end wall 276 faces (i.e. has a surface normal pointed towards) arrester plate 216 (e.g. towards dirt chamber face 224).

Returning to FIGS. 3-5, cyclone dirt outlet 190 may be formed by a gap between cyclone chamber sidewall 240 and the arrester plate 216). Dirt that is disentrained (i.e. separated) from the airflow circulating through cyclone chamber 154 (e.g. by cyclonic action within cyclone chamber 154) may exit cyclone chamber 154 through dirt outlet 190 into dirt collection chamber 156. The maximum size of a dirt particle that can exit through dirt outlet 190 is defined by a gap length 292. Gap length 292 is the shortest distance between a given point on arrester plate 216 and cyclone chamber sidewall 240. There may be a uniform gap length 292 at every point on arrester plate periphery 288, or gap length 292 may vary along arrester plate periphery 288.

As exemplified in FIG. 3, plate 216 may have a diameter similar to the diameter of cyclone chamber 154 and the cyclone axis may intersect the centre of arrester plate 216. Accordingly the arrester plate periphery 288 (also referred to as "arrester plate perimeter") may underlie the sidewall 240 (i.e., a projection of sidewall 240 may intersect the arrester plate periphery 288) such that arrester plate periphery 288 underlies a free end 296 of cyclone chamber sidewall 240. Accordingly, as exemplified in FIG. 3, dirt outlet 190 is defined by a gap length 292, which is solely axial. That is, the shortest distance between every point on arrester plate periphery 288 and cyclone chamber sidewall 240 is in a direction parallel to cyclone axis 242.

It will be appreciated that the cross sectional area of plate 216 and the outlet end of the cyclone chamber 154 may vary (e.g., plate 216 may have a diameter that is smaller than or larger than the diameter of cyclone chamber 154). The arrester plate may be coplanar with free end 296 of cyclone chamber sidewall 240 (see for example FIG. 7) or is may be axially spaced therefrom (See for example FIG. 8).

Figure 7:
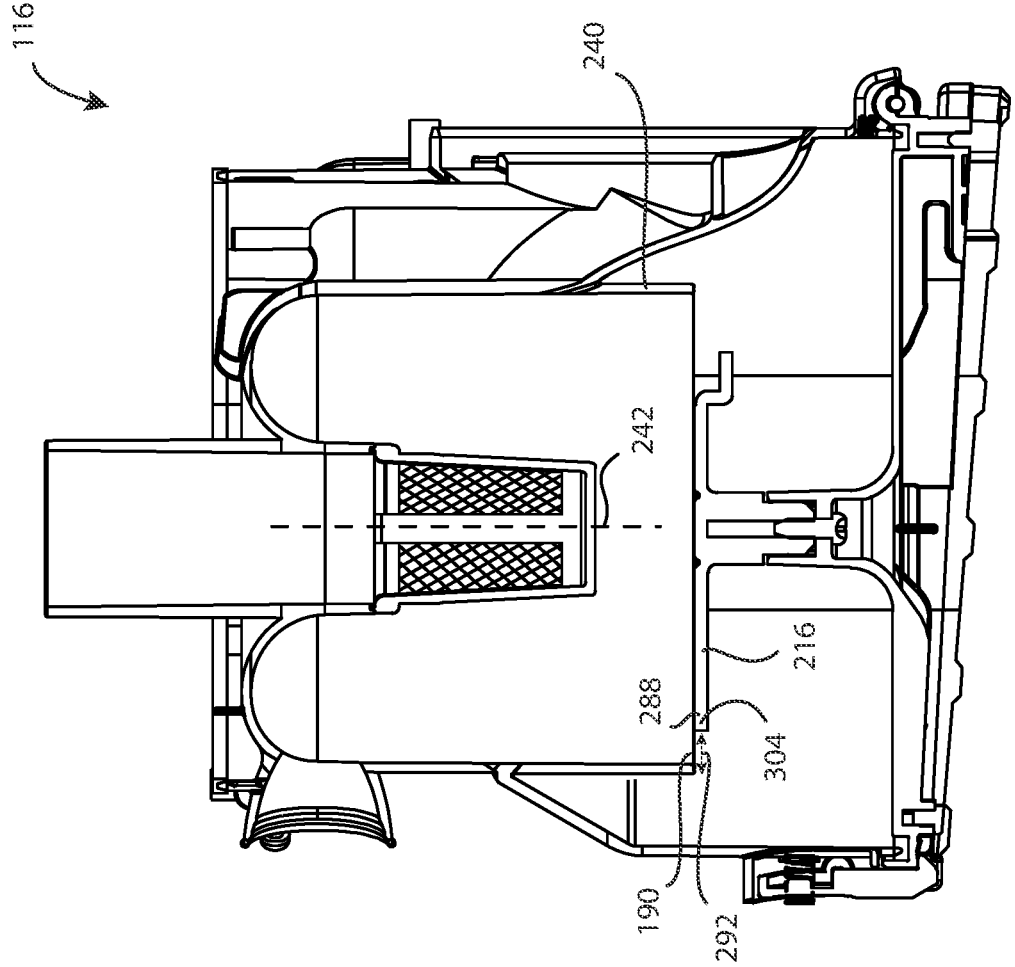
FIG. 7 is a cross-sectional view of a cyclone bin assembly having an arrester plate in accordance with another embodiment.

FIG. 7 shows an example in which arrester plate 216 has a diameter that is smaller than the diameter of cyclone chamber 154 so that at least a portion of dirt outlet 190 is defined by gap lengths 292 that are solely radial. That is, the shortest distance between at least a portion 304 of arrester plate periphery 288 and cyclone chamber sidewall 240 is in a direction that is transverse (e.g. perpendicular) to cyclone axis 242. As shown, at least portion 304 of arrester plate periphery 288 has the same axial position as a portion of cyclone chamber sidewall 240.

FIG. 8 shows an example in which all of dirt outlet 190 is defined by gap lengths 292 that include radial and axial components. That is, the shortest distance between at least a portion 304 of arrester plate periphery 288 and cyclone chamber sidewall 240 is in a direction that is at a non-zero and non-perpendicular angle (i.e. non-parallel and non-orthogonal) to cyclone axis 242.

Different points on arrester plate periphery 288 may have different dirt outlet gap lengths 292. FIG. 9 shows an example in which arrester plate 216 is off-centered relative to cyclone axis 242 whereby radial gap length 292 is greater at some points along arrester plate periphery 288 than others (e.g. compare gap length $292_1$ to gap length $292_2$). Alternatively, or in addition, arrester plate periphery 288 may have an axial shape (i.e. the shape of a projection of arrester plate periphery 288 in a direction parallel to cyclone axis 242) that differs from the axial shape of cyclone chamber sidewall 240 where cyclone chamber sidewall 240 is nearest to arrester plate periphery 288 (e.g. a triangular arrester plate periphery 288 and circular cyclone chamber sidewall 240). This too may produce a variable gap length 292 around arrester plate periphery 288.

Returning to FIGS. 3-5, the illustrated arrester plate 216 is shown including an upper plateau and a peripheral step on one side. The peripheral step can provide an enlarged dirt outlet gap length across only the stepped portion of the dirt arrester periphery. An advantage of this design is that the enlarged dirt outlet gap provides clearance for large dirt particles to pass through the dirt outlet into the dirt collection chamber while optionally maintaining a smaller gap for the remainder of the perimeter of the arrester plate (if the remainder of the arrester plate is spaced from sidewall 240). As compared with a dirt arrester that has a comparably large gap length about the entire arrester plate periphery, the illustrated axially stepped design may mitigate re-entry of dirt from the dirt collection chamber into the cyclone chamber through the dirt outlet because much of the dirt outlet retains a relatively smaller gap length. In laboratory testing, the axially stepped design produced greater dirt separation efficiency as compared with a uniformly planar arrester plate, all else being equal.

As shown, arrester plate 216 includes a first portion 308 and a second portion 312. The first and second portions 308 and 312 are axially spaced apart and joined together by a transition portion 316 positioned between the first and second portions 308 and 312. In the illustrated example, transition portion 316 extends from first portion 308 to second portion 312. First, second, and transition portions 308, 312, and 316 may be integrally formed as shown, or discretely formed and rigidly connected together. At least the first and second portions 308 and 312 each include a portion of arrester plate periphery 288. In the illustrated example, each of the first, second, and transition portions 308, 312, and 316 include a portion of arrester plate periphery 288.

Each of first, second, and transition portions 308, 312, and 316 includes a cyclone chamber face $320_1$, $320_2$, and $320_3$ respectively. Cyclone chamber faces 320 border the inner volume of cyclone chamber 154. As shown, second portion cyclone chamber face $320_2$ may be axially spaced (i.e. in a direction parallel to cyclone axis 242) apart from first portion cyclone chamber face $320_1$ in a direction away from cyclone first end 228. Thus, arrester plate second portion 312 forms an axial step from the arrester plate first portion 308. As shown, the axial separation between arrester plate first and second portions 308 and 312 may provide arrester plate periphery 288 with a greater dirt outlet gap length 292 at arrester plate second portion 312 than at arrester plate first portion 308. This allows larger particles to pass through dirt outlet 190 at arrester plate second portion 312, while maintaining a smaller gap at arrester plate first portion 308 to mitigate re-entry of dirt particles from dirt collection chamber 156 into cyclone chamber 154.

As shown, cyclone chamber faces $320_1$ and $320_2$ of arrester plate first and second portions 308 and 312 may face towards cyclone first end 228 (e.g. towards cyclone first end wall 232). In the illustrated example, cyclone chamber faces $320_1$ and $320_2$ are substantially planar and perpendicular to cyclone axis 242. In other embodiments, one or both of cyclone chamber faces $320_1$ and $320_2$ may be non-planar. Alternatively or in addition, one or both of cyclone chamber faces $320_1$ and $320_2$ may be non-perpendicular to cyclone axis 242.

Axial separation between cyclone chamber faces $320_1$ and $320_2$ may be described by their distances from a reference plane 324 (also referred to as a "transverse plane"), which is perpendicular to cyclone axis 242 and intersects the cyclone, such as at cyclone first end 228. As shown, axial distance $322_2$ from second portion cyclone chamber face $320_2$ to reference plane 324 is greater than axial distance $322_1$ from first portion cyclone chamber face $320_1$ to reference plane 324.

Transition cyclone chamber face $320_3$ may extend at a non-zero angle to first and second portion cyclone chamber faces $320_1$ and $320_2$. As shown, transition cyclone chamber face $320_3$ may extend substantially axially (e.g. substantially parallel to cyclone axis 242). In the example shown, transition cyclone chamber face $320_3$ extends perpendicular to first and second portion cyclone chamber faces $320_1$ and $320_2$. As shown, transition cyclone chamber face $320_3$ may be substantially planar.

In some embodiments, transition cyclone chamber face $320_3$ may be non-perpendicular to cyclone axis 242. For example, it may extend at an acute angle to each of first and second portion cyclone chamber faces $320_1$ and $320_2$. Alternately, or in addition, transition cyclone chamber face $320_3$ may be non-planar; for example, it may curve from first and second portion cyclone chamber face $320_1$ to second portion cyclone chamber face $320_2$. For example, transition cyclone chamber face $320_3$ may be concave or convex.

Arrester plate second portion 312 may be smaller in size (e.g., cross sectional area in a plane parallel to reference plane 324) than arrester plate first portion 308. An advantage of this design is that it provides arrester plate with an enlarged dirt outlet gap length 292 across less than half of dirt outlet 190. For example, the area of an axial projection of arrester plate second portion 312 may be smaller (e.g., less than 50%, less than 40%, less than 30%, less than 20% or less than 10%) than the area of an axial projection of arrester plate first portion 308. In the illustrated example, the area of an axial projection of arrester plate second portion 312 is less than one-half of the area of an axial projection of arrester plate first portion 308. In addition, arrester plate second portion 312 may include less of arrester plate periphery 288 than arrester plate first portion 308 (e.g., less than 50%, less than 40%, less than 30%, less than 20% or less than 10%). In the illustrated example, arrester plate second portion 312 includes less than one quarter of arrester plate periphery 288.

Arrester plate second portion 312 may be laterally offset (i.e. in a direction perpendicular to cyclone axis 242) from cyclone axis 242. As shown, arrester plate second portion 312 is axially spaced from arrester plate first portion 308 along an axial line 326 that is parallel and laterally spaced from cyclone axis 242.

Transition cyclone chamber face $320_3$ may meet first and second portion cyclone chamber faces $320_1$ and $320_2$ at first and second discontinuities $328_1$ and $328_2$ respectively. As shown, transition cyclone chamber face $320_3$ extends between first and second discontinuities $328_1$ and $328_2$. First discontinuity $328_1$ may be positioned between first portion cyclone chamber face $320_1$ and transition portion cyclone chamber face $320_3$, and second discontinuity may be positioned between second portion cyclone chamber face $320_2$ and transition portion cyclone chamber face $320_3$.

As used herein, a "discontinuity" is a macro-scale deviation or disruption of a surface pattern or shape pattern. For example, first discontinuity $328_1$ is shown as a 90 degree bend that is a deviation from the planar surface of first portion of cyclone chamber face $320_1$, and second discontinuity is shown as a 90 degree bend that is a deviation of the planar surface of second portion of cyclone chamber face $320_2$. Minor deviations (e.g. seams and clearance gaps between otherwise continuous portions), and micro deviations (e.g. elements of surface texture) are not considered herein to be discontinuities. It will be appreciated that, instead of a 90 degree bend, the discontinuities may be rounded.

It will be appreciated that arrester plate 216 may have a perimeter without any angles or other discontinuities. Arrester plate periphery 288 may therefore have a continuous axial shape (i.e. the shape of a projection of arrester plate periphery 288 in a direction parallel to cyclone axis 242) that is smooth. Accordingly, as shown in plan view in FIG. 9, arrester plate 216 is circular.

It will be appreciated that arrester plate may be of any other shape such as elliptical or polygonal (e.g., hexagonal, square, triangle or the like). For example, as exemplified in FIG. 10, an arrester plate periphery 288 may have a discontinuous axial shape. In the example shown, arrester plate periphery 288 has first and second portions 332 and 336 connected by two discontinuities 340. Discontinuities 340 provide deviations from the regular (e.g. circular) shape of periphery first portion 332, and the regular (e.g. linear) shape of periphery second portion 336. In this example, discontinuities 340 are corners (also referred to as junctures) between first and second portions 332 and 336.

It will be appreciated that arrester plate 216 may have an irregular perimeter. For example, the arrester plate may have a shape wherein part of the plate has been truncated to increase the size of the dirt outlet gap. The truncated portion may be any portion of the plate and may be provided on the second portion. This feature may be used with any plate that has a smooth perimeter or which has a perimeter with discontinuities.

Figure 10:
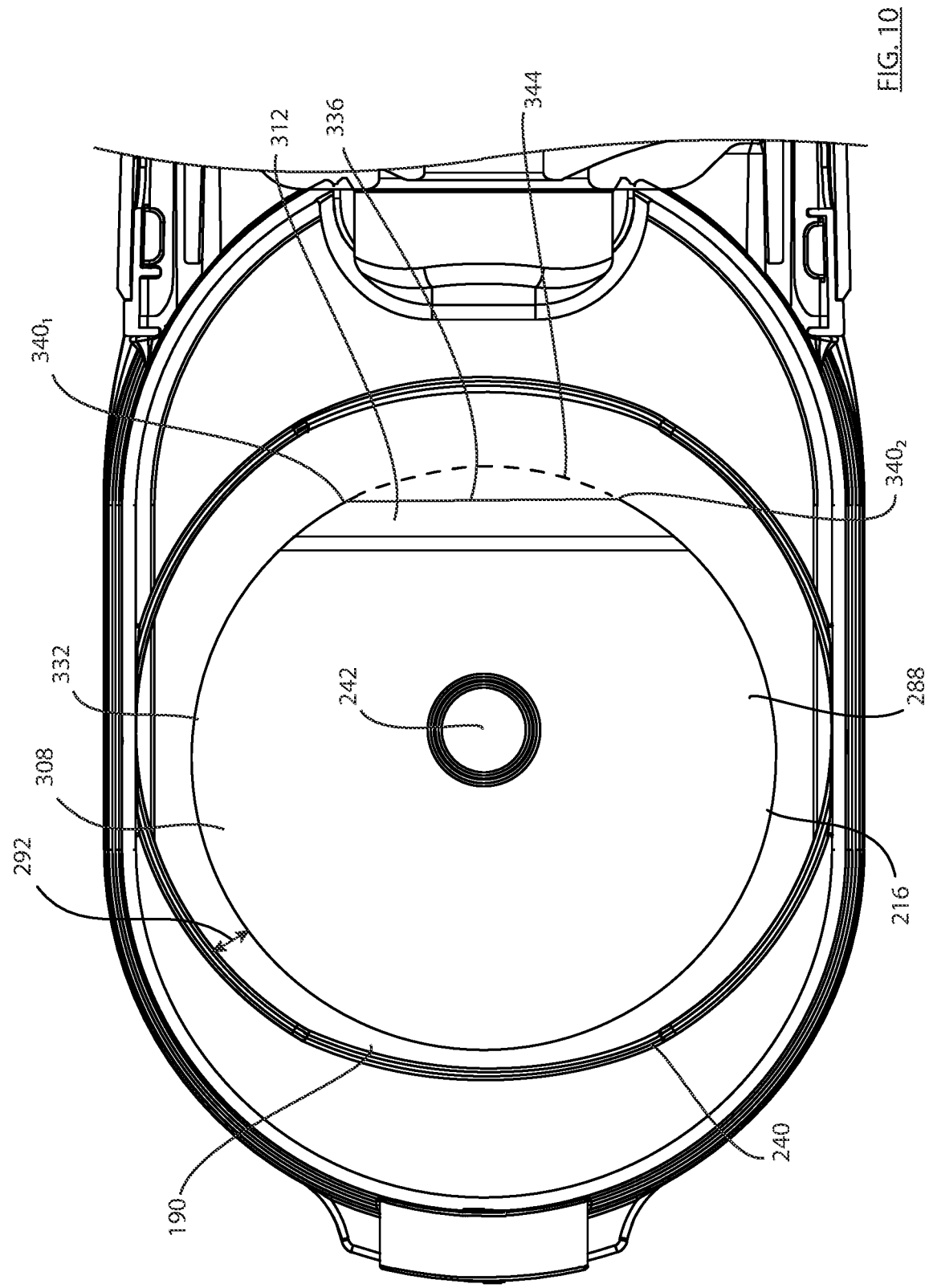
FIG. 10 is a cross-sectional view taken along line 9-9 in FIG. 8 with an arrester plate in accordance with another embodiment.

For example, as exemplified in FIG. 10, first and second discontinuities $340_1$ and $340_2$ may be provided on arrester plate second portion 312. For example, second portion 336 of arrester plate periphery 288 may border at least a portion of arrester plate second portion 312. As compared to arrester plate 216 were the axial shape of periphery first portion 332 continuous around the entire arrester plate periphery 288 (e.g. fully circular), a plate segment 344 has been removed where periphery second portion 336 truncates the axial shape of periphery first portion 332. As shown, periphery second portion 336 may be formed as a cord (e.g. linear crop) to the circular axial shape of periphery first portion 332. The removal of plate segment 344 may further enlarge dirt outlet gap lengths 292 at arrester plate second portion 312. This allows arrester plate 216 to allow even larger particles to pass through the portion of dirt outlet 190 located between periphery second portion 336 and cyclone sidewall 240, as compared to the same arrester plate 216 with plate segment 344 intact.

It will be appreciated that an arrester plate 216 with an axial step can create a concave (also referred to as 'hollow') step volume behind the axial face of the step. Depending on the manner in which the associated cyclone and dirt collection chambers are emptied, fibrous debris (e.g. hair) may snag or accumulate in the step volume when emptying the surface cleaning apparatus. Alternately, a hollow shape of the dirt chamber facing side of plate 216 may create eddy currents or otherwise interfere with dirt settling in the dirt collection chamber. Therefore, in some embodiments the step volume is closed by the dirt chamber face of the arrester plate. Closing the hollow step volume may be used with any axially stepped arrester described herein.

It will be appreciated that the closure portion may underlie or traverse only the transition portion, (e.g., if the transition portion extends at an angle to reference plane 324). Alternately, the closure portion may underlie both the transition portion and one or both of the first and second portions. As exemplified in FIGS. 11-19, the closure portion underlies both the transition portion and the first portion. An advantage of this design is that the axial thickness of the second portion is not increased. It will be appreciated that the more of the first portion that the closure portion underlies, the more gradual the angle of the closure portion may be.

Referring to FIGS. 4-5, an example arrester plate 216 is shown including an open step volume 348. Step volume 348 is a hollow volume behind transition portion dirt chamber face $364_3$. As shown, step volume 348 is bordered by transition portion 316 to one side and by first portion 308 above.

Figure 11:
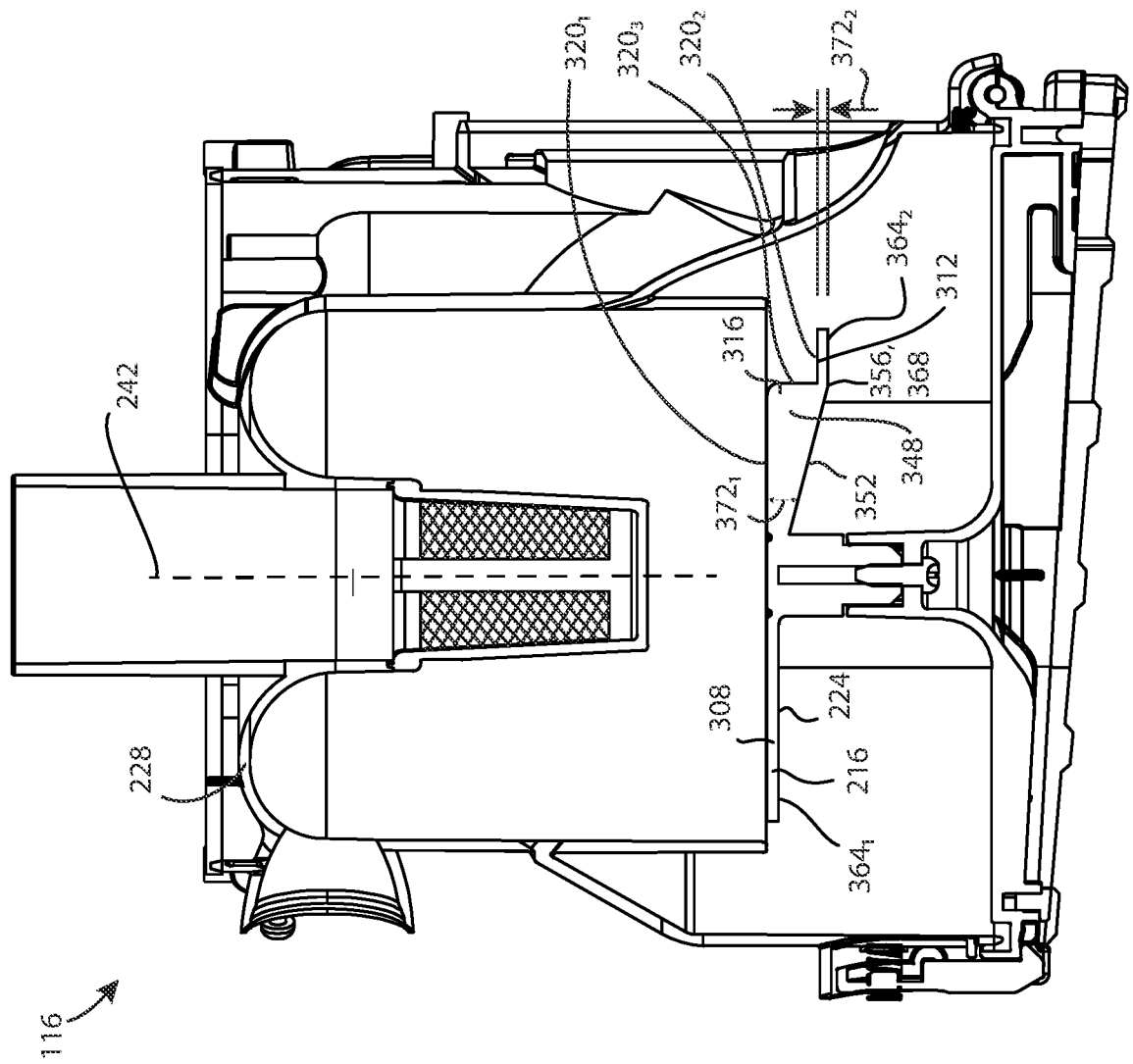
FIG. 11 is a cross-sectional view a cyclone bin assembly with an arrester plate in accordance with another embodiment.
Figure 12:
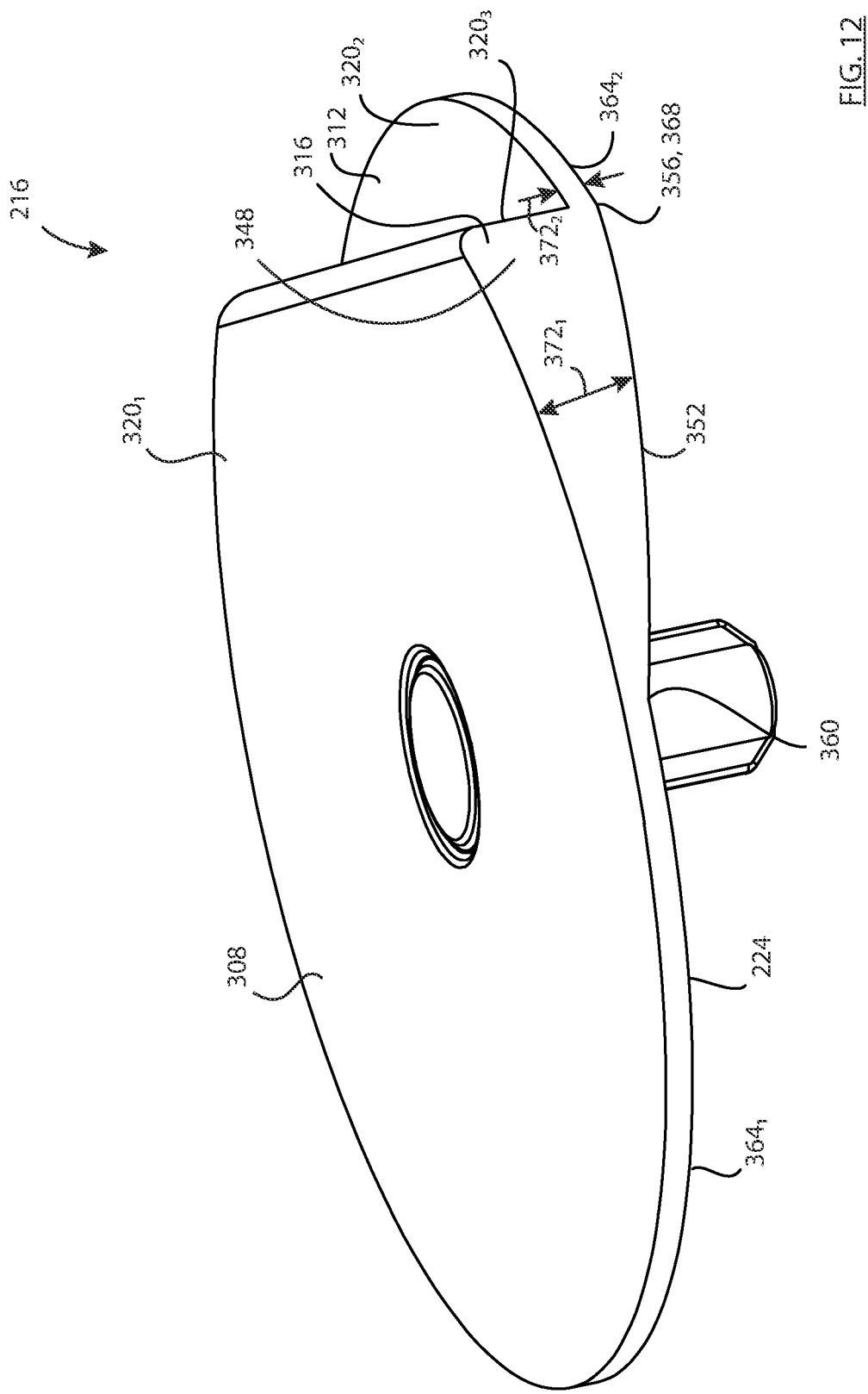
FIG. 12 is a top perspective view of the arrester plate of the cyclone bin assembly of FIG. 11.
Figure 13:
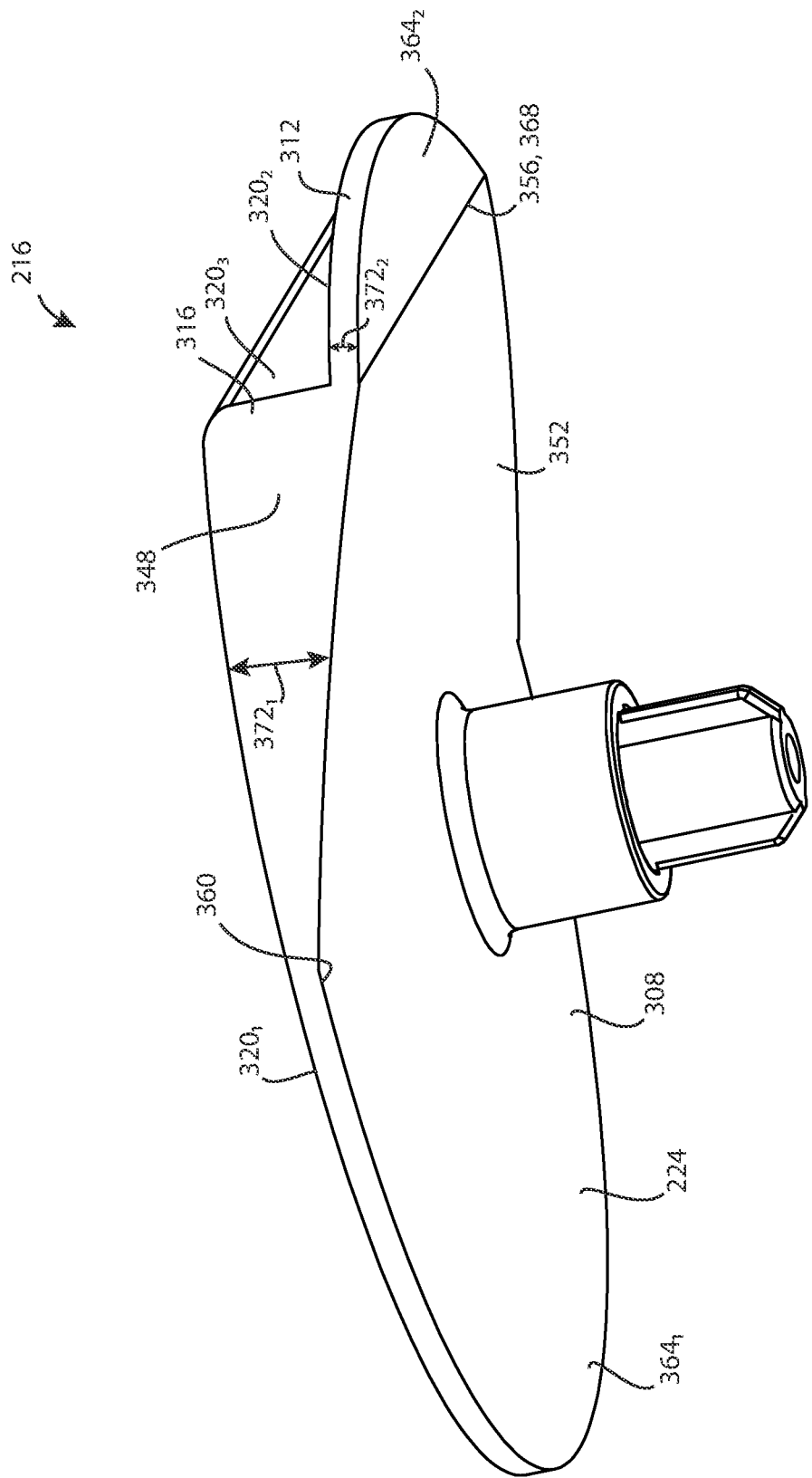
FIG. 13 is a bottom perspective view of the arrester plate of the cyclone bin assembly of FIG. 11.

FIGS. 11-13 exemplify an embodiment of arrester plate 216 in which step volume 348 is closed by a closure portion 352 of dirt chamber face 224. As shown, closure portion 352 may be opposed to transition portion cyclone chamber face $320_3$ and to at least a portion of first portion of cyclone chamber face $320_1$. By closing step volume 348, a smoother dirt chamber face of plate 216 is provided which may reduce eddy currents in the dirt collection chamber and facilitate dirt settling in the dirt collection chamber and not being reintrained into the cyclone chamber.

Closure portion 352 may have any configuration suitable to close step volume 348. In some embodiments, closure portion 352 may be free of concavities (e.g. entirely planar as shown, entirely convex, or include both planar and convex portions). In the illustrated example, closure portion 352 extends from a first end 356 proximate dirt chamber face $364_2$ of second portion 312 towards or across cyclone axis 242 to second end 360 within dirt chamber face $364_1$ of first portion 308.

Figure 14:
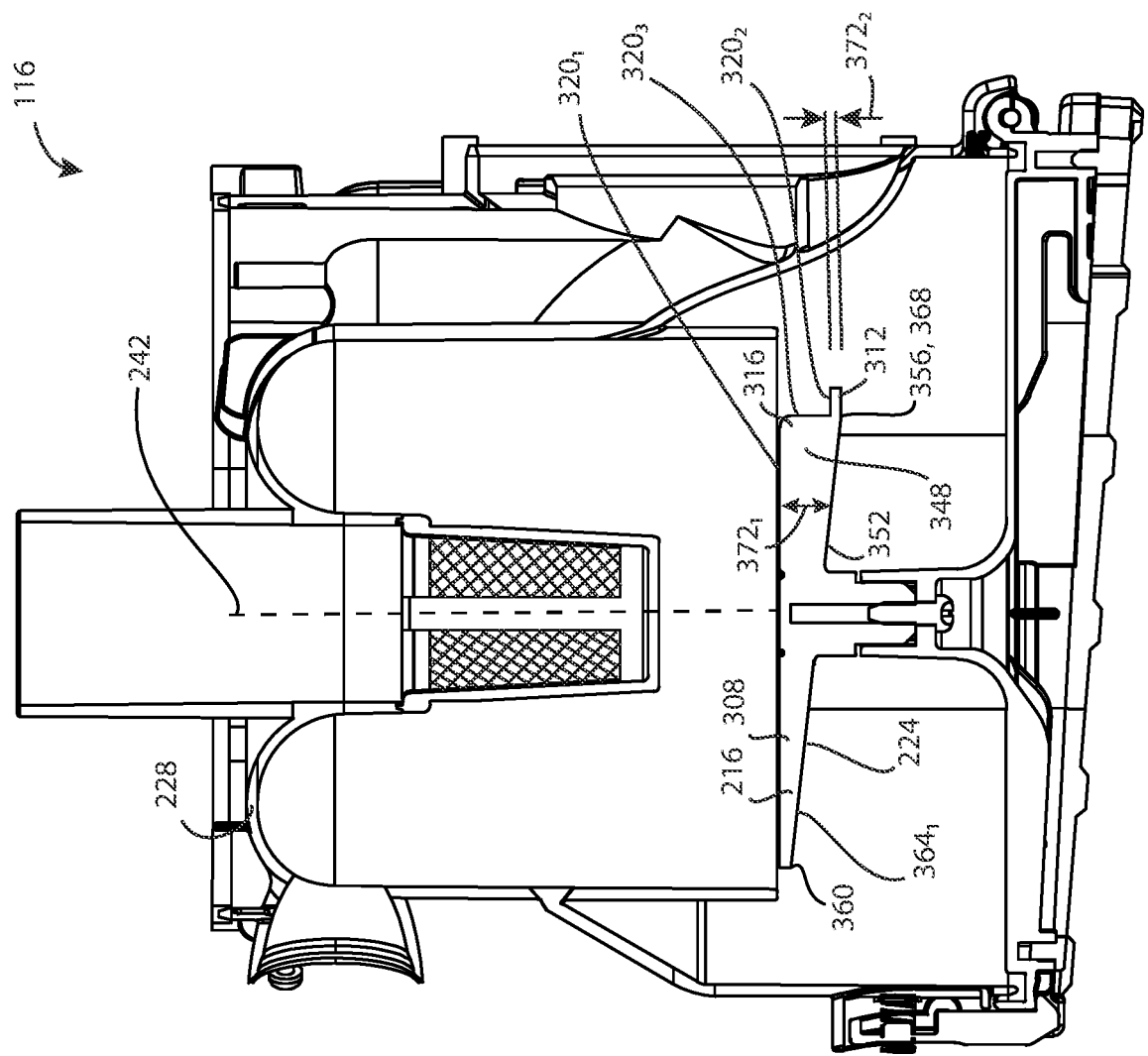
FIG. 14 is a cross-sectional view a cyclone bin assembly with an arrester plate in accordance with another embodiment.
Figure 15:
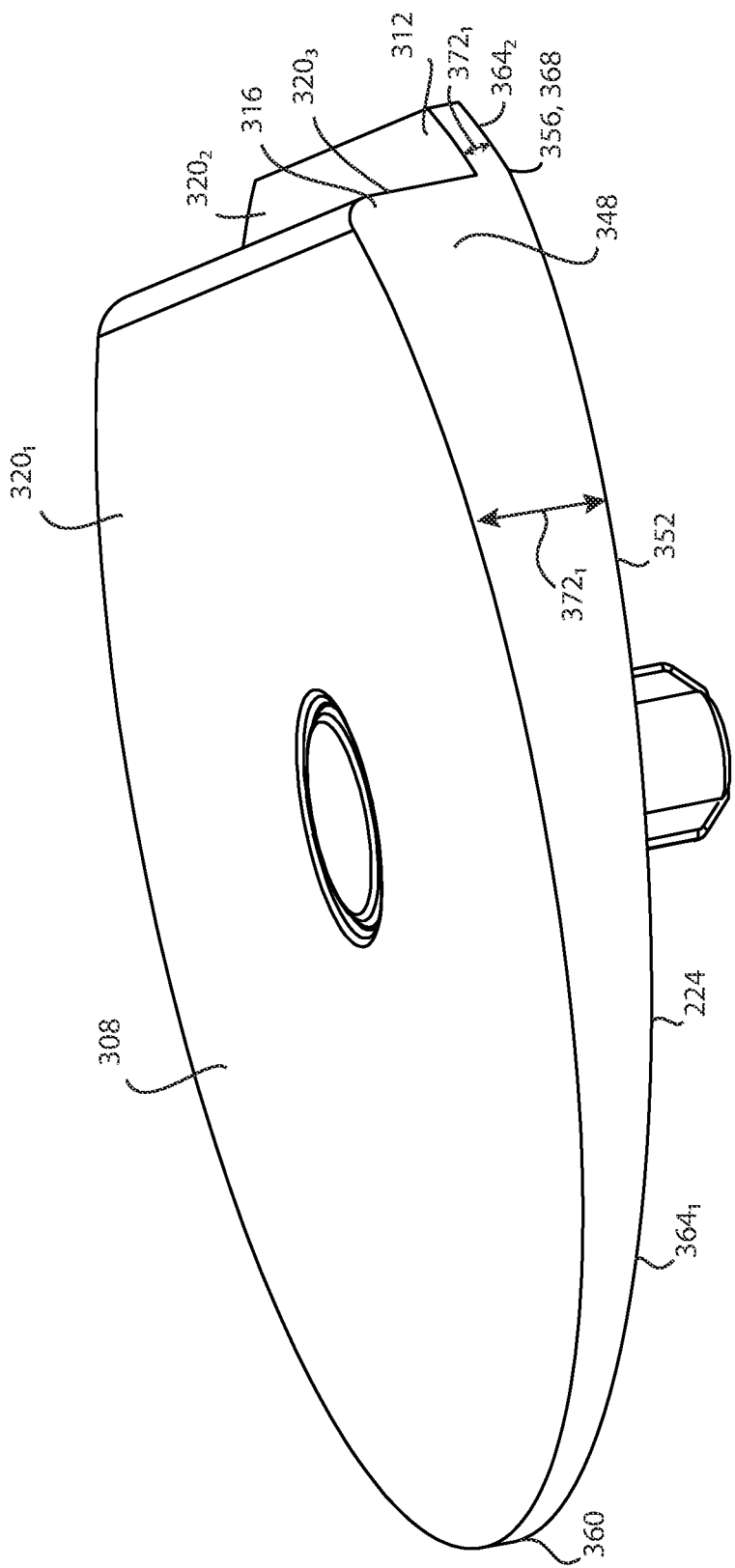
FIG. 15 is a top perspective view of the arrester plate of the cyclone bin assembly of FIG. 14.
Figure 16:
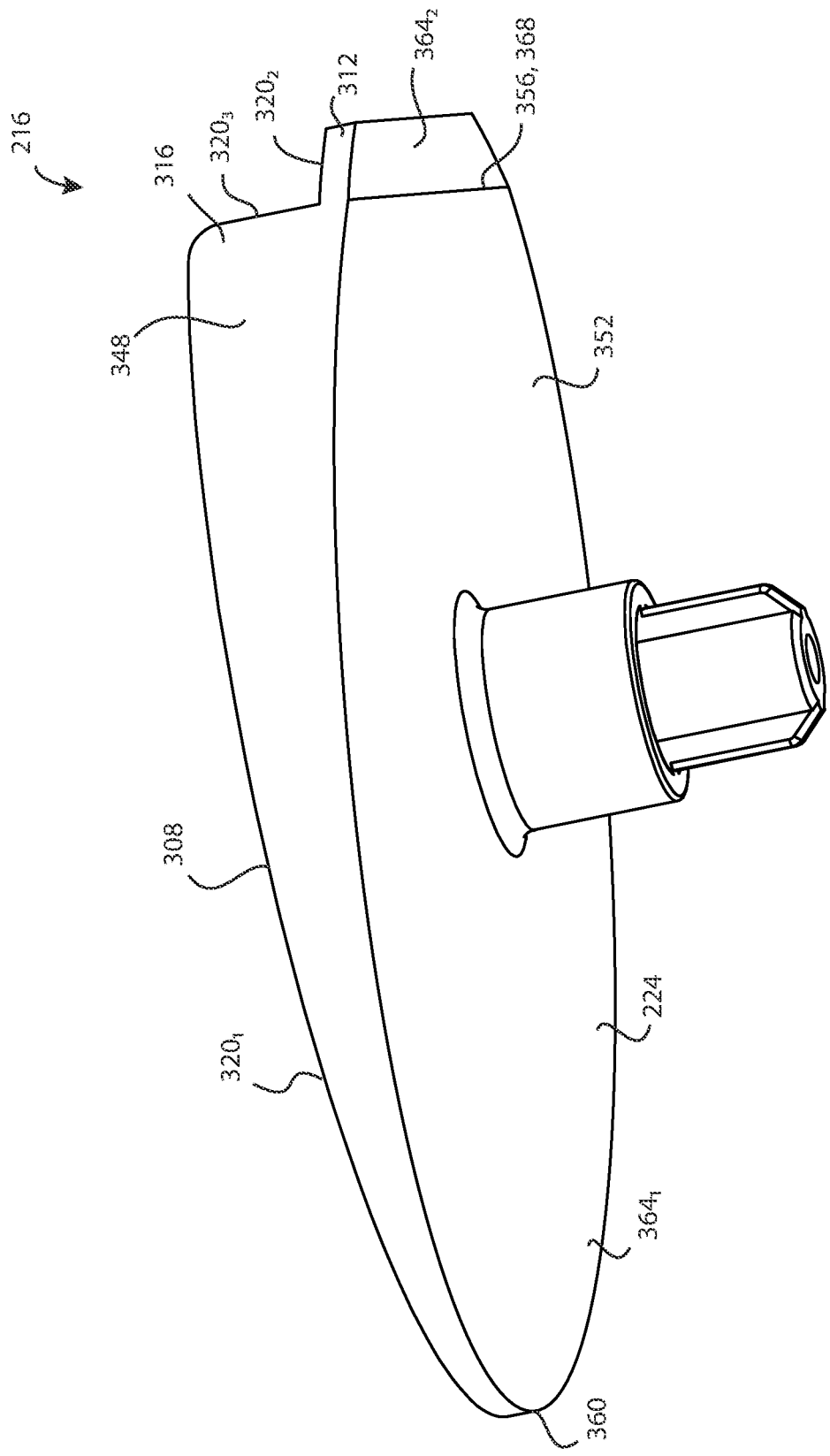
FIG. 16 is a bottom perspective view of the arrester plate of the cyclone bin assembly of FIG. 14.
Figure 17:
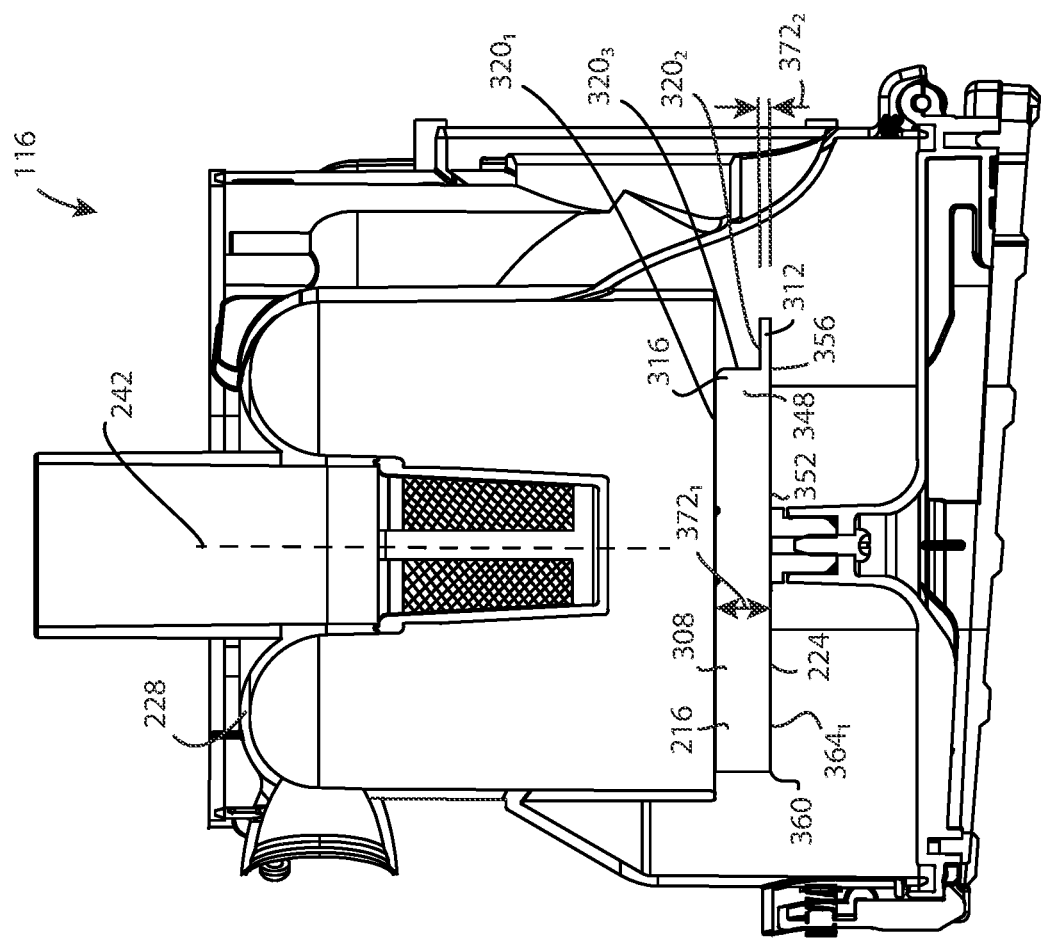
FIG. 17 is a cross-sectional view a cyclone bin assembly with an arrester plate in accordance with another embodiment.
Figure 18:
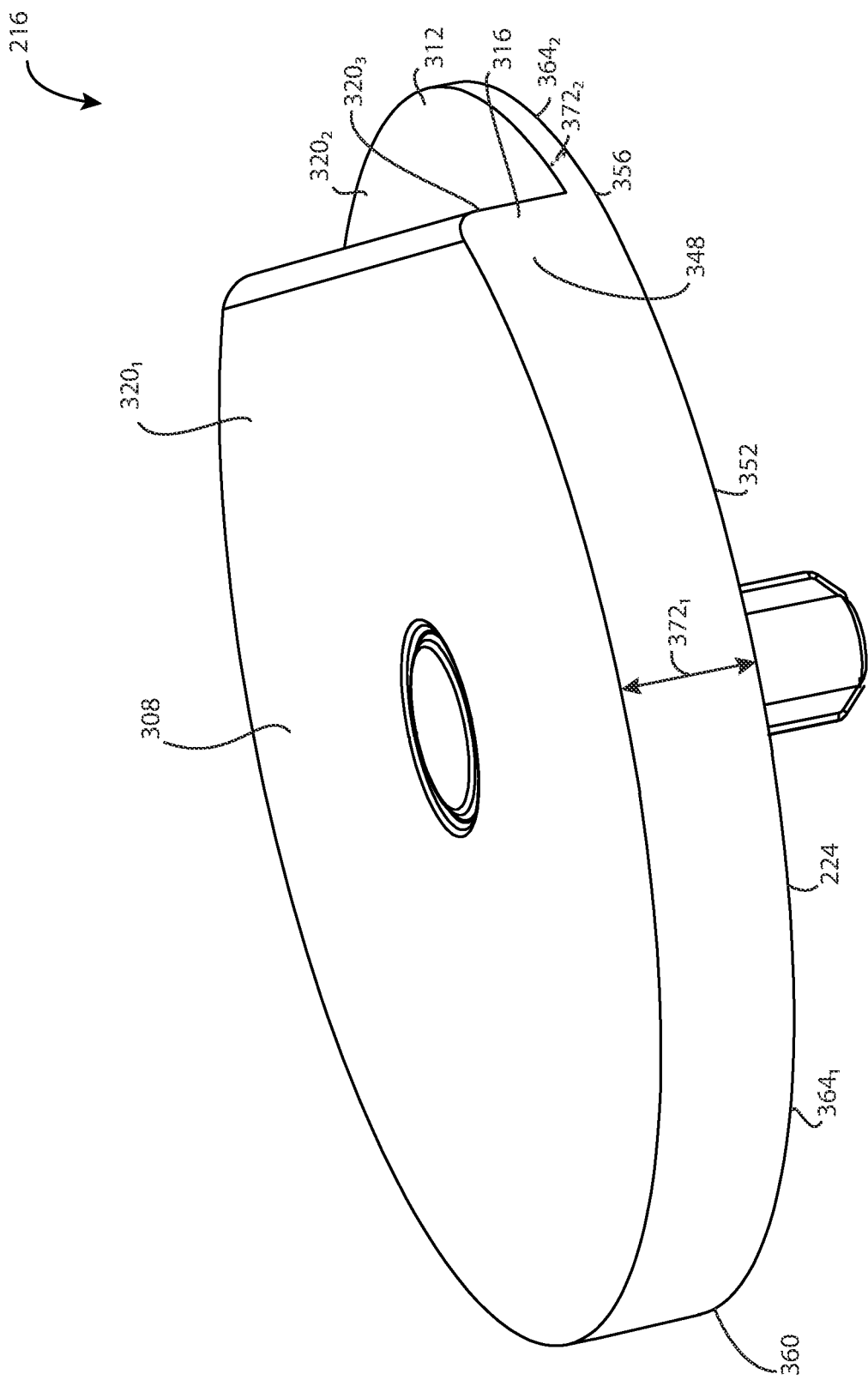
FIG. 18 is a top perspective view of the arrester plate of the cyclone bin assembly of FIG. 17.
Figure 19:
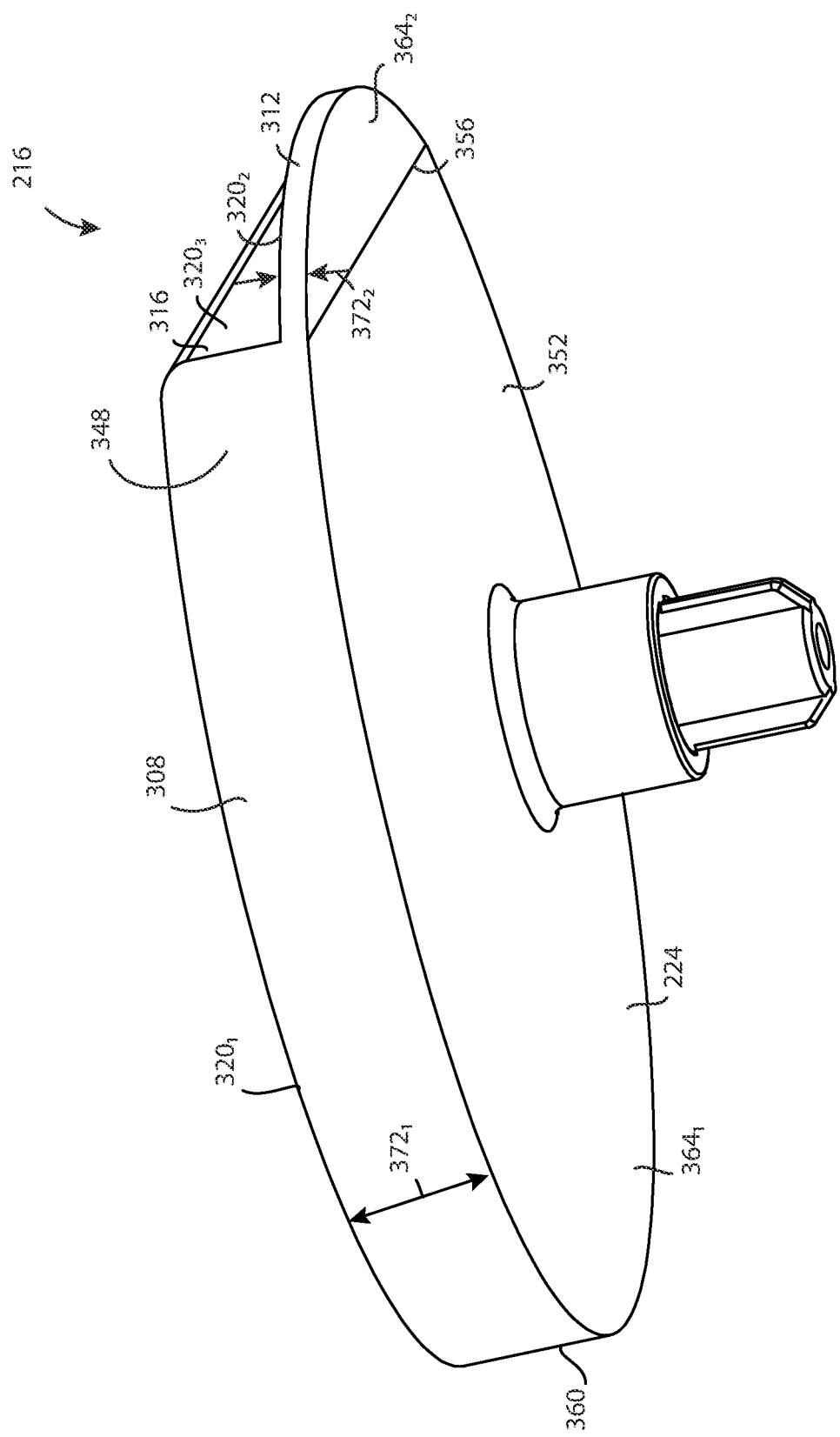
FIG. 19 is a bottom perspective view of the arrester plate of the cyclone bin assembly of FIG. 17.

FIGS. 11-13 exemplify an example in which closure portion second end 360 is proximate cyclone axis 242. FIGS. 14-16 exemplify an example of arrester plate 216 in which cyclone axis 288 is located between closure portions first and second ends 356 and 360. FIGS. 17-19 exemplify another example of arrester plate 216 in which cyclone axis 288 is located between closure portions first and second ends 356 and 360.

Closure portion 352 may extend transverse (i.e. non-parallel) to cyclone axis 242. For example, FIGS. 11-13 and 14-16 show examples of arrester plate 216 in which closure portion 352 is neither parallel nor perpendicular to cyclone axis 242. As shown, closure portion first end 356 may be axially and laterally spaced apart from closure portion second end 360. In the illustrated example, closure portion first end 356 is axially spaced from closure portion second end 360 away from cyclone chamber first end 228. FIGS. 17-19 show an example of arrester plate 216 in which closure portion first end 356 is axially aligned and laterally spaced apart from closure portion second end 360.

Referring again to FIGS. 11-13, closure portion 352 may be oriented so that it diverges from cyclone chamber face 320$_3$ of transition portion 316 in a direction away from arrester plate second portion 312. As shown, closure portion second end 360 may be spaced farther from cyclone chamber face 320$_3$ of transition portion 316 than closure portion first end 356.

Dirt chamber face 224 may have one or more discontinuities. For example, FIGS. 11-13 and 14-16 illustrate arrester plates 216 having a dirt chamber face 224 with a discontinuity 368 at the juncture of closure portion 352 and dirt chamber face 364$_2$ of second portion 312. The discontinuity is preferably rounded so as to avoid a sharp angle. In other embodiments, dirt chamber face 224 may be entirely continuous. For example, FIGS. 17-19 show an arrester plate 216 having a dirt chamber face 224 that is entirely planar. In the illustrated example, dirt chamber face 224 is perpendicular to cyclone axis 242. In other embodiments, dirt chamber face 224 may be oriented non-perpendicular and non-parallel to cyclone axis 242.

Plate first portion 308 may have an axial thickness 372$_1$ greater than axial thickness 372$_2$ of plate second portion 312. FIGS. 17-19 show an example arrester plate 216 having a plate first portion 308 with a uniform thickness 372$_1$ that is greater than thickness 372$_2$ of plate second portion 312. FIGS. 11-13 and 14-16 show example arrester plates 216 having a plate first portion 308 with a thickness 372$_1$ that increases towards transition portion 316. As shown, plate thickness 372$_1$ may increase between closure portion first and second ends 356 and 360 towards first end 356.

Radially Extending Gap

In accordance with this feature, the dirt collection chamber is external to the cyclone chamber and the dirt outlet from the cyclone chamber comprises or consists of a radially extending gap between the arrester plate and the cyclone chamber sidewall. In accordance with this feature, at least one part of the arrester plate is recessed inwardly such that, for a portion of the perimeter of the plate, a larger radial distance is provided between the cyclone chamber sidewall and the perimeter of the plate. Providing the larger radial distance may create a relatively larger dirt outlet gap between the cyclone chamber sidewall and the recessed part of the arrester plate periphery, which can allow larger debris to pass through the dirt outlet.

Without being limited by theory, as compared with an entirely circular arrester plate which provides a generally uniformly sized dirt outlet gap, varying the radial gap may provide greater separation efficiency (i.e. percentage of dirt particles of a dirty air flow separated from the air flow and retained in the dirt collection chamber) by permitting larger dirt particles to exit the cyclone chamber thereby reducing the likelihood that larger dirt particles in the cyclone chamber may produce eddy currents or otherwise interfere with the flow pattern in a cyclone chamber. Thus, a radially variable arrester design may allow the dirt collection chamber to admit large dirt particles (e.g. stones, dry foods, etc.) while providing a high separation efficiency.

In accordance with this design, the spacing generally may include a first portion that extends around a first portion of the perimeter of the plate and a second portion that extends around a second portion of the perimeter of the plate wherein the second portion of the spacing has a larger length in a radial direction in a plane of the plate than the first portion of the spacing. The larger length may be produced by a second part of the plate having the second portion of the perimeter having a different diameter or shape than a first part of the plate having the first portion of the perimeter.

It will be appreciated that, in addition, the second part of the plate may have a greater distance between the cyclone chamber face of the plate and the first or inlet end of the cyclone chamber than a distance of the first part of the plate and the first end of the cyclone chamber. Alternately, or in addition, the axial length of the cyclone chamber sidewall may vary around the perimeter of the cyclone chamber sidewall.

FIGS. 20 to 24 show an example of cyclone bin assembly having both arrester plate 216 and cyclone chamber sidewall 240 shaped to define a cyclone dirt outlet 190 formed by both an radially extending gap and a vertically extending gap between cyclone chamber sidewall 240 and the arrester plate 216. Accordingly, the size of the gap varies around the perimeter of the arrester plate 216 and it also varies in different directions.

Figure 20:
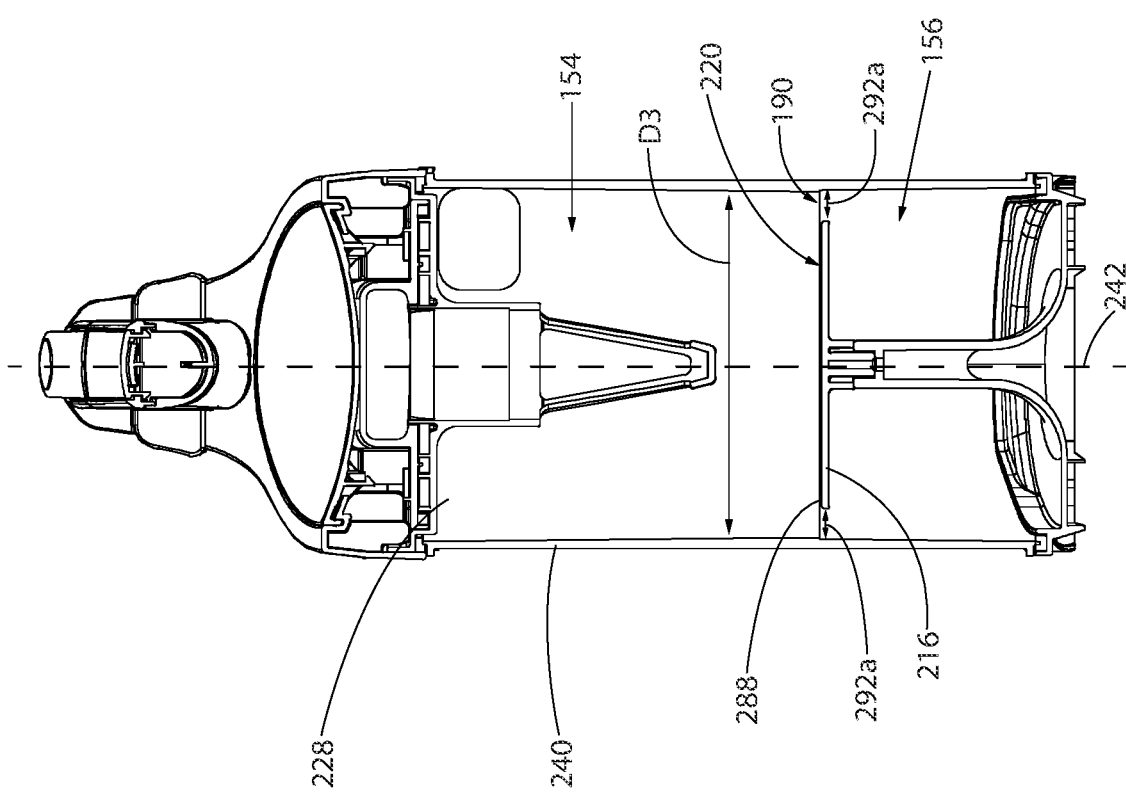
FIG. 20 is a cross-sectional view of a cyclone bin assembly looking rearwardly, the cyclone bin assembly having an arrester plate and a cyclone chamber sidewall defining a cyclone dirt outlet in accordance with another embodiment.
Figure 23A:
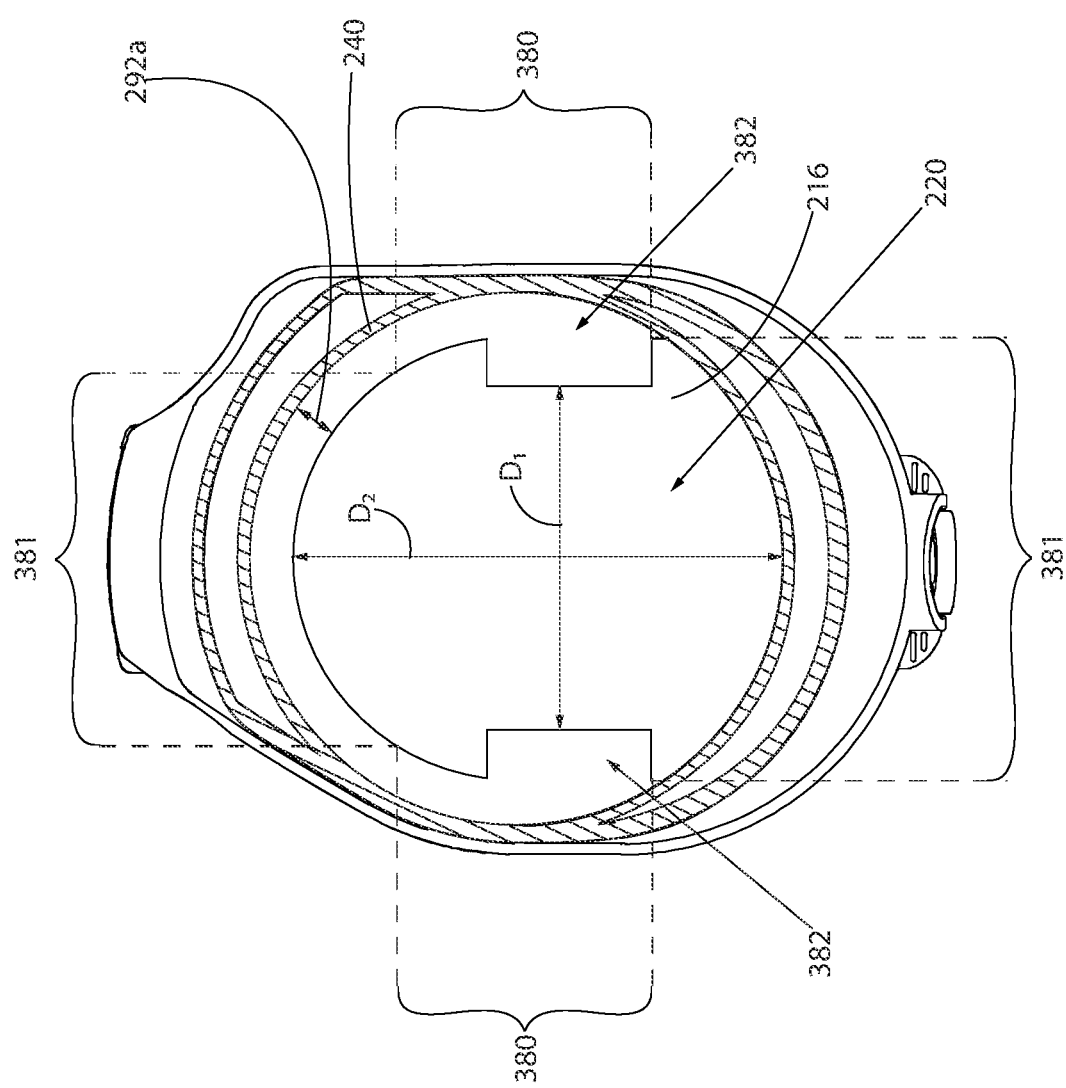
FIG. 23A is a cross-sectional view of the cyclone bin assembly of FIG. 20 as indicated by line 23A-23A in FIG. 21.

As exemplified in FIGS. 20 and 23A, a first part 380 of arrester plate 216 has a diameter $D_1$ that is smaller than the diameter $D_3$ of cyclone chamber 154 and, a second part 381 of arrester plate 216 has a diameter $D_2$ that is larger than the diameter $D_1$ of first part 380, and may be the same or larger than the diameter $D_3$ of cyclone chamber 154. Referring to FIG. 21, it can be seen that a projection of the cyclone chamber sidewall 240 does not intersect first part 380 of arrester plate 216 (the first part of the plate is located radially inwardly of the cyclone chamber sidewall) but intersects the second part 381 of arrester plate 216 (the perimeter of the second part of the plate underlies the free end 296 of cyclone chamber sidewall 240, e.g., an extension of the sidewall would intersect the outermost end of the second part of the plate). Further, as exemplified in FIG. 21, the cyclone chamber face 220 may be in the plane defined by the free end 296 of the portion of cyclone chamber sidewall 240 having length $L_2$. Accordingly, along the perimeter of first part 380, a first portion of the dirt outlet 190 is defined solely by a radially extending gap having a radial gap length 292a. However, along the perimeter of second part 381, a first length $L_1$ of the cyclone chamber sidewall 240 is shorter than a second length $L_2$ of the cyclone chamber sidewall 240 at the first part of the perimeter of the arrester plate 216. As exemplified, a shorter length $L_1$ is provided by a vertical or axially extending edge 383, of the sidewall 240 so as to provide a vertical recess 384. Accordingly, along the perimeter of second part 381, a second portion of the dirt outlet 190 is defined solely by a vertically extending gap between the cyclone chamber face 220 and the free end 296 of cyclone chamber sidewall 240, which has a vertical gap length 292b. Accordingly, the spacing between the cyclone chamber sidewall and the plate around the first part of the perimeter is larger than the spacing between the cyclone chamber sidewall and the plate around the second part of the perimeter and therefore, the spacing has a larger length in the radial direction. Concurrently, due to the vertical recess 384, the spacing around the second portion of the plate in the vertical direction of the plane of the sidewall (the direction of the cyclone axis) has a longer length than the first part of the plate.

Figure 22:
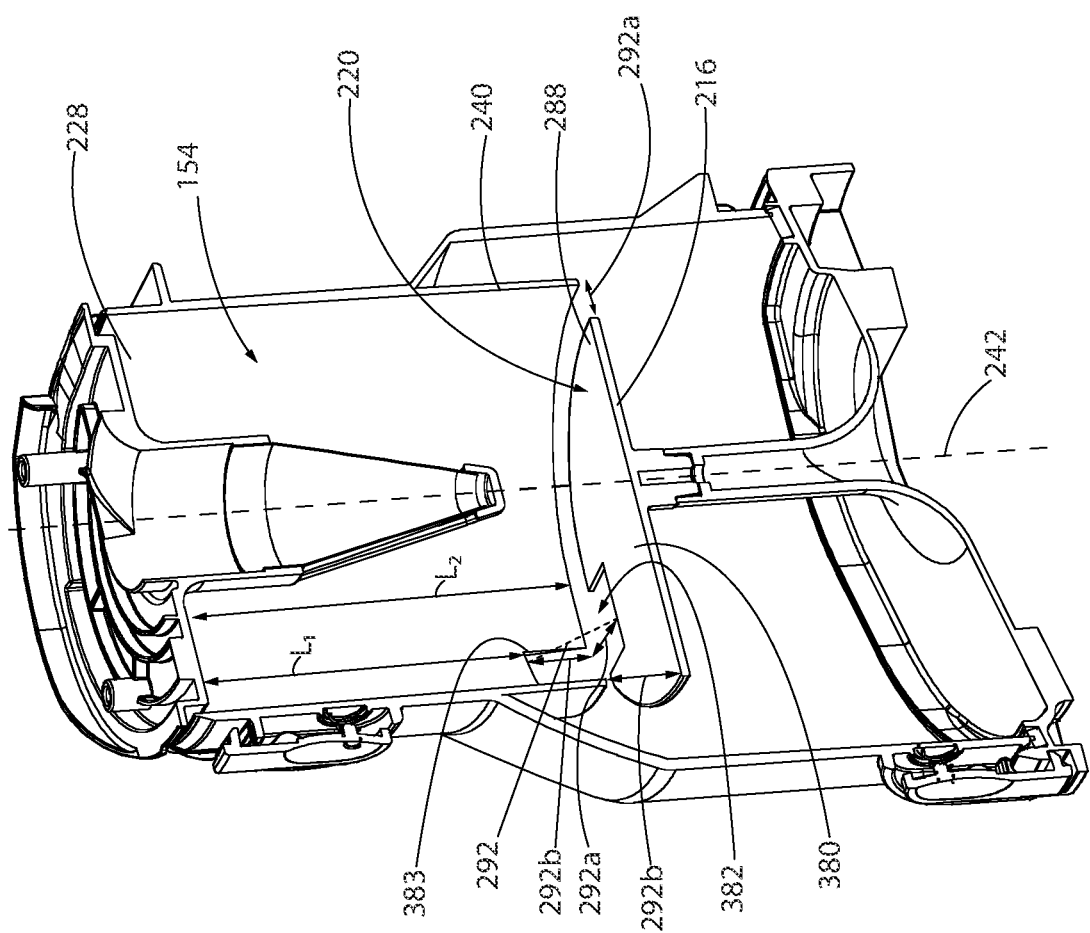
FIG. 22 is a perspective cross-sectional view from above of the cyclone bin assembly of FIG. 20.

As further shown in FIG. 22, the free end 296 of cyclone chamber sidewall 240 may also have a shorter length along a portion of the perimeter of first part 380. Accordingly, along this part of the perimeter, a third portion of the dirt outlet 190 is formed by both a radially extending gap having a radial gap length 292a and a vertically extending gap having a vertical gap length 292b. Accordingly, for this third portion of the dirt outlet 190, the gap length 292 therefore equates to the shortest distance between the perimeter of the arrester plate 216 and the cyclone chamber sidewall 240 and is generally non-perpendicular to the chamber facing surface of the arrester plate 216 and non-planar with the cyclone chamber sidewall 240.

It will be appreciated that by providing a radially recessed first part 380 of plate 216, a smaller dirt outlet gap length 292 is provided for part of the perimeter of the plate, while varying the length of the cyclone chamber sidewall 240 may provide, alone or in conjunction with the recessed first part 380 of the plate, a larger dirt outlet gap length 292 for another part of the perimeter of the plate.

As exemplified in FIG. 23A, the first part 380 of the arrester plate 216, which has a diameter that is less than the diameter of the cyclone chamber 154, is generally linear. It will be appreciated that this part need not be linear but may be curved (e.g., concave is shape) or may be stepped inwardly so as to define a recess 382. It will also be appreciated that only portion of this part may be generally linear or curved. As also exemplified, the second part (the front and rear parts as exemplified) of plate 216 are curved. The front and rear parts may have the same curvature or radius or, as exemplified, they may differ. However, the perimeter of part or all of the second part need not be curved. As exemplified in FIGS. 32A and 32B, part of the perimeter of the second part (the front of plate 216) is linear so as to define a generally D-shaped plate 216.

It will also be appreciated that, in an alternate embodiment, all of the cyclone chamber face 220 may be spaced axially from the plane defined by the free end 296 of the portion of cyclone chamber sidewall 240 having length $L_2$ in a direction away from first end 228.

As exemplified in FIG. 25, some of plate 216 may be spaced axially from the plane defined by the free end 296 of the portion of cyclone chamber sidewall 240 having length $L_2$ in a direction towards first end 228. In this example, a portion of the cyclone chamber sidewall 240 extends below the top surface of the arrester plate 216 such that a radial projection of the top surface of the arrester plate 216 intersects the cyclone chamber sidewall 240. In this example, at the part of the arrester plate 216 where the portion of the cyclone chamber sidewall 240 extends below the top surface is at a rear part of the arrester plate 216, but it should be understood that any portion of the cyclone chamber sidewall 240 may extend below the top surface of the arrester plate 216. A radially extending gap having a radial gap length 292a is shown at the rear part of the arrester plate 216. It will be appreciated that a vertically extending gap having a gap length 292b is provided at the portion of the cyclone chamber sidewall that extends below the top surface of the of the arrester plate 216. In this manner, a piece of debris passing from the cyclone chamber 154 to the dirt collection chamber 156 passes over perimeter of the arrester plate 216 and downward through the radially extending portion of the gap to the dirt collection chamber.

It will be appreciated that the transition between the first length $L_1$ of the cyclone chamber sidewall 240 and the second length $L_2$ of the cyclone chamber sidewall 240 can be anywhere along the perimeter of the arrester plate 216.

Figure 31:
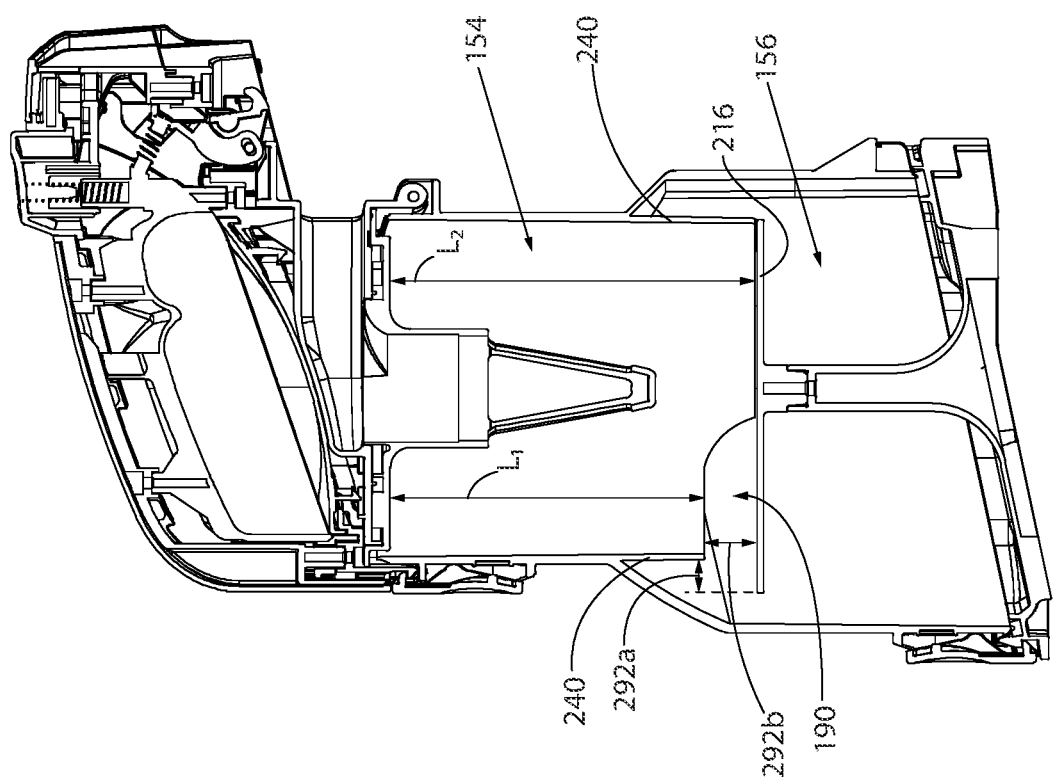
FIG. 31 is a cross-sectional view of a cyclone bin assembly having an arrester plate and cyclone chamber sidewall defining a cyclone dirt outlet in accordance with another embodiment.

As also exemplified in FIGS. 25 and 26, a variable length of the cyclone chamber sidewall 240 may be provided by other than having an axially extending edge 383. For example, as exemplified in FIGS. 25 and 26, free end 296 of cyclone chamber sidewall 240 may extend at an angle to the cyclone axis (free end 196 of the cyclone chamber sidewall 240 may have a constantly, e.g. linearly, increasing length between the first part of the arrester plate 216 and the second part of the arrester plate 216). Alternately, as exemplified in FIG. 29, only a portion of free edge 296 may be at an angle or, as exemplified in FIG. 31, it may be curved so as to provide a curved transition.

Figure 23B:
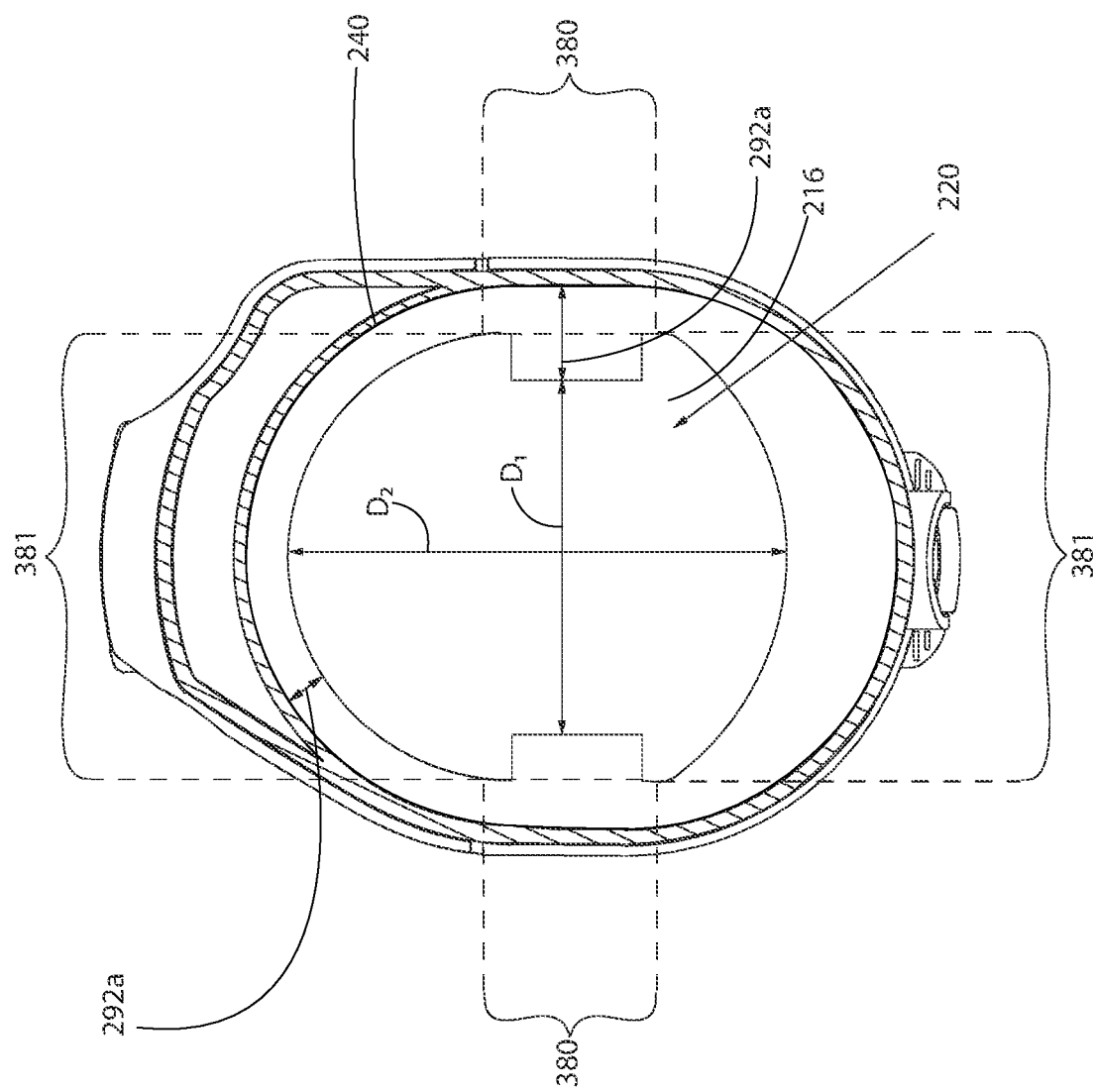
FIG. 23B is a cross-sectional view of the cyclone bin assembly of FIG. 20 as indicated by line 23B on FIG. 21.

In the embodiment of FIG. 25, plate 216 may have a length such that a front part of the arrester plate 216 extends to the cyclone chamber sidewall 240 such that a projection of the cyclone chamber sidewall 240 intersects the arrester plate 216. If plate 216 has the same shape as shown in FIG. 23B, then along the perimeter of second part 381, only a vertical gap may be provided. An annular and a vertical gap may be provided along the perimeter of first part 380. It should be noted that the vertically extending gap having a vertical gap length 292b at the front part of the arrester plate 216 and the vertically extending gap having a vertical gap length 292b at the rear part of the arrester plate 216 may have same or different vertical gap lengths.

In the embodiment of FIG. 26, plate 216 may extend forwardly the same amount as in FIG. 25 such that the front part of the arrester plate 216 extends to the cyclone chamber sidewall 240 such that a projection of the cyclone chamber sidewall 240 intersects the arrester plate 216. However, in this embodiment, unlike FIG. 25, a rear part of the plate abuts the rear part of cyclone chamber sidewall 240. In this example, the constantly increasing length of the cyclone chamber sidewall 240 begins at the front part of the arrester plate 216 where the gap forming the cyclone dirt outlet 190 includes a vertically extending gap having a vertical gap length 292b. The vertical gap length 292b then decreases in length along the arrester plate 216 towards a rear part of the arrester plate 216, terminating at the rear part of the arrester plate 216 where the vertical gap length 292b is zero. If plate 216 has the same shape as shown in FIG. 23B, then along the perimeter of second part 381, only a vertical gap may be provided. An annular and a vertical gap may be provided along the perimeter of first part 380, except for the part that abuts the cyclone chamber sidewall 240. It will be appreciated that plate 216 may be axially spaced from free end 196 of the cyclone chamber sidewall 240 so as to define a smaller vertical gap 292b at the rear end of plate 216.

FIG. 27 exemplifies an embodiment similar to that of FIG. 21. However, unlike the embodiment of FIG. 21, plate 26 has a diameter that is the same as the diameter of the cyclone chamber. As cyclone chamber face 220 is in the plane defined by the free end 296 of the portion of cyclone chamber sidewall 240 having length $L_2$, in the embodiment of FIG. 27, the rear end of plate 216 abuts the free end of cyclone chamber sidewall 240 in a similar manner to what is shown in FIG. 26. It will be appreciated that plate 216 may be axially spaced from free end 196 of the cyclone chamber sidewall 240 so as to define a smaller vertical gap 292b at the rear end of plate 216.

It will be appreciated that two or more larger portions of the dirt outlet 190 may be provided. For example, as exemplified in FIG. 22, two recesses 384 may be provided instead of or in addition to the larger dirt outlet provided by the vertical recess 384, in the cyclone chamber sidewall. Alternately, two or more vertical recesses 384, may be provided. Examples of such embodiments are provided in FIGS. 28 and 30.

As exemplified in FIG. 28, the cyclone dirt outlet 190 comprises a first cyclone dirt outlet portion 190a and a second cyclone dirt outlet portion 190b. As exemplified, the first cyclone dirt outlet portion 190a is formed at a front part of the arrester plate 216 and the second cyclone dirt outlet portion 190b is formed at a rear part of the arrester plate 216. The first cyclone dirt outlet portion 190a is formed by a vertically extending gap having a vertical gap length 292b and the second cyclone dirt outlet portion 190b is formed by a vertically extending gap also having a vertical gap length 292b. It should be noted that the first cyclone dirt outlet portion 190a and the second cyclone dirt outlet portion 190b may be the same as exemplified or they may have different vertical gap lengths. The first cyclone dirt outlet portion 190a and the second cyclone dirt outlet portion 190b are separated by a second portion 386 of the cyclone chamber sidewall 240 having a length $L_2$ that is longer than the length $L_1$ of a first portion 385 of the cyclone chamber sidewall 240 defining the cyclone dirt outlets portion 190a, 190b. As exemplified, the length $L_2$ of the second portion 386 of the cyclone chamber sidewall 240 extends to the second part of the arrester plate 216 where the vertical gap length 292b is zero (i.e. the free end 296 of cyclone chamber sidewall 240 abuts the arrester plate 216). It will be appreciated that plate 216 may be axially spaced from free end 296 of the cyclone chamber sidewall 240 so as to define a smaller vertical gap 292b at this location.

In the example shown in FIG. 28, the transitions between the first length of the cyclone chamber sidewall 240 and the second length of the cyclone chamber sidewall 240 are generally vertical and can be anywhere along the perimeter of the arrester plate 216. Alternately, as exemplified in FIG. 29, the transition between the first length of the cyclone chamber sidewall 240 and the second length of the cyclone chamber sidewall 240 need not be vertical but rather may be gradual. For example, as exemplified, free end 296 may extend linearly at an angle to the cyclone axis such that the length of the first portion of the cyclone chamber sidewall 240 gradually increases in a linear fashion as the cyclone chamber sidewall 240. extends towards a rear part of the arrester plate 216. Alternately, free end 296 may be curved as exemplified in FIG. 31).

It will also be appreciated that a portion of plate 216 may extend radially outwardly of cyclone chamber sidewall 240. Also exemplified in FIGS. 29 and 31, the front part of the arrester plate 216 extends beyond a projection of the cyclone chamber sidewall 240 such that the projection of the cyclone chamber sidewall 240 intersects the arrester plate 216. If plate 216 has the same shape as shown in FIG. 23B, then at the front of the cyclone chamber, the cyclone dirt outlet 190 is formed by a vertically extending gap having a vertical gap length 292b and a radially extending gap having a radial gap length 292a is provided along the lateral sides of the plate 216.

It will be appreciated that, in any of the forging embodiments, the second part of the perimeter of the plate 216 may have a greater distance between the cyclone chamber face of the plate 216 and the first end of the cyclone chamber 154 than a distance of the first part of the plate 216 and the first end of the cyclone chamber 154. For example, FIGS. 33A to 39B show further examples of cyclone bin assemblies wherein a variable sized dirt outlet is provided using an axially stepped plate 216 and a cyclone chamber sidewall 240 having a variable length. Optionally, as shown in these examples, the plate 216 may have different diameters in different directions (as exemplified in FIG. 23B and/or radially inward recesses as exemplified in FIG. 22. Accordingly, in FIGS. 33A to 39B cyclone dirt outlet 190 is formed at least partially by a vertically extending gap and a radially extending gap between cyclone chamber sidewall 240 and the arrester plate 216. In these examples, the shape of the cyclone chamber sidewall 240 and the shape of the arrester plate 216 each vary to define the gap forming cyclone dirt outlet 190.

In the example shown in FIGS. 33A and 33B, a front part of the arrester plate 216 is vertically stepped downwardly (as previously described) and the front portion of the cyclone chamber sidewall 240 has a shorter length than a rear portion of the cyclone chamber sidewall, thereby creating a vertically extending gap of vertical gap length $292b_2$ at the front part of the arrester plate 216 and a vertically extending gap of vertical gap length $292b_1$ at a side part of the arrester plate 216 rearward of the vertical step of the arrester plate 216. In addition, as the plate is shaped like the plate exemplified in FIG. 23B, a radial extending gap of radial gap length 292a is also provided on the lateral sides of plate 216. Accordingly, the spacing between the cyclone chamber sidewall and the plate around the first part of the perimeter is larger than the spacing between the cyclone chamber sidewall and the plate around the second part of the perimeter and therefore, the spacing has a larger length in the radial direction. Concurrently, due to the stepped arrester design, the spacing around the second portion of the plate in the vertical direction of the plane of the sidewall (the direction of the cyclone axis) has a longer length than the first part of the plate.

In the example shown in FIGS. 34A and 34B, part of the forward part of the arrester plate 216 that is vertically stepped downwardly (as previously described) extends beyond (radially outwardly of) a projection of the front portion of the cyclone chamber sidewall 240. Accordingly, the dirt outlet comprises a radial extending gap of radial gap length 292a that is provided on the lateral sides of plate 216, a vertically extending gap of vertical gap length $292b_1$ at the sides of the forward part of the plate 216 and a larger vertically extending gap of vertical gap length $292b_2$ at the front of the forward part of the plate 216. It will be appreciated that gap length $292b_1$ may be larger than gap length $292b_2$.

The example shown in FIGS. 35A and 35B is similar to that of FIGS. 34A and 34B except that the entirety of the forward part of the arrester plate 216 that is vertically stepped downwardly (as previously described) extends beyond a projection of the front portion of the cyclone chamber sidewall 240. Accordingly the dirt outlet comprises a radial extending gap of radial gap length 292a that is provided on the lateral sides of plate 216, a vertically extending gap of vertical gap length $292b_1$ at the sides of the forward part of the plate 216 and a shorter vertically extending gap of vertical gap length $292b_2$ at the front of the forward part of the plate 216.

The example shown in FIGS. 36A and 36B is similar to that of FIGS. 34A and 34B except that only the stepped down portion underlies the free edge 296 of the cyclone chamber sidewall such that the vertical gap is defined between the stepped down portion and the free edge 296.

Figure 37B:
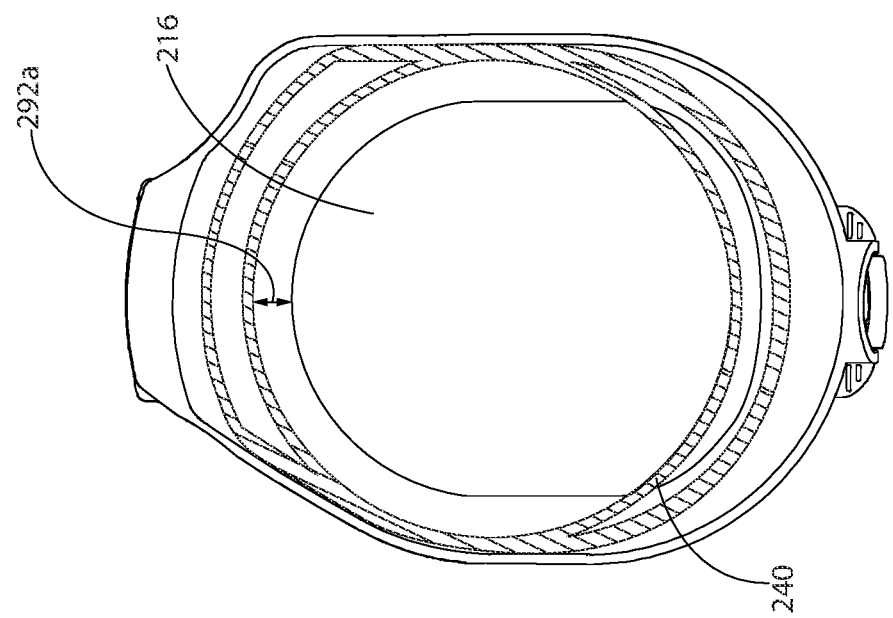
FIG. 37B is a cross-sectional view of the cyclone bin assembly of FIG. 37A looking downwards at the arrester plate along a similar line as indicated by line 23A-23A in FIG. 21.
Figure 37A:
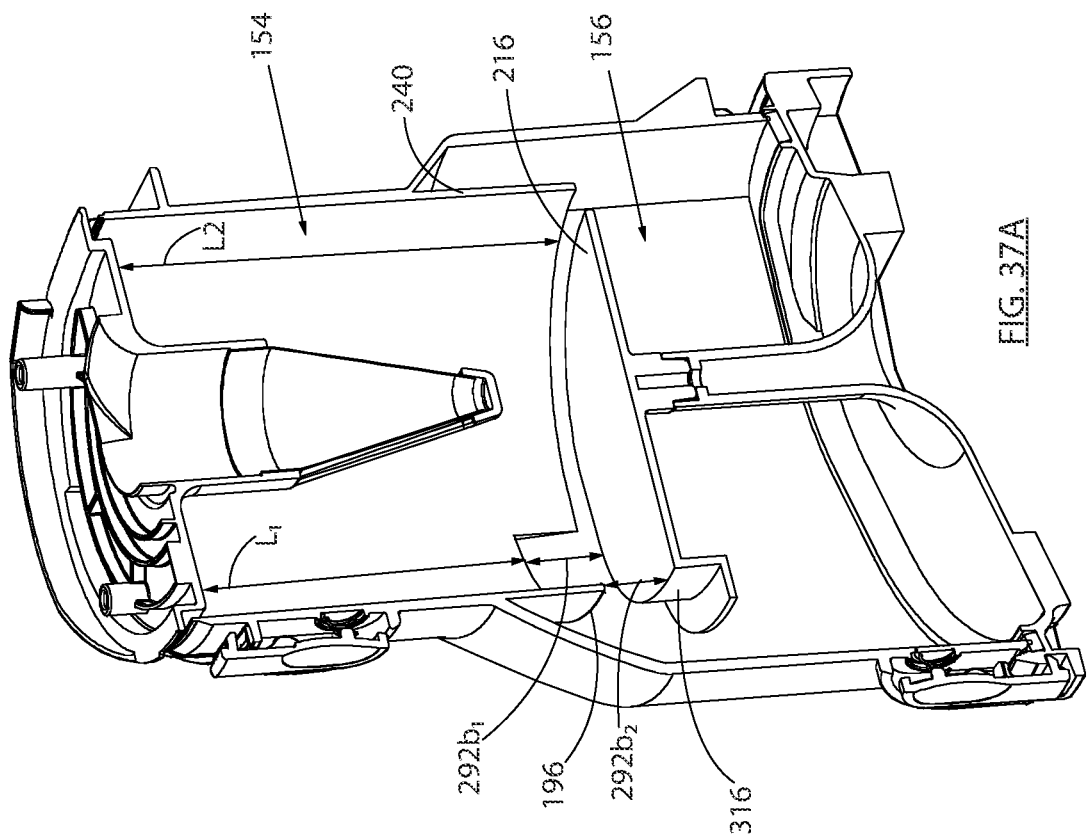
FIG. 37A is a cross-sectional view of a cyclone bin assembly looking towards a side of the cyclone bin assembly, the cyclone bin assembly having an arrester plate and cyclone chamber sidewall defining a cyclone dirt outlet in accordance with another embodiment.

The example shown in FIGS. 37A and 37B is similar to that of FIGS. 34A and 34B except that transition portion 316 underlies the free edge 296 of the cyclone chamber sidewall.

The example shown in FIGS. 38A and 38B is similar to that of FIGS. 34A and 34B except that all of the stepped down portion is positioned radially outwardly of the cyclone chamber sidewall 240.

In the example shown in FIGS. 39A and 39B, the front part of the arrester plate 216 is vertically sloped downwardly and towards the front of the cyclone chamber assembly to form the vertically extending gap of vertical gap length $292b_2$ at the front part of the arrester plate 216.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A vacuum cleaner comprising:
   (a) an air flow path extending from a dirty air inlet to a clean air outlet;
   (b) a cyclone and a suction motor provided in the air flow path;
   (c) the cyclone comprising a cyclone chamber having a central longitudinal axis, the cyclone having a first end having a first end wall, an axially spaced apart second end, a cyclone chamber sidewall located between the first and second ends, a cyclone air inlet provided at the first end, a cyclone air outlet provided at the first end and a dirt outlet provided at the second end, wherein a first end of the cyclone chamber sidewall is located at the first end of the cyclone and a second end of the sidewall is spaced from the first end and has an end face;
   (d) a plate located at the second end of the cyclone, the plate having a plate perimeter, a cyclone chamber face that faces towards the first end of the cyclone, wherein the plate is moveably mounted between a closed position, in which the plate is positioned for operation of the cyclone, and an open position wherein the plate is moved to provide access to the cyclone chamber; and,
   (e) a dirt collection region in communication with the cyclone chamber via the dirt outlet,
   wherein, when the plate is in the closed position, at least a portion of the end face of the cyclone chamber sidewall extends at an angle to the central longitudinal axis whereby the dirt outlet comprises an axial spacing between the cyclone chamber sidewall and the plate, and
   wherein, when the plate is in the closed position, the dirt outlet further comprises a radial spacing between the cyclone chamber sidewall and the plate.

2. The vacuum cleaner of claim 1 wherein all of the end face extends at an angle to the central longitudinal axis.

3. The vacuum cleaner of claim 1 wherein only a portion of the end face extends at an angle to the central longitudinal axis.

4. The vacuum cleaner of claim 1 wherein the dirt outlet has first side defined by the end face and an axially spaced apart second side defined by the plate and the first side of the dirt outlet is defined by the end face.

5. The vacuum cleaner of claim 1 wherein the end face has first and second sides that are spaced apart in a transverse direction that is transverse to the central longitudinal axis, the first side of the end face is axially spaced from the plate and the second side of the end face is positioned closer to the plate than the first end of the end face.

6. The vacuum cleaner of claim 1 wherein a portion of the plate is located radially inwardly of the cyclone chamber sidewall.

7. The vacuum cleaner of claim 1 wherein the end face has first and second sides that are spaced apart in a transverse direction that is transverse to the central longitudinal axis, the first side of the end face is axially spaced from the plate and is located closer to the first end of the cyclone than the plate, and the second side of the end face is located further from the first end of the cyclone than the plate.

8. A vacuum cleaner comprising:
   (a) an air flow path extending from a dirty air inlet to a clean air outlet;
   (b) a cyclone and a suction motor provided in the air flow path;
   (c) the cyclone comprising a cyclone chamber having a central longitudinal axis, the cyclone having a first end having a first end wall, an axially spaced apart second end, a cyclone chamber sidewall located between the first and second ends, a cyclone air inlet provided at the first end, a cyclone air outlet provided at the first end and a dirt outlet provided at the second end, wherein a first end of the cyclone chamber sidewall is located at the first end of the cyclone and a second end of the sidewall is spaced from the first end and has an end face;
   (d) a plate located at the second end of the cyclone, the plate having a plate perimeter, a cyclone chamber face that faces towards the first end of the cyclone, wherein the plate is moveably mounted between a closed position, in which the plate is positioned for operation of the cyclone, and an open position wherein the plate is moved to provide access to the cyclone chamber; and,
   (e) a dirt collection region in communication with the cyclone chamber via the dirt outlet,
   wherein, when the plate is in the closed position, the end face has first and second sides that are spaced apart in a transverse direction that is transverse to the central longitudinal axis, the first side of the end face is axially spaced from the plate whereby the dirt outlet comprises a first axial spacing between the first side of the end face and the plate, and
   wherein, when the plate is in the closed position, the second side of the end face is positioned closer to the plate than the first end of the end face whereby the dirt outlet further comprises a second axial spacing between the second side of the end face and the plate, and
   wherein at least a portion of the end face extends at an angle to the central longitudinal axis.

* * * * *